US012782156B2

(12) United States Patent
Kubota et al.

(10) Patent No.: US 12,782,156 B2
(45) Date of Patent: Nov. 3, 2026

(54) PATH PLANNING SYSTEM FOR SELF-DRIVING AGRICULTURAL MACHINE

(71) Applicant: Kubota Corporation, Osaka (JP)

(72) Inventors: Yuki Kubota, Sakai (JP); Toru Tambo, Sakai (JP); Itsuki Okubo, Sakai (JP); Kazuki Ota, Sakai (JP)

(73) Assignee: KUBOTA CORPORATION, Osaka (JP)

(*) Notice: Subject to any disclaimer, the term of this patent is extended or adjusted under 35 U.S.C. 154(b) by 113 days.

(21) Appl. No.: 18/734,861

(22) Filed: Jun. 5, 2024

(65) Prior Publication Data

US 2024/0337500 A1 Oct. 10, 2024

Related U.S. Application Data

(63) Continuation of application No. PCT/JP2022/043810, filed on Nov. 28, 2022.

(30) Foreign Application Priority Data

Dec. 6, 2021 (JP) ................................. 2021-197898
Dec. 6, 2021 (JP) ................................. 2021-197899

(51) Int. Cl.
*G01C 21/36* (2006.01)
*A01B 69/04* (2006.01)

(52) U.S. Cl.
CPC ........ *G01C 21/3667* (2013.01); *A01B 69/008* (2013.01)

(58) Field of Classification Search
CPC .. A01B 69/008; G01C 21/34; G01C 21/3667; G06Q 50/02
See application file for complete search history.

(56) References Cited

U.S. PATENT DOCUMENTS

2018/0209799 A1 7/2018 Uoya et al.
2018/0359906 A1 12/2018 Foster et al.
(Continued)

FOREIGN PATENT DOCUMENTS

EP 4434311 A1 9/2024
JP 11-299351 A 11/1999
(Continued)

OTHER PUBLICATIONS

Machine Translation of JP 2017068869 A obtained from Clarivate Analytics on Nov. 1, 2025 (Year: 2017).*
(Continued)

*Primary Examiner* — Fadey S. Jabr
*Assistant Examiner* — Michael J Herrera
(74) *Attorney, Agent, or Firm* — Keating & Bennett, LLP

(57) ABSTRACT

A path planning system for an agricultural machine performing self-driving includes a storage to store a map including fields, waiting areas, and a road connecting the fields and waiting areas to each other, and a processor configured or programmed to generate a path on the map for the agricultural machine for each of working days. The processor is configured or programmed to determine, from the waiting areas, a specific waiting area to which the agricultural machine is to move after performing a final task of agricultural work on each working day, based on information representing at least one of a growing state of crop in the fields, a state of progress of agricultural work in the fields, a state of planting in the fields and a state of weather, and generate a path from the field where the final task of agricultural work is to be performed, to the specific waiting area.

13 Claims, 32 Drawing Sheets

(56) References Cited

U.S. PATENT DOCUMENTS

| | | | | |
|---|---|---|---|---|
| 2020/0305338 | A1 | 10/2020 | Sasamoto et al. | |
| 2021/0076563 | A1* | 3/2021 | Andriolo | G05D 1/0088 |
| 2023/0085538 | A1* | 3/2023 | Lundkvist | G05D 1/0265<br>56/10.2 A |
| 2024/0302845 | A1 | 9/2024 | Miyashita et al. | |

FOREIGN PATENT DOCUMENTS

| | | | | |
|---|---|---|---|---|
| JP | 2017068869 | A | * | 4/2017 |
| JP | 2019-128660 | A | | 8/2019 |
| JP | 2021-029218 | A | | 3/2021 |
| JP | 2021-073602 | A | | 5/2021 |

OTHER PUBLICATIONS

Official Communication issued in International Patent Application No. PCT/JP2022/043810, mailed on Feb. 14, 2023.

* cited by examiner

*FIG. 12*

| AGRICULTURAL MACHINE | DATE/TIME | FIELD | TASK | IMPLEMENT |
|---|---|---|---|---|
| AGRICULTURAL MACHINE A | JUNE 21, 2021, 8:00 – 11:00 | FIELD A | SPRAYING AGRICULTURAL CHEMICALS | IMPLEMENT A |
| AGRICULTURAL MACHINE A | JUNE 21, 2021, 12:00 – 14:00 | FIELD B | SPRAYING AGRICULTURAL CHEMICALS | IMPLEMENT A |
| AGRICULTURAL MACHINE A | JUNE 21, 2021, 15:00 – 18:00 | FIELD C | SPRAYING AGRICULTURAL CHEMICALS | IMPLEMENT A |
| AGRICULTURAL MACHINE A | JUNE 22, 2021, 8:00 – 12:00 | FIELD D | TILLING | IMPLEMENT B |
| ⋮ | ⋮ | ⋮ | ⋮ | ⋮ |

*FIG. 18*

| FIELD | WAITING ARE A |
|---|---|
| FIELD #1 | WAITING ARE A |
| FIELD #2 | |
| FIELD #3 | |
| ⋮ | |
| FIELD #30 | |
| FIELD #31 | WAITING ARE B |
| FIELD #32 | |
| FIELD #33 | |
| ⋮ | |
| FIELD #60 | |
| FIELD #61 | WAITING ARE C |
| FIELD #62 | |
| FIELD #63 | |
| ⋮ | |
| FIELD #100 | |

*FIG. 20*

| FIELD | WAITING ARE A | GROWING STATE (HEIGHT) | WORKING DAY SCHEDULED |
|---|---|---|---|
| FIELD #1 | WAITING ARE A | 101 cm | SEPTEMBER 6 |
| FIELD #2 | | 100 cm | SEPTEMBER 7 |
| FIELD #3 | | 101 cm | SEPTEMBER 6 |
| ⋮ | | ⋮ | ⋮ |
| FIELD #30 | | 99 cm | SEPTEMBER 8 |
| FIELD #31 | WAITING ARE B | 105 cm | SEPTEMBER 2 |
| FIELD #32 | | 104 cm | SEPTEMBER 3 |
| FIELD #33 | | 106 cm | SEPTEMBER 1 |
| ⋮ | | ⋮ | ⋮ |
| FIELD #60 | | 101 cm | SEPTEMBER 6 |
| FIELD #61 | WAITING ARE C | 94 cm | SEPTEMBER 13 |
| FIELD #62 | | 96 cm | SEPTEMBER 11 |
| FIELD #63 | | 96 cm | SEPTEMBER 11 |
| ⋮ | | ⋮ | |
| FIELD #100 | | 95 cm | SEPTEMBER 12 |

*FIG. 21*

| | WAITING AREA A NUMBER OF FIELDS | WAITING AREA B NUMBER OF FIELDS | WAITING AREA C NUMBER OF FIELDS | SPECIFIC WAITING AREA |
|---|---|---|---|---|
| SEPTEMBER 1 | 0 | 6 | 0 | WAITING AREA B |
| SEPTEMBER 2 | 0 | 6 | 0 | |
| SEPTEMBER 3 | 0 | 5 | 0 | |
| SEPTEMBER 4 | 0 | 5 | 0 | |
| SEPTEMBER 5 | 0 | 6 | 0 | |
| SEPTEMBER 6 | 6 | 2 | 0 | WAITING AREA A |
| SEPTEMBER 7 | 8 | 0 | 0 | |
| SEPTEMBER 8 | 6 | 0 | 0 | |
| SEPTEMBER 9 | 7 | 0 | 0 | |
| SEPTEMBER 10 | 3 | 0 | 1 | |
| SEPTEMBER 11 | 0 | 0 | 12 | WAITING AREA C |
| SEPTEMBER 12 | 0 | 0 | 10 | |
| SEPTEMBER 13 | 0 | 0 | 10 | |
| SEPTEMBER 14 | 0 | 0 | 5 | |
| SEPTEMBER 15 | 0 | 0 | 2 | |

*FIG. 22*

| FIELD | WAITING ARE A | STATE OF PROGRESS | WORKING DAY SCHEDULED |
|---|---|---|---|
| FIELD #1 | WAITING ARE A | TILLING NOT COMPLETED | APRIL 22 |
| FIELD #2 | | TILLING NOT COMPLETED | APRIL 22 |
| FIELD #3 | | TILLING NOT COMPLETED | APRIL 22 |
| ⋮ | | ⋮ | ⋮ |
| FIELD #30 | | TILLING COMPLETED | — |
| FIELD #31 | WAITING ARE B | TILLING NOT COMPLETED | APRIL 20 |
| FIELD #32 | | TILLING NOT COMPLETED | |
| FIELD #33 | | TILLING NOT COMPLETED | |
| ⋮ | | ⋮ | |
| FIELD #60 | | TILLING NOT COMPLETED | APRIL 19 |
| FIELD #61 | WAITING ARE C | TILLING COMPLETED | — |
| FIELD #62 | | TILLING COMPLETED | |
| FIELD #63 | | TILLING COMPLETED | |
| ⋮ | | ⋮ | |
| FIELD #100 | | TILLING COMPLETED | |

*FIG. 23*

| | WAITING AREA A NUMBER OF FIELDS | WAITING AREA B NUMBER OF FIELDS | WAITING AREA C NUMBER OF FIELDS | SPECIFIC WAITING AREA |
|---|---|---|---|---|
| APRIL 19 | 0 | 10 | 0 | WAITING AREA B |
| APRIL 20 | 0 | 20 | 0 | |
| APRIL 21 | 5 | 0 | 0 | WAITING AREA A |
| APRIL 22 | 15 | 0 | 0 | |

*FIG. 24*

| PLANTING INFORMATION (BREED) | WAITING AREA A NUMBER OF FIELDS | WAITING AREA B NUMBER OF FIELDS | WAITING AREA C NUMBER OF FIELDS |
|---|---|---|---|
| KOSHIHIKARI A | 5 | 28 | 0 |
| KOSHIHIKARI B | 25 | 2 | 0 |
| HINOHIKARI | 0 | 0 | 40 |

*FIG. 25*

| | WAITING AREA A NUMBER OF FIELDS | WAITING AREA B NUMBER OF FIELDS | WAITING AREA C NUMBER OF FIELDS | SPECIFIC WAITING AREA |
|---|---|---|---|---|
| APRIL 19 | 0 | 9 | 0 | WAITING AREA B |
| APRIL 20 | 0 | 11 | 0 | |
| APRIL 21 | 0 | 10 | 0 | |
| APRIL 22 | 2 | 0 | 0 | WAITING AREA A |
| APRIL 23 | 6 | 0 | 0 | |
| APRIL 24 | 6 | 0 | 0 | |
| APRIL 25 | 7 | 0 | 0 | |
| APRIL 26 | 6 | 0 | 0 | |
| APRIL 27 | 3 | 0 | 0 | |
| APRIL 28 | 0 | 0 | 3 | WAITING AREA C |
| APRIL 29 | 0 | 0 | 9 | |
| APRIL 30 | 0 | 0 | 8 | |
| May 1 | 0 | 0 | 8 | |
| May 2 | 0 | 0 | 7 | |
| May 3 | 0 | 0 | 5 | |

*FIG. 26*

| | WAITING AREA A | WAITING AREA B | WAITING AREA C | SPECIFIC WAITING AREA |
|---|---|---|---|---|
| APRIL 19 | SUNNY THEN RAINY | SUNNY | RAINY | WAITING AREA B |
| APRIL 20 | RAINY | SUNNY | RAINY | |
| APRIL 21 | SUNNY | SUNNY | RAINY AND OCCASIONALLY CLOUDY | |
| APRIL 22 | SUNNY | SUNNY | RAINY AND OCCASIONALLY CLOUDY | WAITING AREA A |
| APRIL 23 | SUNNY | SUNNY | CLOUDY | |
| APRIL 24 | SUNNY | SUNNY | SUNNY | |
| APRIL 25 | SUNNY | SUNNY | CLOUDY | WAITING AREA C |
| APRIL 26 | SUNNY | SUNNY | CLOUDY | |

*FIG. 27*

| | WAITING AREA A | WAITING AREA B | WAITING AREA C | SPECIFIC WAITING AREA |
|---|---|---|---|---|
| APRIL 19 | — | TILLING | — | WAITING AREA B |
| APRIL 20 | | | | |
| APRIL 21 | | | | |
| APRIL 22 | TILLING | — | — | WAITING AREA A |
| APRIL 23 | | | | |
| APRIL 24 | | | | |
| APRIL 25 | — | — | TILLING | WAITING AREA C |
| APRIL 26 | | | | |

| DISTRICT | TIME OF WORK |
|---|---|
| DISTRICT A | MID MARCH |
| DISTRICT B | LATE MARCH |
| DISTRICT C | EARLY APRIL |
| DISTRICT D | MID APRIL |
| DISTRICT E | LATE APRIL |
| DISTRICT F | EARLY MAY |
| DISTRICT G | MID MAY |
| DISTRICT H | LATE MAY |

*FIG. 33*

| | FIELD PLOWING (TRACTOR) | PUDDLING (TRACTOR) | RICE TRANSPLANTING (RICE TRANSPLANTER) | HERBICIDE SPRAYING (DRONE) | FERTILIZER SPRAYING (DRONE) | REAPING (COMBINE) |
|---|---|---|---|---|---|---|
| DISTRICT a | MARCH 11 TO APRIL 17 | MAY 6 TO MAY 16 | MAY 13 TO MAY 23 | MAY 23 TO MAY 28 | JUNE 3 TO JULY 19 | SEPTEMBER 13 TO SEPTEMBER 23 |
| DISTRICT b | MARCH 16 TO APRIL 22 | MAY 11 TO MAY 21 | MAY 18 TO MAY 28 | MAY 28 TO JUNE 4 | JUNE 8 TO JULY 24 | SEPTEMBER 18 TO SEPTEMBER 28 |
| DISTRICT c | MARH 21 TO APRIL 27 | MAY 16 TO MAY 26 | MAY 23 TO JUNE 2 | JUNE 4 TO JUNE 9 | JUNE 13 TO JULY 31 | SEPTEMBER 23 TO OCTOBER 3 |
| DISTRICT d | MARCH 26 TO MAY 2 | MAY 21 TO MAY 31 | MAY 28 TO JUNE 7 | JUNE 9 TO JUNE 14 | JUNE 18 TO AUGUST 5 | SEPTEMBER 28 TO OCTOBER 8 |
| DISTRICT e | MARCH 31 TO MAY 7 | MAY 26 TO JUNE 5 | JUNE 2 TO JUNE 12 | JUNE 14 TO JUNE 19 | JUNE 23 TO AUGUST 12 | OCTOBER 3 TO OCTOBER 13 |
| DISTRICT f | APRIL 5 TO MAY 12 | MAY 31 TO JUNE 10 | JUNE 7 TO JUNE 17 | JUNE 19 TO JUNE 24 | JUNE 28 TO AUGUST 15 | OCTOBER 8 TO OCTOBER 18 |

*FIG. 34*

AGRICULTURAL MACHINE C

AGRICULTURAL MACHINE B

AGRICULTURAL MACHINE A

| DATE | TIME | FIELD | TASK | IMPLEMENT |
|---|---|---|---|---|
| APRIL 22, 2021 | 8:00 - 11:00 | FIELD #1 | TILLING | IMPLEMENT A |
| APRIL 22, 2021 | 12:00 - 14:00 | FIELD #2 | TILLING | IMPLEMENT A |
| APRIL 22, 2021 | 15:00 - 18:00 | FIELD #3 | TILLING | IMPLEMENT A |
| APRIL 23, 2021 | 8:00 - 11:00 | FIELD #4 | TILLING | IMPLEMENT A |
| APRIL 23, 2021 | 12:00 - 14:00 | FIELD #5 | TILLING | IMPLEMENT A |
| APRIL 23, 2021 | 15:00 - 18:00 | FIELD #6 | TILLING | IMPLEMENT A |
| ⋮ | ⋮ | ⋮ | ⋮ | ⋮ |

PATH PLANNING SYSTEM FOR SELF-DRIVING AGRICULTURAL MACHINE

CROSS REFERENCE TO RELATED APPLICATIONS

This application claims the benefit of priority to Japanese Patent Application Nos. 2021-197898 and 2021-197899 filed on Dec. 6, 2021 and is a Continuation Application of PCT Application No. PCT/JP2022/043810 filed on Nov. 28, 2022. The entire contents of each application are hereby incorporated herein by reference.

BACKGROUND OF THE INVENTION

1. Field of the Invention

The present disclosure relates to path planning systems for agricultural machines performing self-driving.

2. Description of the Related Art

Research and development has been directed to the automation of agricultural machines to be used in agricultural fields. For example, work vehicles, such as tractors, combines, and rice transplanters, which automatically travel within fields by utilizing a positioning system, e.g., a GNSS (Global Navigation Satellite System), are coming into practical use. Research and development is also under way for work vehicles which automatically travel not only within fields, but also outside the fields.

Japanese Laid-Open Patent Publication No. 2021-073602 and Japanese Laid-Open Patent Publication No. 2021-029218 each disclose an example of system to cause an unmanned work vehicle to automatically travel between two fields separated from each other with a road being sandwiched therebetween.

SUMMARY OF THE INVENTION

Example embodiments of the present invention provide techniques to allow path planning, for agricultural machines performing self-driving, to be performed more efficiently.

A path planning system according to an example embodiment of the present disclosure is a path planning system for an agricultural machine performing self-driving. The path planning system includes a storage to store a map including a plurality of fields, a plurality of waiting areas, and a road connecting the plurality of fields and the plurality of waiting areas to each other, and a processor configured or programmed to generate a path on the map for the agricultural machine for each of working days. The processor is configured or programmed to determine, from the plurality of waiting areas, a specific waiting area to which the agricultural machine is to move after performing a final task of agricultural work on each working day, based on information representing at least one of a growing state of crop in the plurality of fields, a state of progress of agricultural work in the plurality of fields, a state of planting in the plurality of fields, or a state of weather, and generate a path from the field where the final task of agricultural work is to be performed, to the specific waiting area.

A path planning system according to another example embodiment of the present disclosure is a path planning system for an agricultural machine performing self-driving over a plurality of districts. The path planning system includes a storage to store a map of a region including the plurality of districts, and a processor. The processor is configured or programmed to determine a period when the agricultural machine is to perform agricultural work in each of the plurality of districts, based on information representing a rough guideline for the period for each of the districts for the agricultural work to be performed by the agricultural machine, and generate a path on the map for the agricultural machine such that the agricultural machine performs the agricultural work in the period determined for each district.

Example embodiments of the present disclosure may be implemented using a device, a system, a method, an integrated circuit, a computer program, a non-transitory computer-readable storage medium, or any combination thereof. The computer-readable storage medium may be inclusive of a volatile storage medium or a non-volatile storage medium. The device may include a plurality of devices. In the case where the device includes two or more devices, the two or more devices may be disposed within a single apparatus, or divided over two or more separate apparatuses.

According to example embodiments of the present disclosure, it is possible to achieve more efficient path planning for agricultural machines performing self-driving.

The above and other elements, features, steps, characteristics and advantages of the present invention will become more apparent from the following detailed description of the example embodiments with reference to the attached drawings.

BRIEF DESCRIPTION OF THE DRAWINGS

FIG. 12 is a table showing an example of schedule of agricultural work created by the management device.

FIG. 18 shows an example of table providing the correspondence between waiting areas and fields.

FIG. 20 shows an example of table used to manage a growing state of crop in each field.

FIG. 21 shows a table providing an example of distribution of working days for a plurality of fields, the table corresponding to the example shown in FIG. 20.

FIG. 22 shows an example of table used to manage a state of progress of agricultural work in each field.

FIG. 23 shows an example of distribution of working days for a plurality of fields, the table corresponding to the example shown in FIG. 22.

FIG. 24 shows an example of relationship between planting information and the number of fields belonging to each waiting area.

FIG. 25 shows an example of distribution of working days for a plurality of fields, the table corresponding to the example shown in FIG. 24.

FIG. 26 shows an example of relationship between the state of weather and specific waiting areas on each working day.

FIG. 27 shows an example of the days when the agricultural work is to be performed and the selected specific waiting areas in the example shown in FIG. 26.

FIG. 33 shows another example of information representing a rough guideline for the period for agricultural work for each district.

FIG. 34 shows an example of work plan for each task of agricultural work.

DETAILED DESCRIPTION OF THE EXAMPLE EMBODIMENTS

Figure 1:
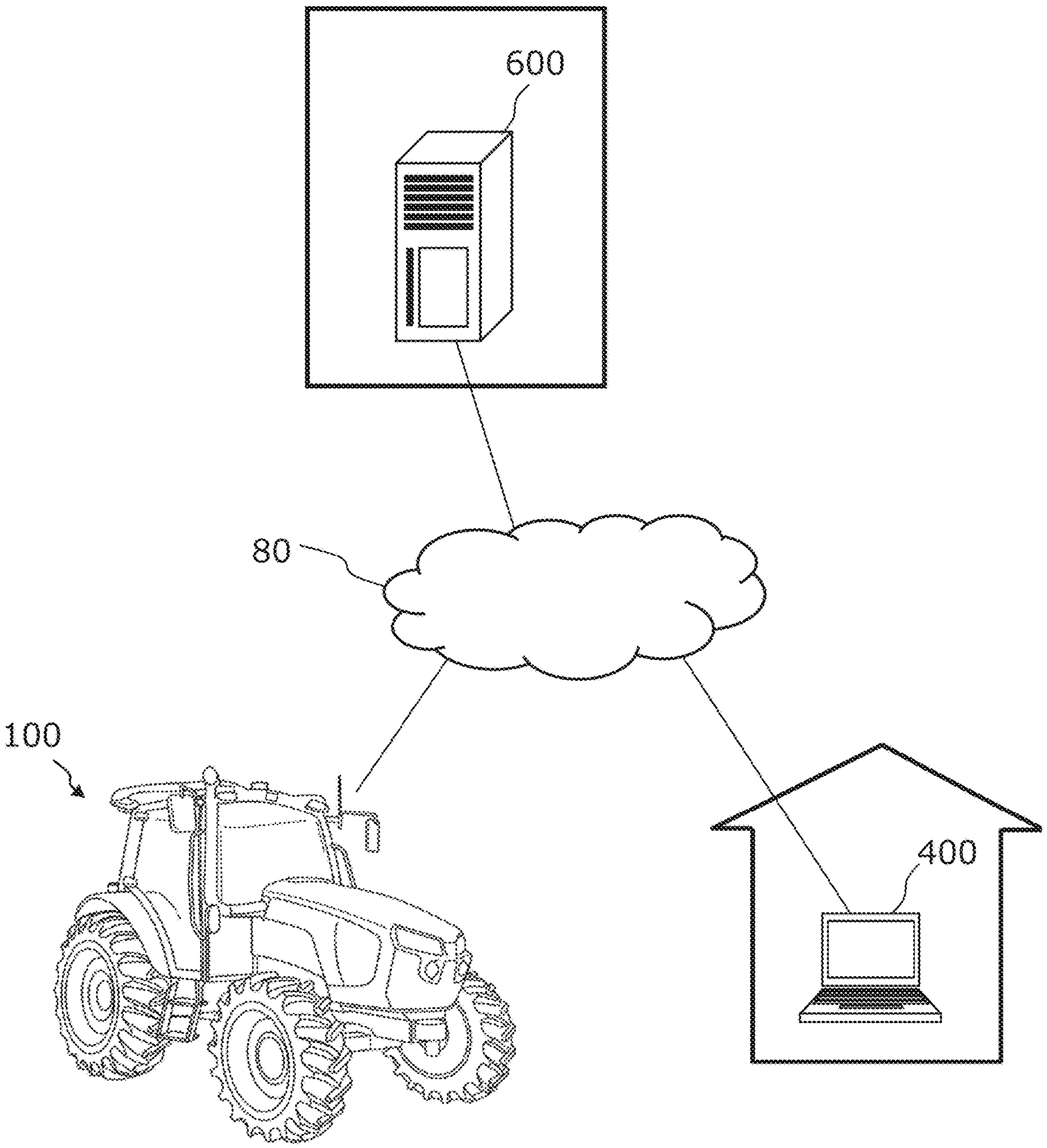
FIG. 1 is a diagram providing an overview of an agriculture management system according to a first illustrative example embodiment of the present invention.

In the present disclosure, an "agricultural machine" refers to a machine for agricultural applications. Examples of agricultural machines include tractors, harvesters, rice transplanters, vehicles for crop management, vegetable transplanters, mowers, seeders, spreaders, agricultural drones, and mobile robots for agriculture. Not only may a work vehicle such as a tractor function as an "agricultural machine" alone by itself, but also a combination of a work vehicle and an implement that is attached to, or towed by, the work vehicle may function as an "agricultural machine". For the ground surface inside a field, the agricultural machine performs agricultural work such as tilling, seeding, preventive pest control, manure spreading, planting of crops, or harvesting. Such agricultural work or tasks may be referred to as "groundwork", or simply as "work" or "tasks". Travel of a vehicle-type agricultural machine performed while the agricultural machine also performs agricultural work may be referred to as "tasked travel".

"Self-driving" refers to controlling the movement of an agricultural machine by the action of a controller, rather than through manual operations of a driver. An agricultural machine that performs self-driving may be referred to as a "self-driving agricultural machine" or a "robotic agricultural machine". During self-driving, not only the movement of the agricultural machine, but also the operation of agricultural work (e.g., the operation of the implement) may be controlled automatically. In the case where the agricultural machine is a vehicle-type machine, travel of the agricultural machine via self-driving will be referred to as "self-traveling". The controller may be configured or programmed to control at least one of steering that is required in the movement of the agricultural machine, adjustment of the moving speed, or beginning and ending of a move. In the case of controlling a work vehicle having an implement attached thereto, the controller may be configured or programmed to control raising or lowering of the implement, beginning and ending of an operation of the implement, and so on. A move based on self-driving may include not only moving of an agricultural machine that goes along a predetermined path toward a destination, but also moving of an agricultural machine that follows a target of tracking. An agricultural machine that performs self-driving may also move partly based on the user's instructions. Moreover, an agricultural machine that performs self-driving may operate not only in a self-driving mode but also in a manual driving mode, where the agricultural machine moves through manual operations of the driver. When performed not manually but through the action of a controller, the steering of an agricultural machine will be referred to as "automatic steering". A portion of, or the entirety of, the controller may reside outside the agricultural machine. Control signals, commands, data, etc., may be communicated between the agricultural machine and a controller residing outside the agricultural machine. An agricultural machine that performs self-driving may move autonomously while sensing the surrounding environment, without any person being involved in the controlling of the movement of the agricultural machine. An agricultural machine that is capable of autonomous movement is able to travel inside the field or outside the field (e.g., on roads) in an unmanned manner. During an autonomous move, operations of detecting and avoiding obstacles may be performed.

A "work plan" is data defining a plan of one or more tasks of agricultural work to be performed by an agricultural machine. The work plan may include, for example, information representing the order of the tasks of agricultural work to be performed by an agricultural machine or the field where each of the tasks of agricultural work is to be performed. The work plan may include information representing the time and the date when each of the tasks of agricultural work is to be performed. In particular, the work plan including information representing the time and the date when each of the tasks of agricultural work is to be performed is referred to as a "work schedule" or simply as a "schedule". The work schedule may include information representing the time when each task of agricultural work is to be begun and/or ended on each of working days. The work plan or the work schedule may include information representing, for each task of agricultural work, the contents of the task, the implement to be used, and/or the types and amounts of agricultural supplies to be used. As used herein, the term "agricultural supplies" refers to goods used for agricultural work to be performed by an agricultural machine. The agricultural supplies may also be referred to simply as "supplies". The agricultural supplies may include goods consumed by agricultural work such as, for example, agricultural chemicals, fertilizers, seeds, or seedlings. The work plan may be created by a processor communicating with the agricultural machine to manage the agricultural machine or a processor mounted on the agricultural machine. The processor can be configured or programmed to create a work plan based on, for example, information input by the user (agricultural business executive, agricultural worker, etc.) manipulating a terminal device. In this specification, the processor configured or programmed to communicate with the agricultural machine to manage the agricultural machine will be referred to as a "management device". The management device may manage agricultural work of a plurality agricultural machines. In this case, the management device may create a work plan including information on each task of agricultural work to be performed by each of the plurality of agricultural machines. The work plan may be downloaded to each of the agricultural machines and stored in a storage in each of the agricultural machines. In order to perform the scheduled agricultural work in accordance with the work plan, each agricultural machine can automatically move to a field and perform the agricultural work.

An "environment map" is data representing, with a predetermined coordinate system, the position or the region of an object existing in the environment where the agricultural machine moves. The environment map may be referred to simply as a "map" or "map data". The coordinate system defining the environment map is, for example, a world coordinate system such as a geographic coordinate system fixed to the globe. Regarding the object existing in the environment, the environment map may include information other than the position (e.g., attribute information or other types of information). The "environment map" encompasses various type of maps such as a point cloud map and a lattice map. Data on a local map or a partial map that is generated or processed in a process of constructing the environment map is also referred to as a "map" or "map data".

A "global path" is data on a path connecting a departure point to a target point of an automatic movement of the agricultural machine, and is generated by a processor performing path planning. Generation of such a global path is referred to as "global path planning". In the following description, the global path will be referred to also as a "target path" or simply as a "path". The global path may be defined by, for example, coordinate values of a plurality of points which the agricultural machine is to pass. Such a point that the agricultural machine is to pass is referred as a "waypoint", and a line segment connecting waypoints adjacent to each other is referred to as a "link".

A "local path" is a path by which the agricultural machine can avoid an obstacle, and is consecutively generated while the agricultural machine is automatically moving along the global path. Generation of such a local path is referred to as "local path planning". The local path is consecutively generated based on data acquired by one or more sensing devices included in the agricultural machine, during a movement of the agricultural machine. The local path may be defined by a plurality of waypoints along a portion of the global path. Note that in the case where there is an obstacle in the vicinity of the global path, the waypoints may be set so as to detour around the obstacle. The length of a link between the waypoints on the local path is shorter than the length of a link between the waypoints on the global path. The device generating the local path may be the same as, or different from, the device generating the global path. For example, the management device managing the agricultural work to be performed by the agricultural machine may generate the global path, whereas the controller mounted on the agricultural machine may generate the local path.

A "waiting area" is a site provided for an agricultural machine to wait while the agricultural machine does not perform agricultural work. One or more waiting areas may be provided in an environment where an agricultural machine performs self-driving. The waiting area may be, for example, a warehouse, a garage, a barn, a parking area, or any other facilities. The waiting area may be managed or used jointly by a plurality of users. The waiting area may be a warehouse, a barn, a garage or a parking area at a house or an office of an agricultural worker different from the user of the agricultural machine. Alternatively, the waiting area may be run by a business operator that provides a service of renting a self-driving agricultural machine to the user. A plurality of waiting areas may be scattered in the environment where an agricultural machine moves. In the waiting area, work such as replacement or maintenance of a part or an implement of the agricultural machine, or supplement of supplies, may be performed. In this case, parts, tools or supplies necessary for the work may be provided in the waiting area.

EXAMPLE EMBODIMENTS

Hereinafter, example embodiments of the present disclosure will be described. Note, however, that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of the claims. In the following description, elements having identical or similar functions are denoted by identical reference numerals.

The following example embodiments are only exemplary, and the techniques according to the present disclosure are not limited to the following example embodiments. For example, numerical values, shapes, materials, steps, orders of steps, layout of a display screen, etc., which are indicated in the following example embodiments are only exemplary, and admit of various modifications so long as it makes technological sense. Any one example embodiment or elements, features, characteristics, etc., thereof, may be combined with another so long as it makes technological sense to do so.

Hereinafter, example embodiments in which techniques according to the present disclosure are applied to a work vehicle, such as a tractor, which is an example of agricultural machine, will be mainly described. The techniques according to example embodiments of the present disclosure are also applicable to other types of agricultural machines in addition to the work vehicle such as a tractor. The agricultural machine may be, for example, an agricultural drone, that is, an unmanned aerial vehicle (UAV). The agricultural drone may be used for agricultural work that may be performed from the air such as seeding, spraying of fertilizers or spraying of agricultural chemicals. The agricultural drone may be used to sense the growing state of crop from the air. Such a drone is encompassed in the agricultural machine according to the present disclosure.

Example Embodiment 1

FIG. 1 is a diagram providing an overview of an agriculture management system according to an illustrative example embodiment of the present disclosure. The agriculture management system shown in FIG. 1 includes an agricultural machine 100, a terminal device 400, and a management device 600. The terminal device 400 is a computer used by a user of the agricultural machine 100. The management device 600 is a computer managed by a business operator running the agriculture management system. The agricultural machine 100, the terminal device 400 and the management device 600 can communicate with each other via a network 80. FIG. 1 shows one agricultural machine 100, but the agriculture management system may include a plurality of the agricultural machines.

The agricultural machine 100 according to the present example embodiment is a tractor. The agricultural machine 100 may be a work vehicle other than a tractor or any other type of agricultural machine. The agricultural machine 100 can have an implement attached to its rear and/or its front. While performing agricultural work in accordance with a particular type of implement, the agricultural machine 100 is able to travel inside a field. The agricultural machine 100 may travel inside the field or outside the field with no implement being attached thereto.

The agricultural machine 100 has a self-driving function. In other words, the agricultural machine 100 can travel by the action of a controller, rather than manually. The controller according to the present example embodiment is provided inside the agricultural machine 100, and is able to control both the speed and steering of the agricultural machine 100. The agricultural machine 100 can perform self-traveling outside the field (e.g., on roads) as well as inside the field.

The agricultural machine 100 includes a device usable for positioning or localization, such as a GNSS receiver or an LiDAR sensor. Based on the position of the agricultural machine 100 and information on a target path generated by the management device 600, the controller of the agricultural machine 100 is configured or programmed to cause the agricultural machine 100 to automatically travel. In addition to controlling the travel of the agricultural machine 100, the controller also may be configured or programmed to control the operation of the implement. As a result, while automatically traveling inside the field, the agricultural machine 100 is able to perform agricultural work by using the implement. In addition, the agricultural machine 100 is able to automatically travel along the target path on a road outside the field (e.g., an agricultural road or a general road). In the case of performing self-traveling on a road outside the field, the agricultural machine 100 travels while generating, along the target path, a local path along which the agricultural machine 100 can avoid an obstacle, based on data output from a sensing device such as a camera or a LiDAR sensor. Inside the field, the agricultural machine 100 may travel while generating a local path in substantially the same manner as described above, or may perform an operation of traveling along the target path without generating a local path and halting when an obstacle is detected.

The management device 600 may include a computer to manage the agricultural work performed by the agricultural machine 100. The management device 600 may include, for example, a server computer that performs centralized management on information regarding the field and the agricultural work on the cloud and supports agriculture by use of the data on the cloud. The management device 600, for example, creates a work plan for the agricultural machine 100 and performs global path planning for the agricultural machine 100 in accordance with the work plan.

The management device 600 generates a global path (target path) inside the field and a global path (target path) outside the field by different methods from each other. The management device 600 generates a target path inside the field based on information regarding the field. For example, the management device 600 can generate a target path inside the field based on various types of previously registered information such as the outer shape of the field, the area size of the field, the position of the entrance/exit of the field, the width of the agricultural machine 100, the width of the implement, the contents of the work, the types of crops to be grown, the region where the crops are to be grown, the growing state of crop, and the interval between rows or ridges of the crops. The management device 600 generates a target path inside the field based on, for example, information input by the user by use of the terminal device 400 or any other device. The management device 600 may generate a path inside the field such that the path covers, for example, the entirety of a work area where the work is to be performed. Alternatively, inside the field, the management device 600 may generate a target path only outside the work area and does not need to generate a target path inside the work area. In this case, the agricultural machine 100 may recognize rows or ridges of the crops based on the data output from the camera or the LiDAR sensor, and travel while generating a local path along the recognized rows or ridges of the crops. Meanwhile, the management device 600 generates a path outside the field in accordance with the work plan. For example, the management device 600 can generate a target path outside the field based on various types of information such as the order of tasks of agricultural work indicated by the work plan, the position of the field where each task of agricultural work is to be performed, the position of the entrance/exit of the field, the time when each task of agricultural work is to begin and/or end, the state of the road surface, the state of weather or the traffic state.

In addition, the management device 600 may generate or edit an environment map based on data collected by the agricultural machine 100 or any other movable body by use of the sensing device such as a LiDAR sensor. The management device 600 transmits data on the work plan, the target path and the environment map thus generated to the agricultural machine 100. The agricultural machine 100 automatically moves and performs agricultural work based on the data.

The global path planning and the generation (or editing) of the environment map may be performed by any other device than the management device 600. For example, the controller of the agricultural machine 100 may be configured or programmed to perform global path planning, or the generation or editing of the environment map. As described above, a device generating an environment map, a device generating a work plan and a device performing path planning may be dispersedly located at different sites.

The terminal device 400 may include a computer that is used by a user who is at a remote place from the agricultural machine 100. The terminal device 400 shown in FIG. 1 includes a laptop computer, but the terminal device 400 is not limited to this. The terminal device 400 may include a stationary computer such as a desktop PC (personal computer), or a mobile terminal such as a smartphone or a tablet computer. The terminal device 400 displays, on the display screen thereof, a setting screen allowing the user to input information necessary to create a work plan (e.g., a schedule of each task of agricultural work) for the agricultural machine 100. When the user inputs necessary information to the setting screen and performs a manipulation to transmit the information, the terminal device 400 transmits the input information to the management device 600. The management device 600 creates a work plan based on the information. The terminal device 400 may also be used to register one or more fields where the agricultural machine 100 is to perform the agricultural work.

Hereinafter, a configuration and an operation of the system according to the present example embodiment will be described in more detail.

Figure 2:
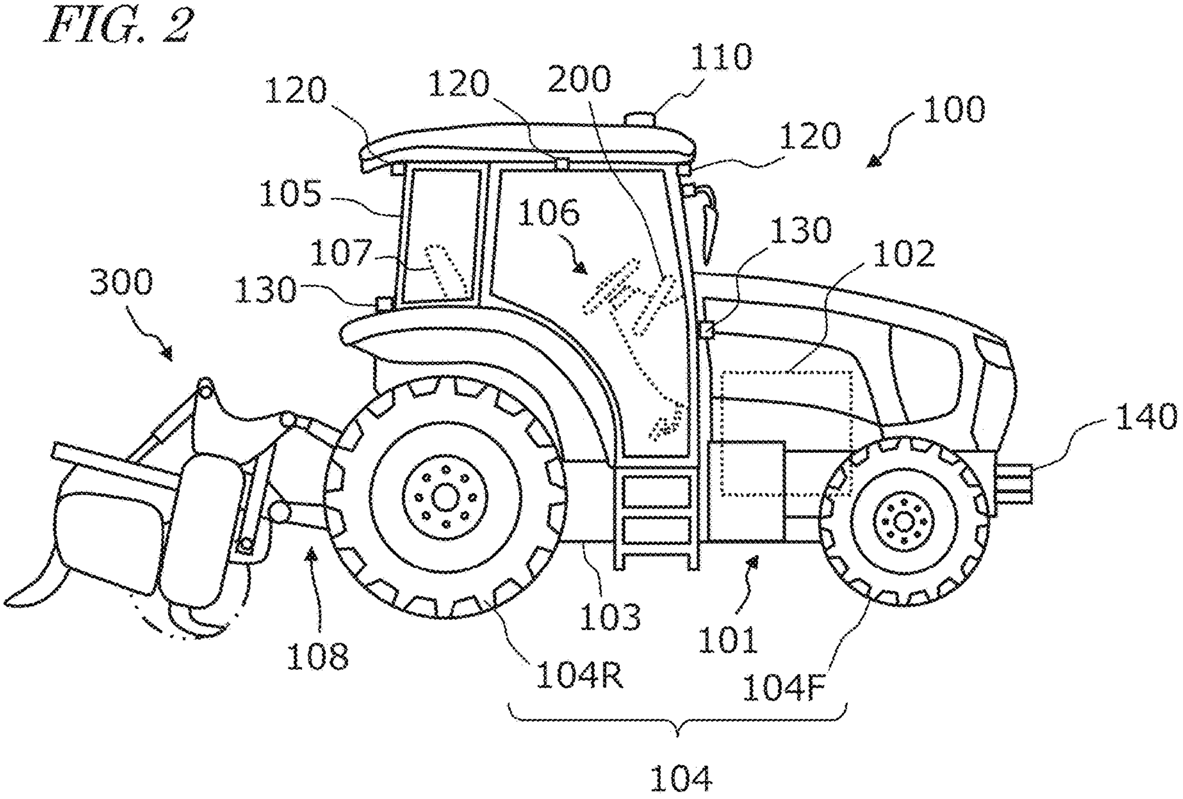
FIG. 2 is a side view schematically showing an example of work vehicle and an example of an implement that is linked to the work vehicle.

FIG. 2 is a side view schematically showing an example of the agricultural machine 100 and an example of implement 300 linked to the agricultural machine 100. The agricultural machine 100 according to the present example embodiment can operate both in a manual driving mode and a self-driving mode. In the self-driving mode, the agricultural machine 100 is able to perform unmanned travel. The agricultural machine 100 can perform self-driving both inside a field and outside the field.

As shown in FIG. 2, the agricultural machine 100 includes a vehicle body 101, a prime mover (engine) 102, and a transmission 103. On the vehicle body 101, wheels 104 with tires and a cabin 105 are provided. The wheels 104 include a pair of front wheels 104F and a pair of rear wheels 104R. Inside the cabin 105, a driver's seat 107, a steering device 106, an operational terminal 200, and switches for manipulation are provided. In the case where the agricultural machine 100 performs tasked travel inside the field, the front wheels 104F and/or the rear wheels 104R may have crawlers, rather than tires, attached thereto.

The agricultural machine 100 includes a plurality of sensing devices sensing the surroundings of the agricultural machine 100. In the example shown in FIG. 2, the sensing devices include a plurality of cameras 120, a LiDAR sensor 140, and a plurality of obstacle sensors 130.

The cameras 120 may be provided at the front/rear/right/left of the agricultural machine 100, for example. The cameras 120 image the surrounding environment of the agricultural machine 100 and generate image data. The images acquired by the cameras 120 may be transmitted to the terminal device 400, which is responsible for remote monitoring. The images may be used to monitor the agricultural machine 100 during unmanned driving. The cameras 120 may also be used to generate images to allow the agricultural machine 100, traveling on a road outside the field (an agricultural road or a general road), to recognize objects, obstacles, white lines, road signs, traffic signs or the like in the surroundings of the agricultural machine 100.

The LiDAR sensor 140 in the example shown in FIG. 2 is disposed on a bottom portion of a front surface of the vehicle body 101. The LiDAR sensor 140 may be disposed at any other position. While the agricultural machine 100 is traveling mainly outside the field, the LiDAR sensor 140 repeatedly outputs sensor data representing the distance and the direction between an object existing in the surrounding environment thereof and each of measurement points, or a two-dimensional or three-dimensional coordinate values of each of the measurement points. The sensor data output from the LiDAR sensor 140 is processed by the controller of the agricultural machine 100. The controller can be configured or programmed to perform localization of the agricultural machine 100 by matching the sensor data against the environment map. The controller can be configured or programmed to further detect an object such as an obstacle existing in the surroundings of the agricultural machine 100 based on the sensor data, and generate, along the global path, a local path along which the agricultural machine 100 needs to actually proceed. The controller can be configured or programmed to utilize an algorithm such as, for example, SLAM (Simultaneous Localization and Mapping) to generate or edit an environment map. The agricultural machine 100 may include a plurality of LiDAR sensors disposed at different positions with different orientations.

The plurality of obstacle sensors 130 shown in FIG. 2 are provided at the front and the rear of the cabin 105. The obstacle sensors 130 may be disposed at other positions. For example, one or more obstacle sensors 130 may be disposed at any position at the sides, the front or the rear of the vehicle body 101. The obstacle sensors 130 may include, for example, a laser scanner or an ultrasonic sonar. The obstacle sensors 130 may be used to detect obstacles in the surroundings of the agricultural machine 100 during self-traveling to cause the agricultural machine 100 to halt or detour around the obstacles. The LiDAR sensor 140 may be used as one of the obstacle sensors 130.

The agricultural machine 100 further includes a GNSS unit 110. The GNSS unit 110 includes a GNSS receiver. The GNSS receiver may include an antenna to receive a signal(s) from a GNSS satellite(s) and a processor configured or programmed to calculate the position of the agricultural machine 100 based on the signal(s) received by the antenna. The GNSS unit 110 receives satellite signals transmitted from the plurality of GNSS satellites, and performs positioning based on the satellite signals. GNSS is the general term for satellite positioning systems such as GPS (Global Positioning System), QZSS (Quasi-Zenith Satellite System; e.g., MICHIBIKI), GLONASS, Galileo, and BeiDou. Although the GNSS unit 110 according to the present example embodiment is disposed above the cabin 105, it may be disposed at any other position.

The GNSS unit 110 may include an inertial measurement unit (IMU). Signals from the IMU can be used to complement position data. The IMU can measure a tilt or a small motion of the agricultural machine 100. The data acquired by the IMU can be used to complement the position data based on the satellite signals, so as to improve the performance of positioning.

The controller of the agricultural machine 100 may utilize, for positioning, the sensing data acquired by the sensing devices such as the cameras 120 or the LIDAR sensor 140, in addition to the positioning results provided by the GNSS unit 110. In the case where objects serving as characteristic points exist in the environment that is traveled by the agricultural machine 100, as in the case of an agricultural road, a forest road, a general road or an orchard, the position and the orientation of the agricultural machine 100 can be estimated with a high accuracy based on data that is acquired by the cameras 120 or the LiDAR sensor 140 and on an environment map that is previously stored in the storage. By correcting or complementing position data based on the satellite signals using the data acquired by the cameras 120 or the LiDAR sensor 140, it becomes possible to identify the position of the agricultural machine 100 with a higher accuracy.

The prime mover 102 may be a diesel engine, for example. Instead of a diesel engine, an electric motor may be used. The transmission 103 can change the propulsion and the moving speed of the agricultural machine 100 through a speed changing mechanism. The transmission 103 can also switch between forward travel and backward travel of the agricultural machine 100.

The steering device 106 includes a steering wheel, a steering shaft connected to the steering wheel, and a power steering device to assist in the steering by the steering wheel. The front wheels 104F are the steered wheels, such that changing their angle of turn (also referred to as "steering angle") can cause a change in the traveling direction of the agricultural machine 100. The steering angle of the front wheels 104F can be changed by manipulating the steering wheel. The power steering device includes a hydraulic device or an electric motor to supply an assisting force to change the steering angle of the front wheels 104F. When automatic steering is performed, under the control of the controller disposed in the agricultural machine 100, the steering angle may be automatically adjusted by the power of the hydraulic device or the electric motor.

A linkage device 108 is provided at the rear of the vehicle body 101. The linkage device 108 includes, e.g., a three-point linkage (also referred to as a "three-point link" or a "three-point hitch"), a PTO (Power Take Off) shaft, a universal joint, and a communication cable. The linkage device 108 allows the implement 300 to be attached to, or detached from, the agricultural machine 100. The linkage device 108 is able to raise or lower the three-point link with a hydraulic device, for example, thus changing the position and/or attitude of the implement 300. Moreover, motive power can be sent from the agricultural machine 100 to the implement 300 via the universal joint. While towing implement 300, the agricultural machine 100 allows the the implement 300 to perform a predetermined task. The linkage device may be provided frontward of the vehicle body 101. In that case, the implement can be connected frontward of the agricultural machine 100.

Although the implement 300 shown in FIG. 2 is a rotary tiller, the implement 300 is not limited to a rotary tiller. For example, any arbitrary implement such as a seeder, a spreader, a transplanter, a mower, a rake implement, a baler, a harvester, a sprayer, or a harrow, can be connected to the agricultural machine 100 for use.

The agricultural machine 100 shown in FIG. 2 can be driven by human driving; alternatively, it may only support unmanned driving. In that case, component elements which are only required for human driving, e.g., the cabin 105, the steering device 106, and the driver's seat 107 do not need to be provided in the agricultural machine 100. An unmanned agricultural machine 100 can travel via autonomous driving, or by remote operation by a user.

Figure 3:
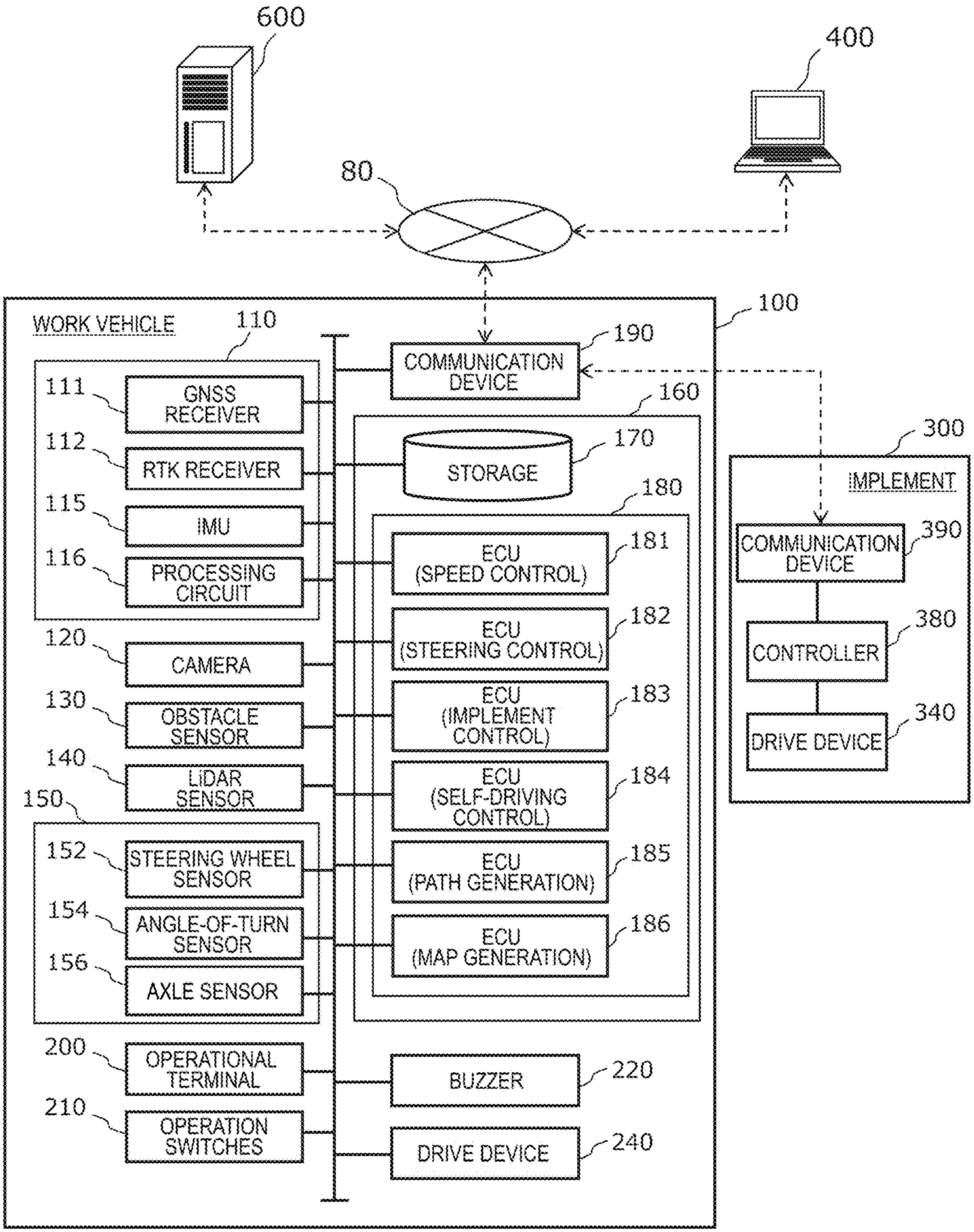
FIG. 3 is a block diagram showing an example configuration of the work vehicle and the implement.

FIG. 3 is a block diagram showing an example configuration of the agricultural machine 100 and the implement 300. The agricultural machine 100 and the implement 300 can communicate with each other via a communication cable that is included in the linkage device 108. The agricultural machine 100 is able to communicate with the terminal device 400 and the management device 600 via the network 80.

In addition to the GNSS unit 110, the cameras 120, the obstacle sensors 130, the LiDAR sensor 140 and the operational terminal 200, the agricultural machine 100 in the example of FIG. 3 includes sensors 150 to detect the operating status of the agricultural machine 100, a control system 160, a communication device 190, operation switches 210, a buzzer 220, and a drive device 240. These component elements are communicably connected to each other via a bus. The GNSS unit 110 includes a GNSS receiver 111, an RTK receiver 112, an inertial measurement unit (IMU) 115, and a processing circuit 116. The sensors 150 include a steering wheel sensor 152, an angle-of-turn sensor 154, and a axle sensor 156. The control system 160 includes a storage 170 and a controller 180. The controller 180 includes a plurality of electronic control units (ECU) 181 to 186. The implement 300 includes a drive device 340, a controller 380, and a communication device 390. Note that FIG. 3 shows component elements which are relatively closely related to the operations of self-driving by the agricultural machine 100, while other components are omitted from illustration.

The GNSS receiver 111 in the GNSS unit 110 receives satellite signals from transmitted the plurality of GNSS satellites and generates GNSS data based on the satellite signals. The GNSS data is generated in a predetermined format such as, for example, the NMEA-0183 format. The GNSS data may include, for example, the identification number, the angle of elevation, the azimuth angle, and a value representing the reception strength of each of the satellites from which the satellite signals are received.

Figure 4:
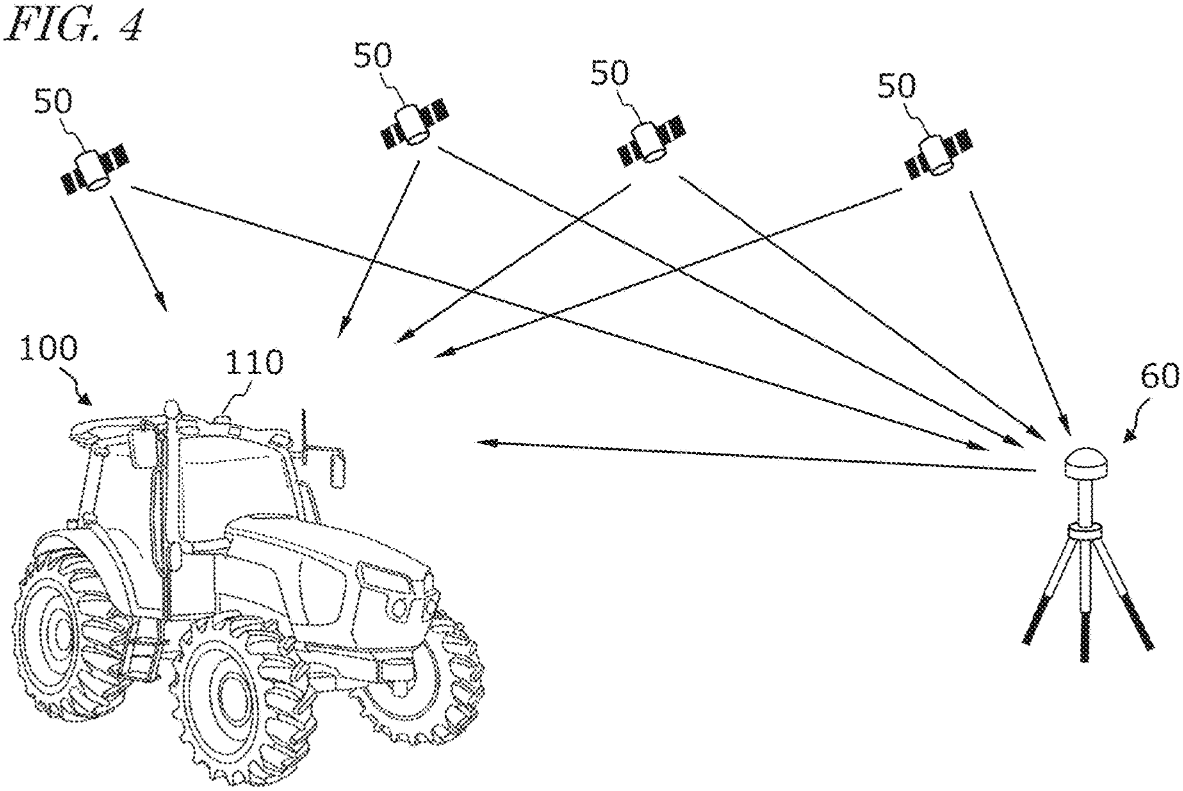
FIG. 4 is a conceptual diagram showing an example of the work vehicle performing positioning based on an RTK-GNSS.

The GNSS unit 110 shown in FIG. 3 performs positioning of the agricultural machine 100 by utilizing an RTK (Real Time Kinematic)-GNSS. FIG. 4 is a conceptual diagram showing an example of the agricultural machine 100 performing positioning based on the RTK-GNSS. In the positioning based on the RTK-GNSS, not only satellite signals transmitted from a plurality of GNSS satellites 50, but also a correction signal that is transmitted from a reference station 60 is used. The reference station 60 may be disposed near the field where the agricultural machine 100 performs tasked travel (e.g., at a position within 10 km of the agricultural machine 100). The reference station 60 generates a correction signal of, for example, an RTCM format based on the satellite signals received from the plurality of GNSS satellites 50, and transmits the correction signal to the GNSS unit 110. The RTK receiver 112, which includes an antenna and a modem, receives the correction signal transmitted from the reference station 60. Based on the correction signal, the processing circuit 116 of the GNSS unit 110 corrects the results of the positioning performed by use of the GNSS receiver 111. Use of the RTK-GNSS enables positioning with an accuracy on the order of several centimeters of errors, for example. Positional information including latitude, longitude, and altitude information is acquired through the highly accurate positioning by the RTK-GNSS. The GNSS unit 110 calculates the position of the agricultural machine 100 as frequently as, for example, one to ten times per second.

Note that the positioning method is not limited to being performed by use of an RTK-GNSS; any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System). In the case where positional information with the necessary accuracy can be obtained without the use of the correction signal transmitted from the reference station 60, positional information may be generated without using the correction signal. In that case, the GNSS unit 110 does not need to include the RTK receiver 112.

Even in the case where the RTK-GNSS is used, at a site where the correction signal from the reference station 60 cannot be acquired (e.g., on a road far from the field), the position of the agricultural machine 100 is estimated by another method with no use of the signal from the RTK receiver 112. For example, the position of the agricultural machine 100 may be estimated by matching the data output from the LiDAR sensor 140 and/or the cameras 120 against a highly accurate environment map.

The GNSS unit 110 according to the present example embodiment further includes the IMU 115. The IMU 115 may include a 3-axis accelerometer and a 3-axis gyroscope. The IMU 115 may include a direction sensor such as a 3-axis geomagnetic sensor. The IMU 115 functions as a motion sensor which can output signals representing parameters such as acceleration, velocity, displacement, and attitude of the agricultural machine 100. Based not only on the satellite signals and the correction signal but also on a signal that is output from the IMU 115, the processing circuit 116 can estimate the position and orientation of the agricultural machine 100 with a higher accuracy. The signal that is output from the IMU 115 may be used for the correction or complementation of the position that is calculated based on the satellite signals and the correction signal. The IMU 115 outputs a signal more frequently than the GNSS receiver 111. Utilizing this signal that is output highly frequently, the processing circuit 116 allows the position and orientation of the agricultural machine 100 to be measured more frequently (e.g., about 10 Hz or above). Instead of the IMU 115, a 3-axis accelerometer and a 3-axis gyroscope may be separately provided. The IMU 115 may be provided as a separate device from the GNSS unit 110.

The cameras 120 are imagers that image the surrounding environment of the agricultural machine 100. Each of the cameras 120 includes an image sensor such as a CCD (Charge Coupled Device) or a CMOS (Complementary Metal Oxide Semiconductor), for example. In addition, each camera 120 may include an optical system including one or more lenses and a signal processing circuit. During travel of the agricultural machine 100, the cameras 120 image the surrounding environment of the agricultural machine 100, and generate image data (e.g., motion picture data). The cameras 120 are able to capture motion pictures at a frame rate of 3 frames/second (fps: frames per second) or greater, for example. The images generated by the cameras 120 may be used by a remote supervisor to check the surrounding environment of the agricultural machine 100 with the terminal device 400, for example. The images generated by the cameras 120 may also be used for the purpose of positioning and/or detection of obstacles. As shown in FIG. 2, the plurality of cameras 120 may be provided at different positions on the agricultural machine 100, or a single camera 120 may be provided. A visible camera(s) to generate visible light images and an infrared camera(s) to generate infrared images may be separately provided. Both of a visible camera(s) and an infrared camera(s) may be provided as cameras to generate images for monitoring purposes. The infrared camera(s) may also be used for detection of obstacles at nighttime.

The obstacle sensors 130 detect objects existing in the surroundings of the agricultural machine 100. Each of the obstacle sensors 130 may include a laser scanner or an ultrasonic sonar, for example. When an object exists at a position within a predetermined distance from one of the obstacle sensors 130, the obstacle sensor 130 outputs a signal indicating the presence of the obstacle. The plurality of obstacle sensors 130 may be provided at different positions on the agricultural machine 100. For example, a plurality of laser scanners and a plurality of ultrasonic sonars may be disposed at different positions on the agricultural machine 100. Providing such a great number of obstacle sensors 130 can reduce blind spots in monitoring obstacles in the surroundings of the agricultural machine 100.

The steering wheel sensor 152 measures the angle of rotation of the steering wheel of the agricultural machine 100. The angle-of-turn sensor 154 measures the angle of turn of the front wheels 104F, which are the steered wheels. Measurement values by the steering wheel sensor 152 and the angle-of-turn sensor 154 are used for steering control by the controller 180.

The axle sensor 156 measures the rotational speed, i.e., the number of revolutions per unit time, of a axle that is connected to the wheels 104. The axle sensor 156 may be a sensor including a magnetoresistive element (MR), a Hall generator, or an electromagnetic pickup, for example. The axle sensor 156 outputs a numerical value indicating the number of revolutions per minute (unit: rpm) of the axle, for example. The axle sensor 156 is used to measure the speed of the agricultural machine 100.

The drive device 240 includes various types of devices required to cause the agricultural machine 100 to travel and to drive the implement 300; for example, the prime mover 102, the transmission 103, the steering device 106, the linkage device 108 and the like described above. The prime mover 102 may include an internal combustion engine such as, for example, a diesel engine. The drive device 240 may include an electric motor for traction instead of, or in addition to, the internal combustion engine.

The buzzer 220 is an audio output device to present an alarm sound to alert the user of an abnormality. For example, the buzzer 220 may present an alarm sound when an obstacle is detected during self-driving. The buzzer 220 is controlled by the controller 180.

The storage 170 includes one or more storage mediums such as a flash memory or a magnetic disc. The storage 170 stores various data that is generated by the GNSS unit 110, the cameras 120, the obstacle sensors 130, the LiDAR sensor 140, the sensors 150, and the controller 180. The data that is stored by the storage 170 may include map data on the environment where the agricultural machine 100 travels (environment map) and data on a global path (target path) for self-driving. The environment map includes information on a plurality of fields where the agricultural machine 100 performs agricultural work and roads around the fields. The environment map and the target path may be generated by a processor in the management device 600. The controller 180 according to the present example embodiment has a function of generating or editing an environment map and a target path. The controller 180 can edit the environment map and the target path, acquired from the management device 160, in accordance with the environment where the agricultural machine 100 travels. The storage 170 also stores data on a work plan received by the communication device 190 from the management device 600. The work plan includes information on a plurality of tasks of agricultural work to be performed by the agricultural machine 100 over a plurality of working days. The work plan may be, for example, data on a work schedule including information on the time when the agricultural machine 100 is scheduled to perform each task of agricultural work on each of the working days. The storage 170 also stores a computer program(s) to cause each of the ECUs in the controller 180 to perform various operations described below. Such a computer program(s) may be provided to the agricultural machine 100 via a storage medium (e.g., a semiconductor memory, an optical disc, etc.) or through telecommunication lines (e.g., the Internet). Such a computer program(s) may be marketed as commercial software.

The controller 180 includes the plurality of ECUs. The plurality of ECUs include, for example, the ECU 181 for speed control, the ECU 182 for steering control, the ECU 183 for implement control, the ECU 184 for self-driving control, the ECU 185 for path generation, and the ECU 186 for map generation.

The ECU 181 controls the prime mover 102, the transmission 103 and brakes included in the drive device 240, thus controlling the speed of the agricultural machine 100.

The ECU 182 controls the hydraulic device or the electric motor included in the steering device 106 based on a measurement value of the steering wheel sensor 152, thus controlling the steering of the agricultural machine 100.

In order to cause the implement 300 to perform a desired operation, the ECU 183 controls the operations of the three-point link, the PTO shaft and the like that are included in the linkage device 108. Also, the ECU 183 generates a signal to control the operation of the implement 300, and transmits this signal from the communication device 190 to the implement 300.

Based on data output from the GNSS unit 110, the cameras 120, the obstacle sensors 130, the LiDAR sensor 140 and the sensors 150, the ECU 184 performs computation and control for achieving self-driving. For example, the ECU 184 specifies the position of the agricultural machine 100 based on the data output from at least one of the GNSS unit 110, the cameras 120 and the LiDAR sensor 140. Inside the field, the ECU 184 may determine the position of the agricultural machine 100 based only on the data output from the GNSS unit 110. The ECU 184 may estimate or correct the position of the agricultural machine 100 based on the data acquired by the cameras 120 or the LiDAR sensor 140. Use of the data acquired by the cameras 120 or the LiDAR sensor 140 allows the accuracy of the positioning to be further improved. Meanwhile, outside the field, the ECU 184 estimates the position of the agricultural machine 100 by use of the data output from the LiDAR sensor 140 or the cameras 120. For example, the ECU 184 may estimate the position of the agricultural machine 100 by matching the data output from the LiDAR sensor 140 or the cameras 120 against the environment map. During self-driving, the ECU 184 performs computation necessary for the agricultural machine 100 to travel along a target path or a local path, based on the estimated position of the agricultural machine 100. The ECU 184 sends the ECU 181 a command to change the speed, and sends the ECU 182 a command to change the steering angle. In response to the command to change the speed, the ECU 181 controls the prime mover 102, the transmission 103 or the brakes to change the speed of the agricultural machine 100. In response to the command to change the steering angle, the ECU 182 controls the steering device 106 to change the steering angle.

While the agricultural machine 100 is traveling on the road along the target path, the ECU 185 consecutively generates a local path along which the agricultural machine 100 can avoid an obstacle. During travel of the agricultural machine 100, the ECU 185 recognizes an obstacle existing in the surroundings of the agricultural machine 100 based on the data output from the cameras 120, the obstacle sensors 130 and the LiDAR sensor 140. The ECU 185 generates a local path such that the agricultural machine 100 avoids the recognized obstacle. The ECU 185 may have a function of performing global path planning instead of the management device 160. In this case, the ECU 185 determines a destination of the agricultural machine 100 based on the work plan stored in the storage 170, and determines a target path from a beginning point to a target point of the movement of the agricultural machine 100. For example, the ECU 185 can generate, as the target path, a path by which the agricultural machine 100 can arrive at the destination within the shortest time period, based on the environment map stored in the storage 170 and including information on the roads.

The ECU 186 generates or edits a map of the environment where the agricultural machine 100 travels. In the present example embodiment, an environment map generated by an external device such as the management device 600 is transmitted to the agricultural machine 100 and recorded in the storage 170. Instead, the ECU 186 can generate or edit an environment map. In the case where the ECU 186 generates an environment map, the environment map may be generated based on sensor data output from the LiDAR sensor 140. To generate an environment map, the ECU 186 consecutively generates three-dimensional point cloud data based on the sensor data output from the LiDAR sensor 140 while the agricultural machine 100 is traveling. The ECU 186 can generate an environment map by connecting the point cloud data consecutively generated by use of an algorithm such as, for example, SLAM. The environment map generated in this manner is a highly accurate three-dimensional map, and may be used for localization performed by the ECU 184. Based on this three-dimensional map, a two-dimensional map usable for the global path planning may be generated. In this specification, the three-dimensional map that is used for the localization and the two-dimensional map that is used for the global path planning will be both referred to as an "environment map". The ECU 186 can further edit the map by adding, to the map, various types of attribute information on a structural body, the state of the road surface, how easily the road is passable, or the like that is recognized based on the data output from the camera 120 or the LiDAR sensor 140.

Through the actions of these ECUs, the controller 180 realizes self-driving. During self-driving, the controller 180 controls the drive device 240 based on the measured or estimated position of the agricultural machine 100 and on the target path. As a result, the controller 180 can cause the agricultural machine 100 to travel along the target path.

The plurality of ECUs included in the controller 180 can communicate with each other in accordance with a vehicle bus standard such as, for example, a CAN (Controller Area Network). Instead of the CAN, faster communication methods such as Automotive Ethernet (registered trademark) may be used. Although the ECUs 181 to 186 are illustrated as individual blocks in FIG. 3, the function of each of the ECU 181 to 186 may be implemented by a plurality of ECUs. Alternatively, an onboard computer that integrates the functions of at least some of the ECUs 181 to 186 may be provided. The controller 180 may include ECUs other than the ECUs 181 to 186, and any number of ECUs may be provided in accordance with functionality. Each ECU includes a processing circuit including one or more processors.

The communication device 190 is a device including a circuit communicating with the implement 300, the terminal device 400 and the management device 600. The communication device 190 includes circuitry to perform exchanges of signals complying with an ISOBUS standard such as ISOBUS-TIM, for example, between itself and the communication device 390 of the implement 300. This allows the implement 300 to perform a desired operation, or allows information to be acquired from the implement 300. The communication device 190 may further include an antenna and a communication circuit to exchange signals via the network 80 with communication devices of the terminal device 400 and the management device 600. The network 80 may include a 3G, 4G, 5G, or any other cellular mobile communications network and the Internet, for example. The communication device 190 may have a function of communicating with a mobile terminal that is used by a supervisor who is situated near the agricultural machine 100. With such a mobile terminal, communication may be performed based on any arbitrary wireless communication standard, e.g., Wi-Fi (registered trademark), 3G, 4G, 5G or any other cellular mobile communication standard, or Bluetooth (registered trademark).

The operational terminal 200 is a terminal for the user to perform a manipulation related to the travel of the agricultural machine 100 and the operation of the implement 300, and is also referred to as a virtual terminal (VT). The operational terminal 200 may include a display device such as a touch screen panel, and/or one or more buttons. The display device may be a display such as a liquid crystal display or an organic light-emitting diode (OLED) display, for example. By manipulating the operational terminal 200, the user can perform various manipulations, such as, for example, switching ON/OFF the self-driving mode, recording or editing an environment map, setting a target path, and switching ON/OFF the implement 300. At least a portion of these manipulations may also be realized by manipulating the operation switches 210. The operational terminal 200 may be configured so as to be detachable from the agricultural machine 100. A user who is at a remote place from the agricultural machine 100 may manipulate the detached operational terminal 200 to control the operation of the agricultural machine 100. Instead of the operational terminal 200, the user may manipulate a computer on which necessary application software is installed, for example, the terminal device 400, to control the operation of the agricultural machine 100.

Figure 5:
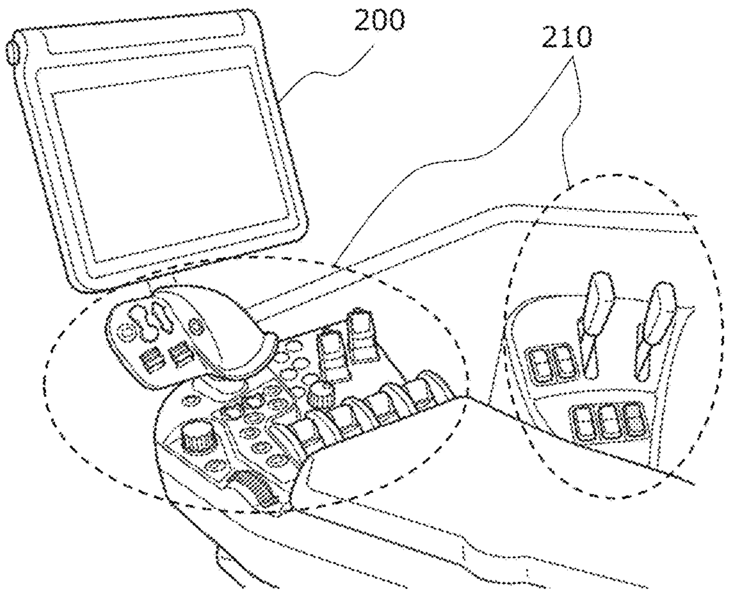
FIG. 5 is a diagram showing an example of an operational terminal and an example of operation switches disposed in a cabin.

FIG. 5 is a diagram showing an example of the operational terminal 200 and an example of the operation switches 210 both provided in the cabin 105. In the cabin 105, the switches 210, including a plurality of switches that are manipulable to the user, are disposed. The operation switches 210 may include, for example, a switch to select the gear shift as to a main gear shift or a range gear shift, a switch to switch between a self-driving mode and a manual driving mode, a switch to switch between forward travel and backward travel, a switch to raise or lower the implement 300, and the like. In the case where the agricultural machine 100 only performs unmanned driving and lacks human driving functionality, the agricultural machine 100 does not need to include the operation switches 210.

The drive device 340 in the implement 300 shown in FIG. 3 performs operations necessary for the implement 300 to perform predetermined work. The drive device 340 includes a device suitable for uses of the implement 300, for example, a hydraulic device, an electric motor, a pump or the like. The controller 380 controls the operation of the drive device 340. In response to a signal that is transmitted from the agricultural machine 100 via the communication device 390, the controller 380 causes the drive device 340 to perform various operations. Moreover, a signal that is in accordance with the state of the implement 300 can be transmitted from the communication device 390 to the agricultural machine 100.

Figure 6:
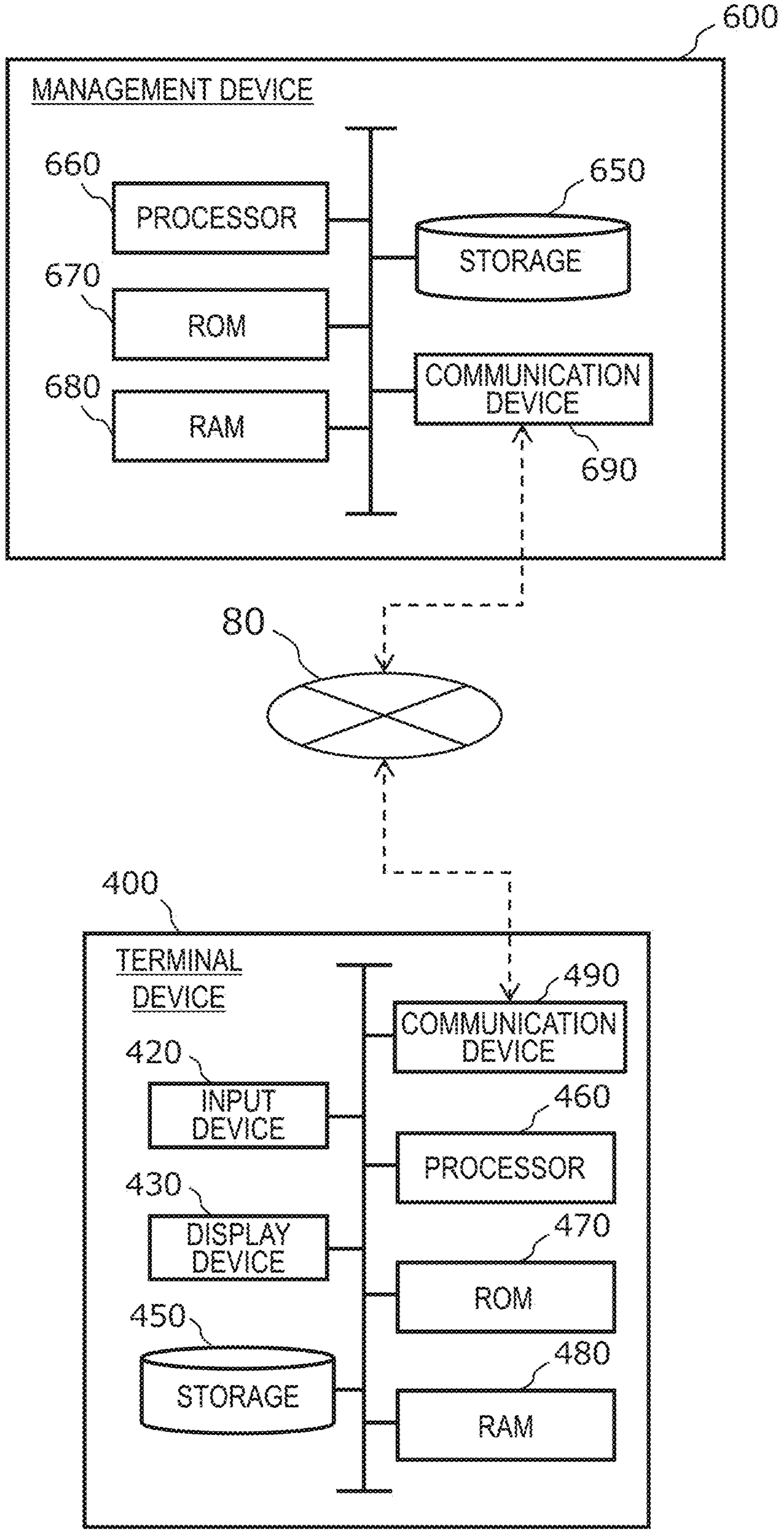
FIG. 6 is a block diagram showing an example of hardware configuration of a management device and a terminal device.

Now, a configuration of the management device 600 and the terminal device 400 will be described with reference to FIG. 6. FIG. 6 is a block diagram showing an example of schematic hardware configuration of the management device 600 and the terminal device 400.

The management device 600 includes a storage 650, a processor 660, a ROM (Read Only Memory) 670, a RAM (Random Access Memory) 680, and a communication device 690. These component elements are communicably connected to each other via a bus. The management device 600 may function as a cloud server to manage the schedule of the agricultural work to be performed by the agricultural machine 100 in a field and support agriculture by use of the data managed by the management device 600 itself. The user can input information necessary to create a work plan by use of the terminal device 400 and upload the input information to the management device 600 via the network 80. The management device 600 can create a schedule of agricultural work, that is, a work plan based on the information. The management device 600 can further generate or edit an environment map and perform global path planning for the agricultural machine 100. The environment map may be distributed from a computer external to the management device 600, instead of being generated by the management device 600.

The communication device 690 is a communication module to communicate with the agricultural machine 100 and the terminal device 400 via the network 80. The communication device 690 can perform wired communication in compliance with communication standards such as, for example, IEEE1394 (registered trademark) or Ethernet (registered trademark). The communication device 690 may perform wireless communication in compliance with Bluetooth (registered trademark) or Wi-Fi, or cellular mobile communication based on 3G, 4G, 5G or any other cellular mobile communication standard.

The processor 660 may include, for example, a semiconductor integrated circuit including a central processing unit (CPU). The processor 660 may be realized by a microprocessor or a microcontroller. Alternatively, the processor 660 may be realized by an FPGA (Field Programmable Gate Array), a GPU (Graphics Processing Unit), an ASIC (Application Specific Integrated Circuit) or an ASSP (Application Specific Standard Product) each including a CPU, or a combination of two or more selected from these circuits. The processor 660 may execute a computer program, describing commands to execute at least one process, stored in the ROM 670 and thus realizes a desired process.

The ROM 670 is, for example, a writable memory (e.g., PROM), a rewritable memory (e.g., flash memory) or a memory which can only be read from but cannot be written to. The ROM 670 stores a program to control operations of the processor 660. The ROM 670 does not need to be a single storage medium, and may be an assembly of a plurality of storage mediums. A portion of the assembly of the plurality of storage memories may be a detachable memory.

The RAM 680 provides a work area in which the control program stored in the ROM 670 is once developed at the time of boot. The RAM 680 does not need to be a single storage medium, and may be an assembly of a plurality of storage mediums.

The storage 650 mainly functions as a storage for a database. The storage 650 may be, for example, a magnetic storage or a semiconductor storage. An example of the magnetic storage is a hard disc drive (HDD). An example of the semiconductor storage is a solid state drive (SSD). The storage 650 may be a device independent from the management device 600. For example, the storage 650 may be a storage connected to the management device 600 via the network 80, for example, a cloud storage.

The terminal device 400 includes an input device 420, a display device 430, a storage 450, a processor 460, a ROM 470, a RAM 480, and a communication device 490. These component elements are communicably connected to each other via a bus. The input device 420 is a device to convert an instruction from the user into data and input the data to a computer. The input device 420 may be, for example, a keyboard, a mouse or a touch panel. The display device 430 may be, for example, a liquid crystal display or an organic EL display. The processor 460, the ROM 470, the RAM 480, the storage 450 and the communication device 490 are substantially the same as the corresponding component elements described above regarding the example of the hardware configuration of the management device 600, and will not be described in repetition.

Now, an operation of the agricultural machine 100, the terminal device 400 and the management device 600 will be described.

First, an example operation of self-traveling of the agricultural machine 100 will be described. The agricultural machine 100 according to the present example embodiment can automatically travel both inside and outside a field. Inside the field, the agricultural machine 100 drives the implement 300 to perform predetermined agricultural work while traveling along a preset target path. When detecting an obstacle by the obstacle sensors 130 thereof while traveling inside the field, the agricultural machine 100 halts traveling and performs operations of presenting an alarm sound from the buzzer 220, transmitting an alert signal to the terminal device 400 or the management device 600, and the like. Inside the field, the positioning of the agricultural machine 100 is performed based mainly on data output from the GNSS unit 110. Meanwhile, outside the field, the agricultural machine 100 automatically travels along a target path set for an agricultural road or a general road outside the field. While traveling outside the field, the agricultural machine 100 generates a local path based on data acquired by the cameras 120 or the LiDAR 140. When an obstacle is detected outside the field, the agricultural machine 100 avoids the obstacle or halts at the point. Outside the field, the position of the agricultural machine 100 is estimated based on data output from the LiDAR sensor 140 or the cameras 120 in addition to positioning data output from the GNSS unit 110.

Hereinafter, an operation of the agricultural machine 100 performing self-traveling inside the field will be described. An operation of the agricultural machine 100 performing self-traveling outside the field and a process of global path planning and local path planning outside the field will be described later.

Figure 7:
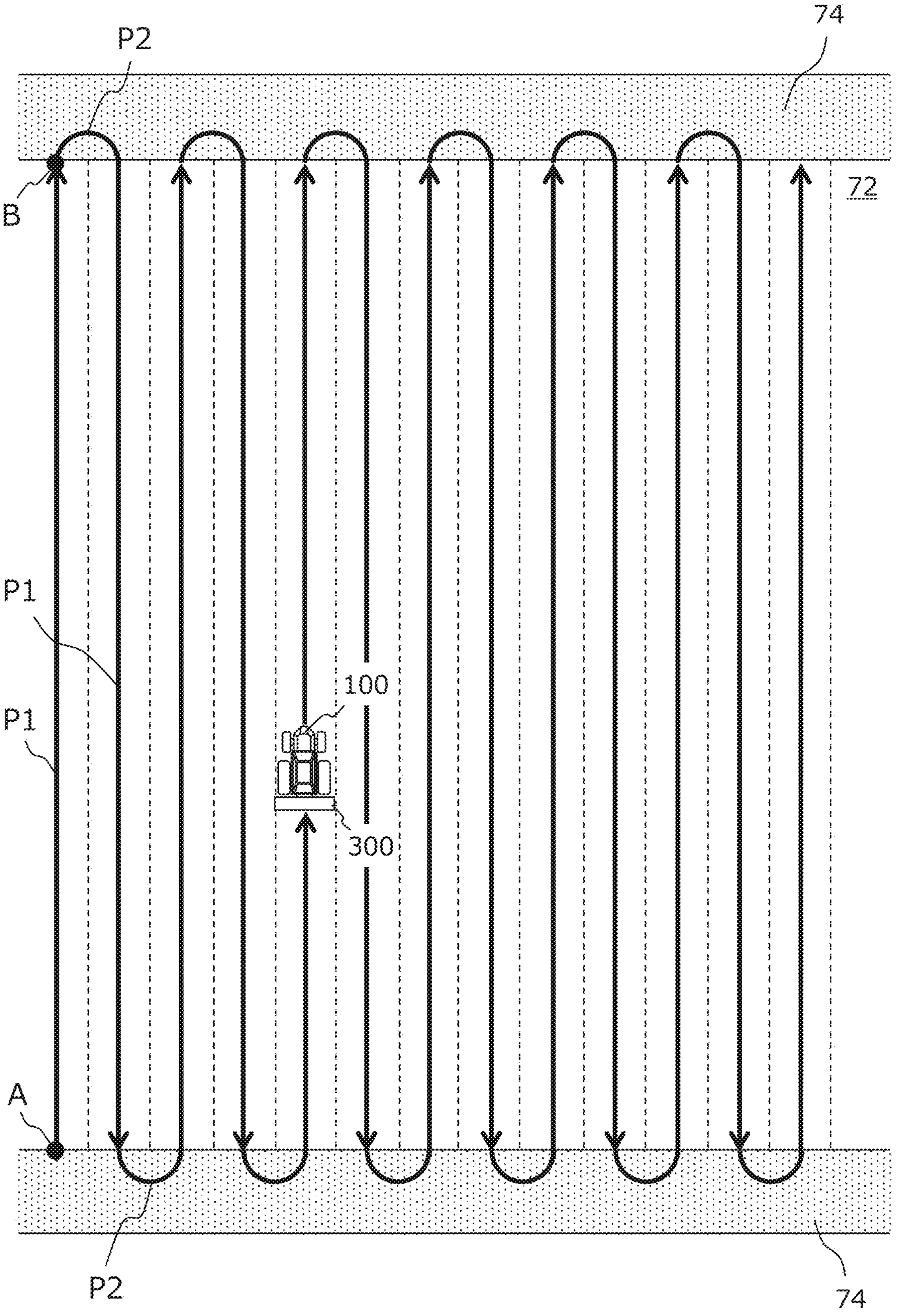
FIG. 7 is a diagram schematically showing an example of the work vehicle automatically traveling along a target path inside a field.

FIG. 7 is a diagram schematically showing an example of the agricultural machine 100 automatically traveling along a target path in a field. In this example, the field includes a work area 72, in which the agricultural machine 100 performs work by using the implement 300, and headlands 74, which are located near outer edges of the field. The user may previously specify which regions of the field on the map would correspond to the work area 72 and the headlands 74. The target path in this example includes a plurality of main paths P1 parallel to each other and a plurality of turning paths P2 interconnecting the plurality of main paths P1. The main paths P1 are located in the work area 72, whereas the turning paths P2 are located in the headlands 74. Although each of the main paths P1 in FIG. 7 is illustrated as a linear path, each main path P1 may also include a curved portion(s). The main paths P1 may be automatically generated by, for example, the user performing a manipulation of designating two points in the vicinity of ends of the field (points A and B in FIG. 7) while looking at the map of the field displayed on the display screen of the operational terminal 200 or the terminal device 400. In this case, the management device 600 sets the plurality of main paths P1 parallel to a line segment connecting the point A and the point B designated by the user and connects the main paths P1 to each other with the turning paths P2 to generate the target path inside the field. Broken lines in FIG. 7 depict the working breadth of the implement 300. The working breadth may be set and recorded by the user manipulating the operational terminal 200 or the terminal device 400. Alternatively, the working breadth may be automatically recognized and recorded when the implement 300 is connected to the agricultural machine 100. The interval between the plurality of main paths P1 may be set so as to be matched to the working breadth. As can be seen, the target path may be generated based on the manipulation made by the user, before self-driving is begun. The target path may be generated so as to cover the entire work area 72 in the field, for example. Along the target path shown in FIG. 7, the agricultural machine 100 automatically travels while repeating a reciprocating motion from a beginning point of work to an ending point of work. Note that the target path shown in FIG. 7 is merely an example, and the target path may be arbitrarily determined.

Now, an example control by the controller 180 during self-driving inside the field will be described.

Figure 8:
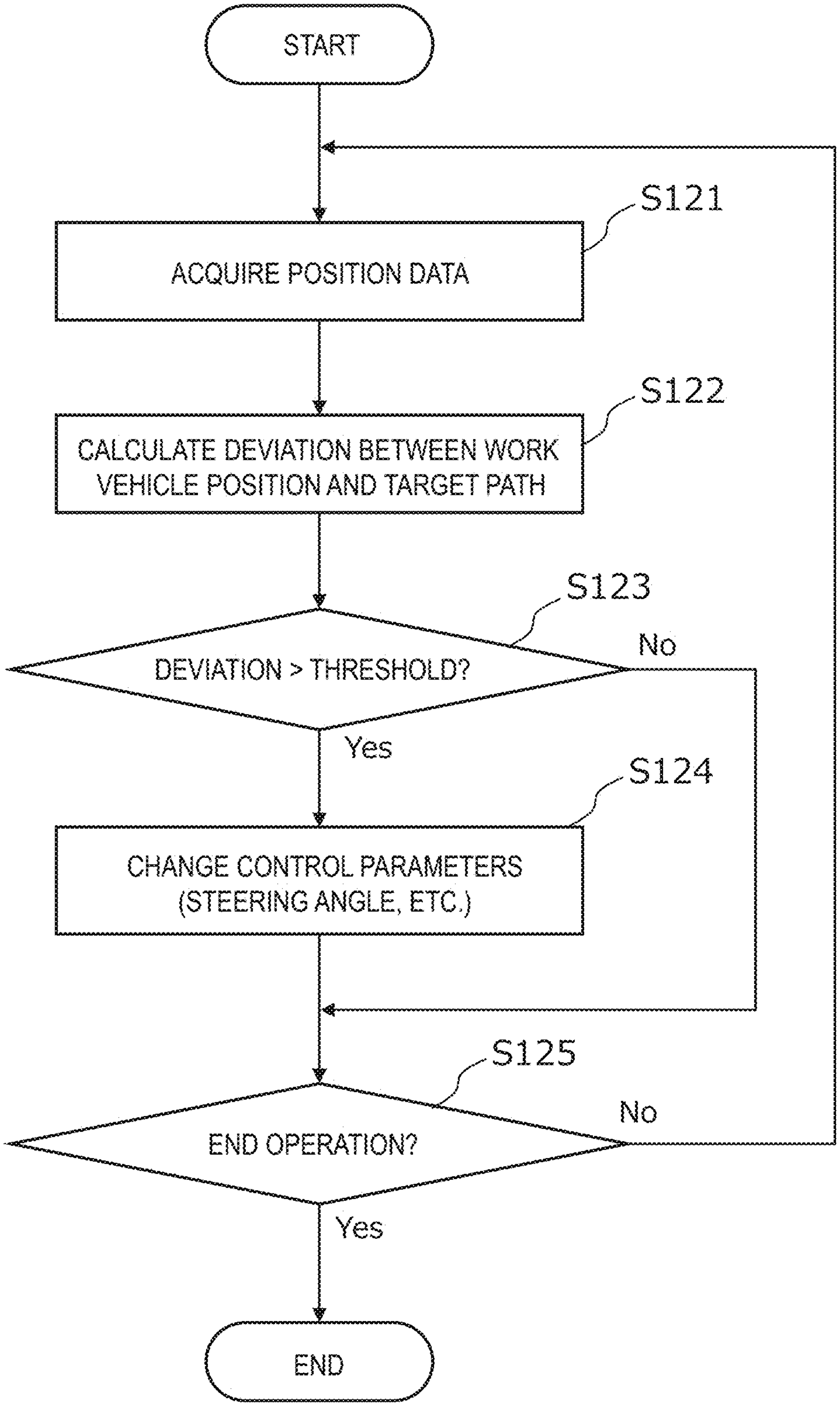
FIG. 8 is a flowchart showing an example operation of steering control during self-driving.

FIG. 8 is a flowchart showing an example operation of steering control to be performed by the controller 180 during self-driving. During travel of the agricultural machine 100, the controller 180 performs automatic steering by performing the operation from steps S121 to S125 shown in FIG. 8. The speed of the agricultural machine 100 will be maintained at a previously-set speed, for example. First, during travel of the agricultural machine 100, the controller 180 acquires data representing the position of the agricultural machine 100 that is generated by the GNSS unit 110 (step S121). Next, the controller 180 calculates a deviation between the position of the agricultural machine 100 and the target path (step S122). The deviation represents the distance between the position of the agricultural machine 100 and the target path at that moment. The controller 180 determines whether the calculated deviation in position exceeds the previously-set threshold or not (step S123). If the deviation exceeds the threshold, the controller 180 changes a control parameter of the steering device included in the drive device 240 so as to reduce the deviation, thus changing the steering angle (step S124). If the deviation does not exceed the threshold at step S123, the operation of step S124 is omitted. At the following step S125, the controller 180 determines whether a command to end the operation has been received or not. The command to end the operation may be given when the user has instructed that self-driving be suspended through remote operation, or when agricultural machine 100 has arrived at the destination, for example. If the command to end the operation has not been given, the control returns to step S121 and the controller 180 performs substantially the same operation based on a newly measured position of the agricultural machine 100. The controller 180 repeats the operation from steps S121 to S125 until a command to end the operation is given. The aforementioned operation is executed by the ECUs 182 and 184 in the controller 180.

In the example shown in FIG. 8, the controller 180 controls the drive device 240 based only on the deviation between the position of the agricultural machine 100 as identified by the GNSS unit 110 and the target path. Alternatively, a deviation in terms of directions may further be considered in the control. For example, when a directional deviation exceeds a previously-set threshold, where the directional deviation is an angle difference between the orientation of the agricultural machine 100 as identified by the GNSS unit 110 and the direction of the target path, the controller 180 may change the control parameter of the steering device of the drive device 240 (e.g., steering angle) in accordance with the deviation.

Hereinafter, with reference to FIGS. 9A to 9D, an example of steering control by the controller 180 will be described more specifically.

Figure 9A:
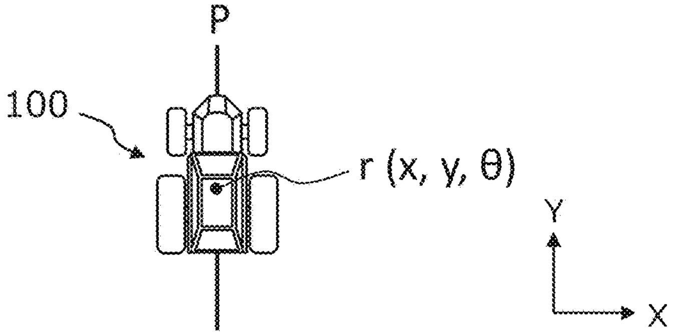
FIG. 9A is a diagram showing an example of the work vehicle traveling along a target path P.
Figure 9B:
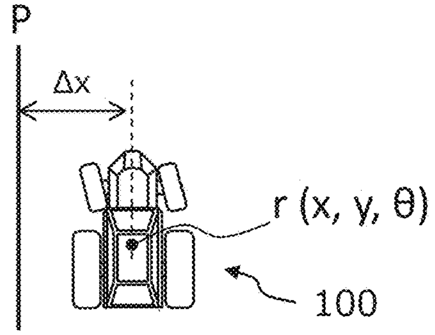
FIG. 9B is a diagram showing an example of the work vehicle at a position which is shifted rightward from the target path P.
Figure 9C:
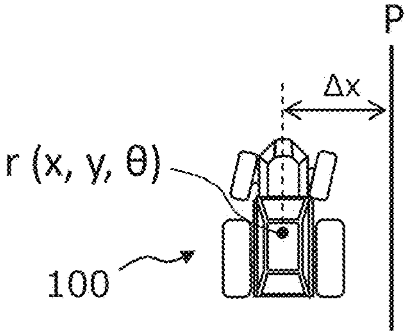
FIG. 9C is a diagram showing an example of the work vehicle at a position which is shifted leftward from the target path P.
Figure 9D:
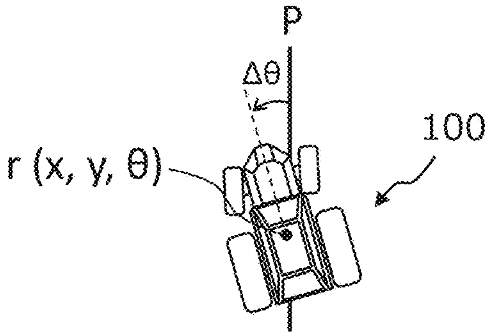
FIG. 9D is a diagram showing an example of the work vehicle oriented in an inclined direction with respect to the target path P.

FIG. 9A is a diagram showing an example of the agricultural machine 100 traveling along a target path P. FIG. 9B is a diagram showing an example of the agricultural machine 100 at a position which is shifted rightward from the target path P. FIG. 9C is a diagram showing an example of the agricultural machine 100 at a position which is shifted leftward from the target path P. FIG. 9D is a diagram showing an example of the agricultural machine 100 oriented in an inclined direction with respect to the target path P. In these figures, the pose, i.e., the position and orientation, of the agricultural machine 100 as measured by the GNSS unit 110 is expressed as r (x, y, θ). Herein, (x, y) are coordinates representing the position of a reference point on the agricultural machine 100 in an XY coordinate system, which is a two-dimensional coordinate system fixed to the globe. In the examples shown in FIGS. 9A to 9D, the reference point on the agricultural machine 100 is at a position, on the cabin, where a GNSS antenna is disposed, but the reference point may be at any arbitrary position. θ is an angle representing the measured orientation of the agricultural machine 100. Although the target path P is shown parallel to the Y axis in the examples illustrated in these figures, the target path P may not necessarily be parallel to the Y axis, in general.

As shown in FIG. 9A, in the case where the position and orientation of the agricultural machine 100 are not deviated from the target path P, the controller 180 maintains the steering angle and speed of the agricultural machine 100 without changing them.

As shown in FIG. 9B, when the position of the agricultural machine 100 is shifted rightward from the target path P, the controller 180 changes the steering angle so that the traveling direction of the agricultural machine 100 will be inclined leftward, thus bringing the agricultural machine 100 closer to the path P. At this point, not only the steering angle but also the speed may be changed. The magnitude of the steering angle may be adjusted in accordance with the magnitude of a positional deviation Δx, for example.

As shown in FIG. 9C, when the position of the agricultural machine 100 is shifted leftward from the target path P, the controller 180 changes the steering angle so that the traveling direction of the agricultural machine 100 will be inclined rightward, thus bringing the agricultural machine 100 closer to the path P. In this case, too, not only the steering angle but also the speed may be changed. The amount of change of the steering angle may be adjusted in accordance with the magnitude of the positional deviation Δx, for example.

As shown in FIG. 9D, in the case where the position of the agricultural machine 100 is not considerably deviated from the target path P but its orientation is nonetheless different from the direction of the target path P, the controller 180 changes the steering angle so that the directional deviation 40 will become smaller. In this case, too, not only the steering angle but also the speed may be changed. The magnitude of the steering angle may be adjusted in accordance with the magnitudes of the positional deviation Δx and the directional deviation 40, for example. For instance, the amount of change of the steering angle (which is in accordance with the directional deviation 40) may be increased as the absolute value of the positional deviation Δx decreases. When the positional deviation Δx has a large absolute value, the steering angle will be changed greatly in order for the agricultural machine 100 to return to the path P, so that the directional deviation 40 will inevitably have a large absolute value. Conversely, when the positional deviation Δx has a small absolute value, the directional deviation 40 needs to become closer to zero. Therefore, it may be advantageous to introduce a relatively large weight (i.e., control gain) for the directional deviation 40 in determining the steering angle.

For the steering control and speed control of the agricultural machine 100, control techniques such as PID control or MPC (Model Predictive Control) may be applied. Applying these control techniques will make for smoothness of the control of bringing the agricultural machine 100 closer to the target path P.

Note that, when an obstacle is detected by one or more obstacle sensors 130 during travel, the controller 180 halts the agricultural machine 100. At this point, the controller 180 may cause the buzzer 220 to present an alarm sound or may transmit an alert signal to the terminal device 400 or the management device 600. In the case where the obstacle is avoidable, the controller 180 may control the drive device 240 such that the obstacle is avoided.

The agricultural machine 100 according to the present example embodiment can perform self-traveling outside a field as well as inside the field. Outside the field, the controller 180 is able to detect an object located at a relatively distant position from the agricultural machine 100 (e.g., another vehicle, a pedestrian, etc.) based on data output from the cameras 120 or the LiDAR sensor 140. The controller 180 generates a local path such that the local path avoids the detected object, and performs speed control and steering control along the local path. In this manner, self-traveling on a road outside the field can be realized.

Figure 10:
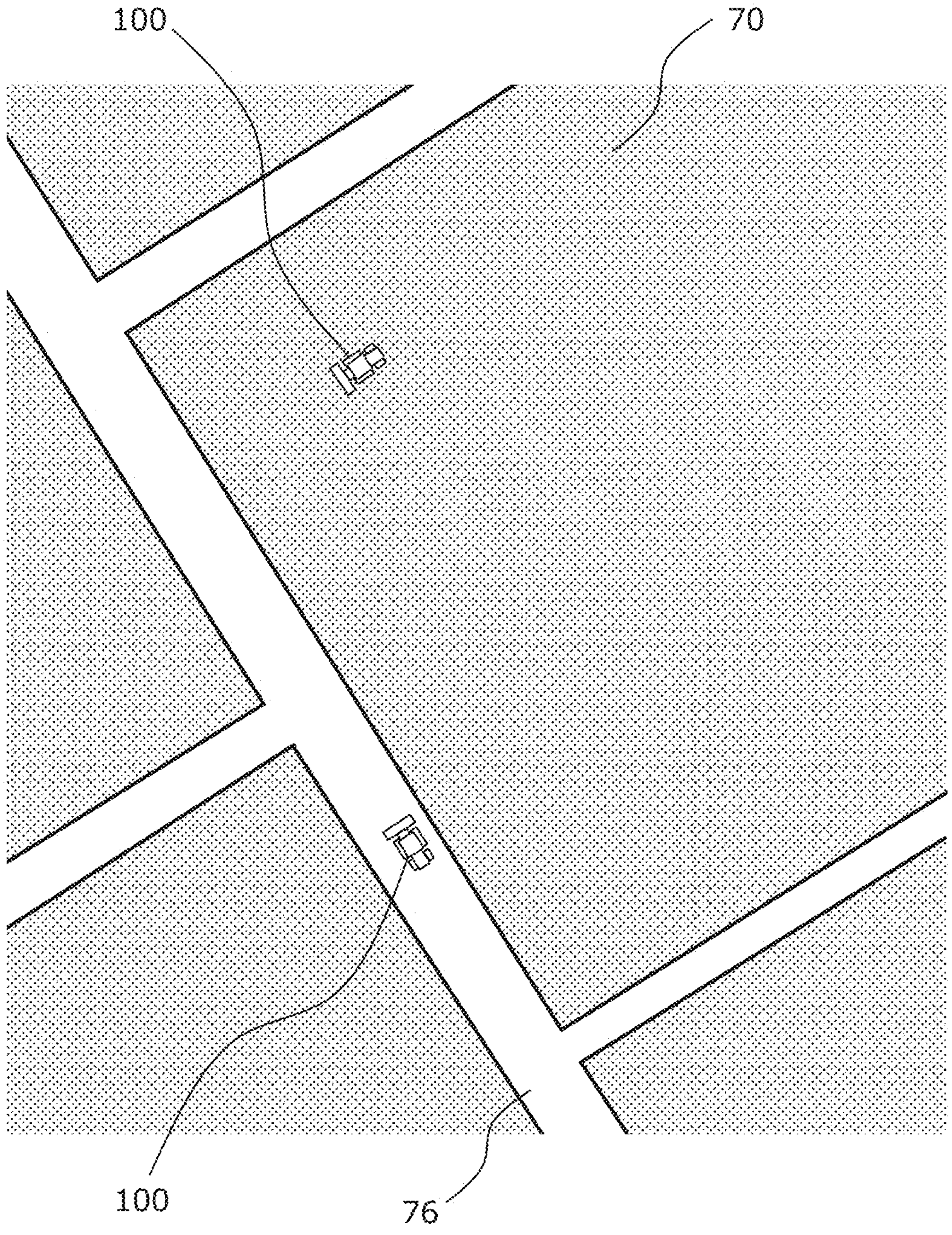
FIG. 10 is a diagram schematically showing an example of state where a plurality of the work vehicles perform self-traveling inside a field and on a road outside the field.

As described above, the agricultural machine 100 according to the present example embodiment can automatically travel inside the field and outside the field in an unmanned manner. FIG. 10 is a diagram schematically showing an example of state where a plurality of the agricultural machines 100 are performing self-traveling inside a field 70 and on a road 76 outside the field 70. In the storage 170, an environment map of a region including a plurality of fields and roads around the fields, and a target path, are recorded. The environment map and the target path may be generated by the management device 600 or the ECU 185. In the case of traveling on a road, the agricultural machine 100 travels along the target path while sensing the surroundings thereof by use of the sensing devices such as the cameras 120 and the LiDAR sensor 140, with the implement 300 being raised. During travel, the controller 180 consecutively generates a local path and causes the agricultural machine 100 to travel along the local path. This allows the agricultural machine 100 to perform self-traveling while avoiding obstacles. During travel, the target path may be changed in accordance with the state.

The agricultural machine 100 according to the present example embodiment automatically moves between the fields and performs agricultural work in each of the fields in accordance with a work plan created by the management device 600. The work plan includes information on one or more tasks of agricultural work to be performed by the agricultural machine 100. For example, the work plan includes information on one or more tasks of agricultural work to be performed by the agricultural machine 100 and on the field where each task is to be performed. The work plan may include information on a plurality of tasks of agricultural work to be performed by the agricultural machine 100 over a plurality of working days and on the field where each task of agricultural work is to be performed. More specifically, the work plan may be a database including information on a work schedule indicating which agricultural machine is to perform which task of agricultural work in which field at which point of time for each working day. Hereinafter, an example case where the work plan is data of such a work schedule will be described. The work plan may be created by the processor 660 of the management device 600 based on information input by the user to the terminal device 400. Hereinafter, an example of a non-limiting example of a method for creating the work schedule will be described.

Figure 11:
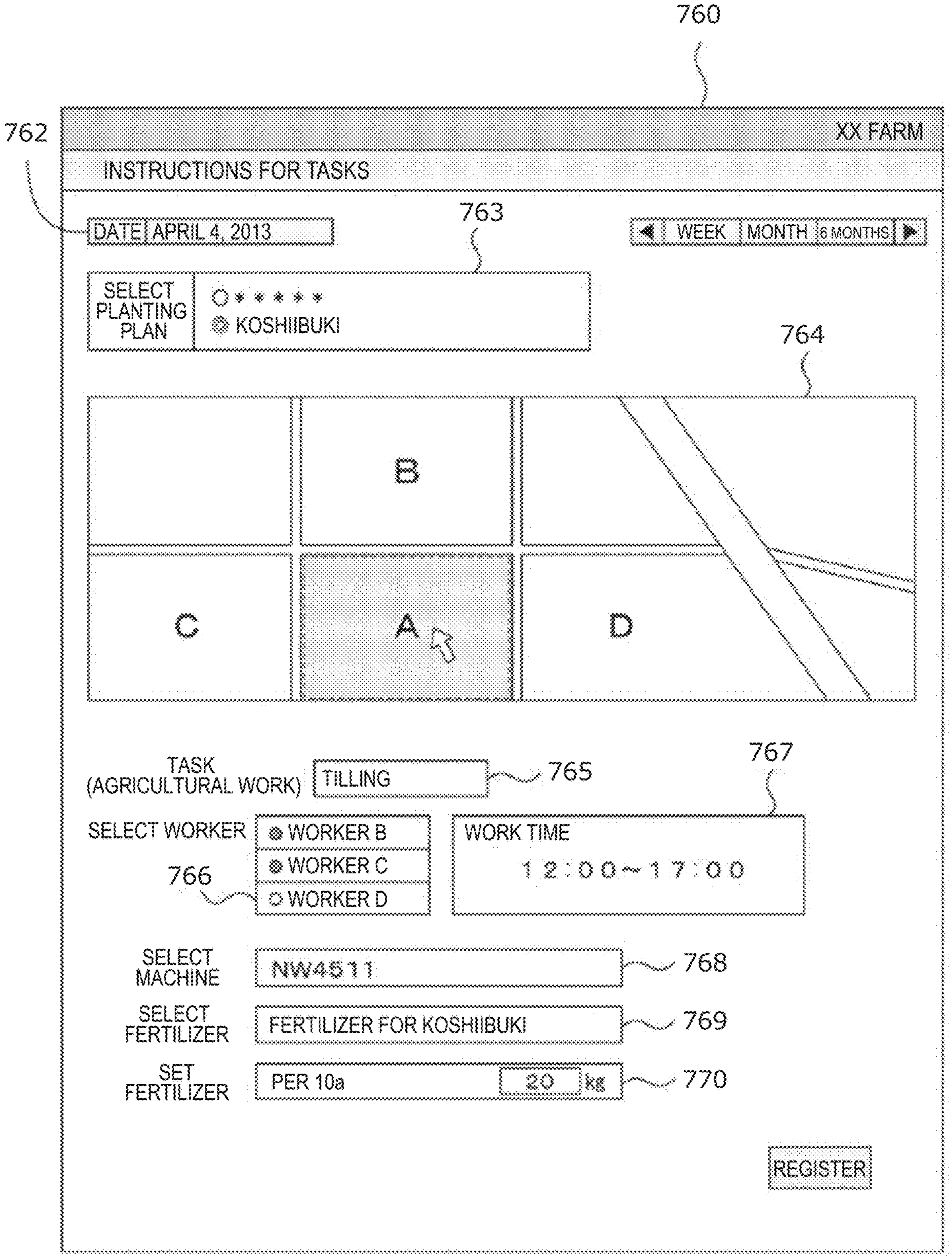
FIG. 11 is a diagram showing an example of setting screen displayed on the terminal device.

FIG. 11 is a diagram showing an example of setting screen 760 displayed on the display device 430 of the terminal device 400. In response to a manipulation performed by the user by use of the input device 420, the processor 460 of the terminal device 400 activates application software for schedule creation to cause the display device 430 to display the setting screen 760 as shown in FIG. 11. The user can input information necessary to create a work schedule on the setting screen 760.

FIG. 11 shows an example of the setting screen 760 in the case where tilling accompanied by spraying of a fertilizer is to be performed as the agricultural work in a field for rice farming. The setting screen 760 is not limited to the one shown in the figure, and may be changed when necessary. The setting screen 760 in the example of FIG. 11 includes a date setter 762, a planting plan selector 763, a field selector 764, a work selector 765, a worker selector 766, a time setter 767, a machine selector 768, a fertilizer selector 769, and a spray amount setter 770.

The date setter 762 displays a date input by the input device 420. The input date is set as the day when the agricultural work is to be performed.

The planting plan selector 763 displays a list of names of planting plans created previously. The user can select a desired planting plan from the list. The planting plan is created previously for each of types or each of breeds of crops, and is recorded in the storage 650 of the management device 600. The planting plan is a plan regarding which crop is to be planted (seeded) in which field. The planting plan is created by, for example, a manager managing a plurality of fields before the crop is planted in one of the fields. In the example of FIG. 11, a planting plan for rice breed "KOSHIIBUKI" is selected. In this case, the contents set by the setting screen 760 are associated with the planting plan of "KOSHIIBUKI".

The field selector 764 displays the fields in the map. The user can select any field from the fields displayed. In the example of FIG. 11, an area indicating "field A" is selected. In this case, the selected "field A" is set as the field where the agricultural work is to be performed.

The work selector 765 displays a plurality of types of agricultural work necessary to grow the selected crop. The user can select one type of agricultural work from the plurality of types of agricultural work. In the example of FIG. 11, "tilling" is selected from the plurality of types of agricultural work. In this case, the selected "tilling" is set as the agricultural work to be performed.

The worker selector 766 displays workers registered previously. The user can select one or more workers from the plurality of workers displayed. In the example of FIG. 11, "worker B" and "worker C" are selected from the plurality of workers. In this case the "worker B" and the "worker C" selected are set as the workers in charge of performing or managing the agricultural work. In the present example embodiment, the agricultural machine performs agricultural work automatically. Therefore, the workers do not need to actually perform the agricultural work, and may merely remotely monitor the agricultural work performed by the agricultural machine.

The time setter 767 displays a work time period input by the input device 420. The work time period is specified by a point of time to begin the agricultural work and a point of time to end the agricultural work. The input work time period is set as the time period in which the agricultural work is scheduled to be performed.

The machine selector 768 is used to set the agricultural machine to be used for the agricultural work. The machine selector 768 may display, for example, the types or models of the agricultural machines previously registered by the management device 600 and the types, models, etc. of usable implements. The user can select a specific machine from the machines displayed. In the example of FIG. 11, the implement of model "NW4511" is selected. In this case, this implement is set as the machine to be used for the agricultural work.

The fertilizer selector 769 displays names of plurality of fertilizers registered by the management device 600 previously. The user can select a specific fertilizer from the plurality of fertilizers displayed. The selected fertilizer is set as the fertilizer to be used for the agricultural work.

The spray amount setter 770 displays a numerical value input by the input device 420. The input numerical value is set as the spray amount.

When the planting plan, the field, the agricultural work, the worker, the work time period, the fertilizer and the spray amount are input to the setting screen 760 and "register" is selected, the communication device 490 of the terminal device 400 transmits the input information to the management device 600. The processor 660 of the management device 600 causes the storage 650 to store the received information. Based on the received information, the processor 660 creates a schedule of the agricultural work to be performed by each agricultural machine and causes the storage 650 to store the schedule.

Note that the information on the agricultural work to be managed by the managing device 600 is not limited to the above-described information. For example, the type and the spray amount of the agricultural chemical to be used in the field may be set by the setting screen 760. Information on agricultural work other than the types of agricultural work shown in FIG. 11 may be set by the setting screen 760.

FIG. 12 is a table showing an example of schedule of agricultural work created by the management device 600. The schedule in this example includes information representing the date and time of the agricultural work, the field for the agricultural work, the contents of the work, and the implement to be used, for each of the registered agricultural machines. The schedule may include, in addition to the information shown in FIG. 12, other information in accordance with the contents of work, for example, information on the types of agricultural chemicals or the spray amounts of the agricultural chemicals. The processor 660 of the management device 600 instructs the agricultural machine 100 to perform the agricultural work in accordance with such a schedule. The schedule may be downloaded by the controller 180 of the agricultural machine 100 and may also stored in the storage 170. In this case, the controller 180 may spontaneously begin the operation in accordance with the schedule stored in the storage 170.

In the present example embodiment, the work plan is created by the management device 600. The work plan may be created by another device. For example, the processor 460 of the terminal device 400 or the controller 180 of the agricultural machine 100 may have a function of creating or updating the work plan.

Now, an operation of path planning according to the present example embodiment will be described in more detail.

The management device 600 according to the present example embodiment functions as a path planning system for the agricultural machine 100. The storage 650 stores a map including a plurality of fields, a plurality of waiting areas, and a road connecting the plurality of fields and the plurality of waiting areas to each other. The processor 660 of the management device 600 is configured or programmed to function as a processor that generates a path for the agricultural machine 100 (the global path described above) on the map. The management device 600 generates a path for the agricultural machine 100 for each of working days, based on a work plan. The management device 600, for example, generates a path between fields and a path connecting a field and a waiting area for each working day, in accordance with the schedule of the agricultural work indicated by the work plan for each working day.

Figure 13:
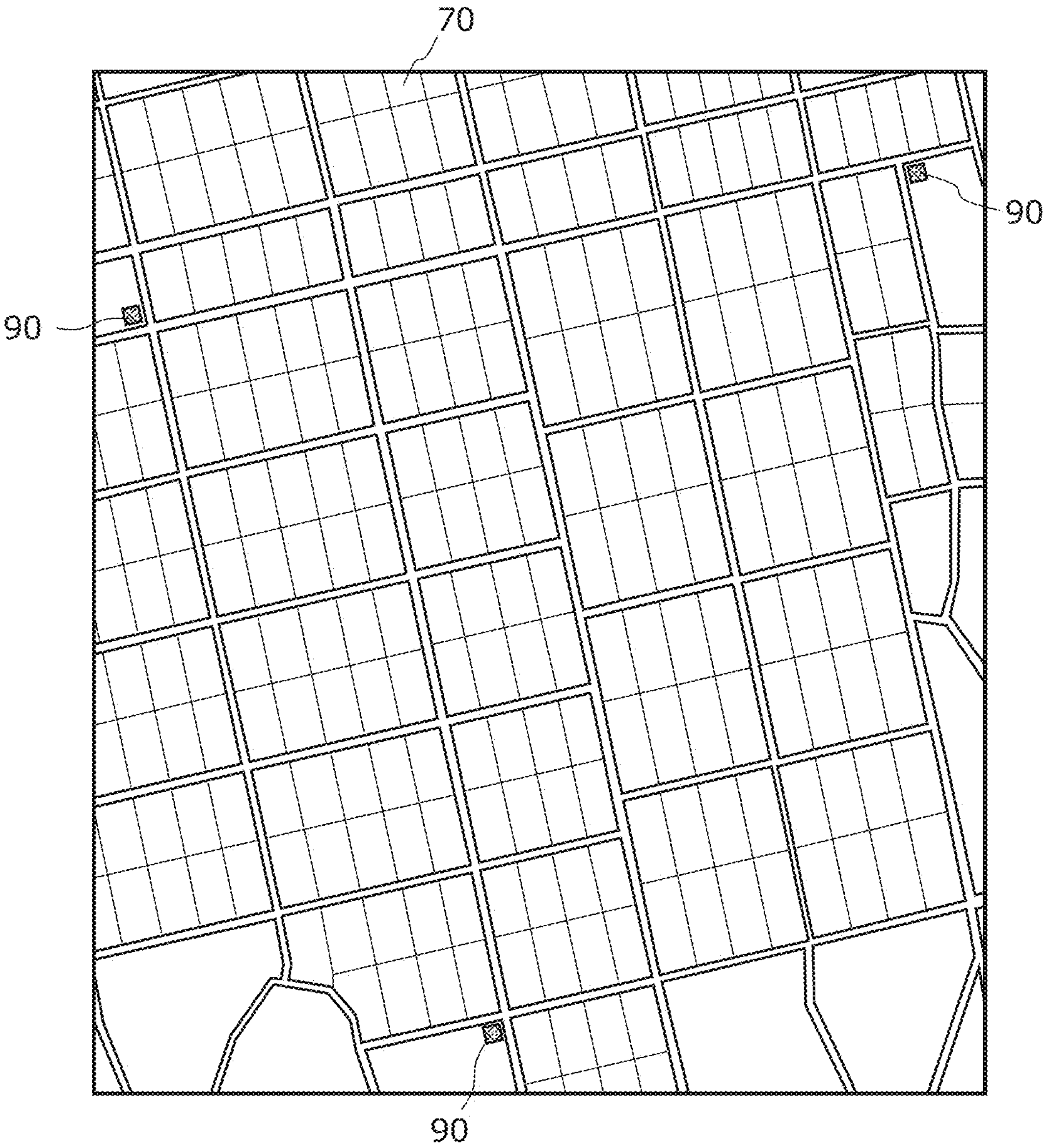
FIG. 13 is a diagram showing an example of map that is referred to at the time of path planning.

FIG. 13 is a diagram showing an example of map that is referred to at the time of path planning. This map is a two-dimensional digital map, and may be created or updated by the management device 600 or another device. The map shown in FIG. 13 includes information on the position of each of points (e.g., the latitude and the longitude of each of the points) in a plurality of fields 70 where the agricultural machine 100 is to perform agricultural work and roads 76 around the fields 70. This map further includes positional information on a plurality of waiting areas 90, where the agricultural machine 100 may wait temporarily. The waiting areas 90 are previously registered by a manager of the agriculture management system and recorded in the storage 650. The map as shown in FIG. 13 may be created for the entirety of a district where the agricultural machine 100 may travel. Note that the map shown in FIG. 13 is a two-dimensional map, but a three-dimensional map may be used for the path planning.

The waiting areas 90 may each be, for example, a site that is used jointly by a plurality of agricultural machines. The waiting areas 90 may each be, for example, a facility such as a parking area or a garage managed or run by a business operator running the agriculture management system, an agricultural cooperative or a regional government of a city, a town or a village. In the case where the waiting area 90 is a facility locked at nighttime, the agricultural machine waiting in the waiting area 90 can be prevented from being robbed. A portion of either one of the fields may be used as the waiting area 90. FIG. 13 shows three waiting areas 90 as an example, but two, or four or more, waiting areas 90 may be provided.

Before the agricultural work begins on each of the working days, the management device 600 reads, from the storage 650, a map of a region including the field(s) where the agricultural work is to be scheduled on that particular working day, and generates a path (global path) for the agricultural machine 100 based on the map.

Figure 14:
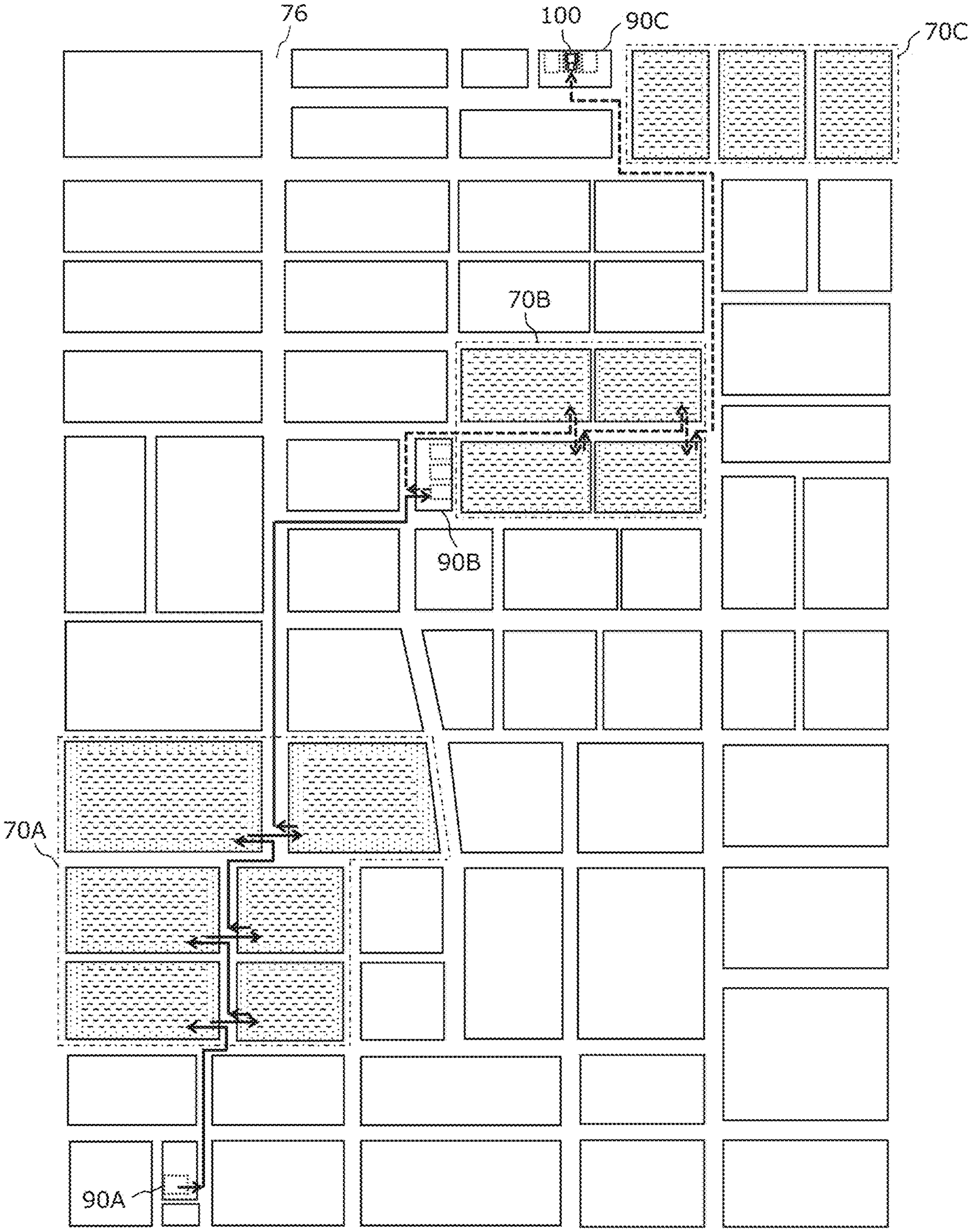
FIG. 14 is a diagram showing an example of global path.

FIG. 14 is a diagram showing an example of global path to be generated. FIG. 14 shows, as an example, a field group 70A, where the agricultural work is to be performed on one working day, a field group 70B, where the agricultural work is to be performed on the next working day, and a field group 70C, where the agricultural work is to be performed on the working day after the next working day. FIG. 14 also shows, as an example, three waiting areas 90A, 90B and 90C, where the agricultural machine 100 may wait. In FIG. 14, the field group 70A and the waiting area 90A, the field group 70B and the waiting area 90B, and the field group 70C and the waiting area 90C, are shown as being relatively close to each other for the sake of convenience. In actuality, the distances between the field group 70A and the waiting area 90A, the field group 70B and the waiting area 90B, and the field group 70C and the waiting area 90C, may be long, for example, about 500 m to about 10 km or even longer.

In FIG. 14, paths, among the paths generated by the management device 600, which are generated on the roads 76 are represented by arrows. Paths generated inside the fields are not shown. The paths inside the fields are generated separately from the paths outside the fields as described above with reference to FIG. 7. The management device 600 connects the paths outside the fields and the paths inside the fields to each other and thus generates an overall global path. In FIG. 14, solid line arrows represent an example of paths for the agricultural machine 100 on one working day. Broken line arrows represent an example of paths for the agricultural machine 100 on the next working day.

In the example shown in FIG. 14, the management device 600 generates, as a path for one working day, a path along which the agricultural machine 100 departs from the waiting area 90, sequentially passes the fields in the field group 70A and reaches the waiting area 90B. This is because the waiting area 90B is the waiting area closest to the field group 70B, where the agricultural work is scheduled to be performed on the next working day. The management device 600 generates, as a path for the next working day, a path along which the agricultural machine 100 departs from the waiting area 90B, sequentially passes the fields in the field group 70B and reaches the waiting area 90C. This is because the waiting area 90C is the waiting area closest to the field group 70C, where the agricultural work is scheduled to be performed on the working day after the next working day. In this manner, the management device 600 generates a path from the field where a final task of agricultural work is to be performed on each working day, to the waiting area located at the shortest average distance from the group of fields where the agricultural work is to be performed on the next working day. The agricultural machine 100 travels along the generated path.

In the example shown in FIG. 14, on one working day, the agricultural machine 100 departs from the waiting area 90A, sequentially visits the fields in the field group 70A, where the agricultural work is scheduled to be performed on the day, and performs the agricultural work indicated by the schedule in each field. In each field, the agricultural machine 100 performs the agricultural work while performing self-traveling along the tasked travel path by, for example, the method described above with reference to FIG. 7 to FIG. 9D. When finishing the agricultural work in one field, the agricultural machine 100 enters the next field, and performs the agricultural work in substantially the same manner. The agricultural machine 100 operates in this manner, and when finishing the agricultural work in the field assigned to the final task of agricultural work for the day, the agricultural machine 100 moves to the waiting area 90B. The agricultural machine 100 waits at the waiting area 90B until the next working day. On the next working day, the agricultural machine 100 departs from the waiting area 90B, sequentially visits the fields in the field group 70B, where the agricultural work is scheduled to be performed on the day, and performs the agricultural work indicated by the schedule in each field. When finishing the agricultural work in the field assigned to the final task of agricultural work for the day, the agricultural machine 100 moves to the waiting area 90C. The agricultural machine 100 waits at the waiting area 90C until the working day after the next working day. On the working day after the next working day, the agricultural machine 100 departs from the waiting area 90C, sequentially performs the agricultural work in the fields in the field group 70C, and then moves to a predetermined waiting area in substantially the same manner. With such an operation, the agricultural machine 100 is moved efficiently along an optimal path in accordance with the schedule, so that the scheduled agricultural work can be completed. As in this example, a plurality of waiting areas are provided, so that the time and the amount of consumption of the fuel required to move the agricultural machine 100 can be decreased as compared with in the case where the agricultural machine 100 returns to the same site (e.g., the repository) each day. As a result, a series of tasks of agricultural work over a plurality of working days can be performed more efficiently.

Figure 15:
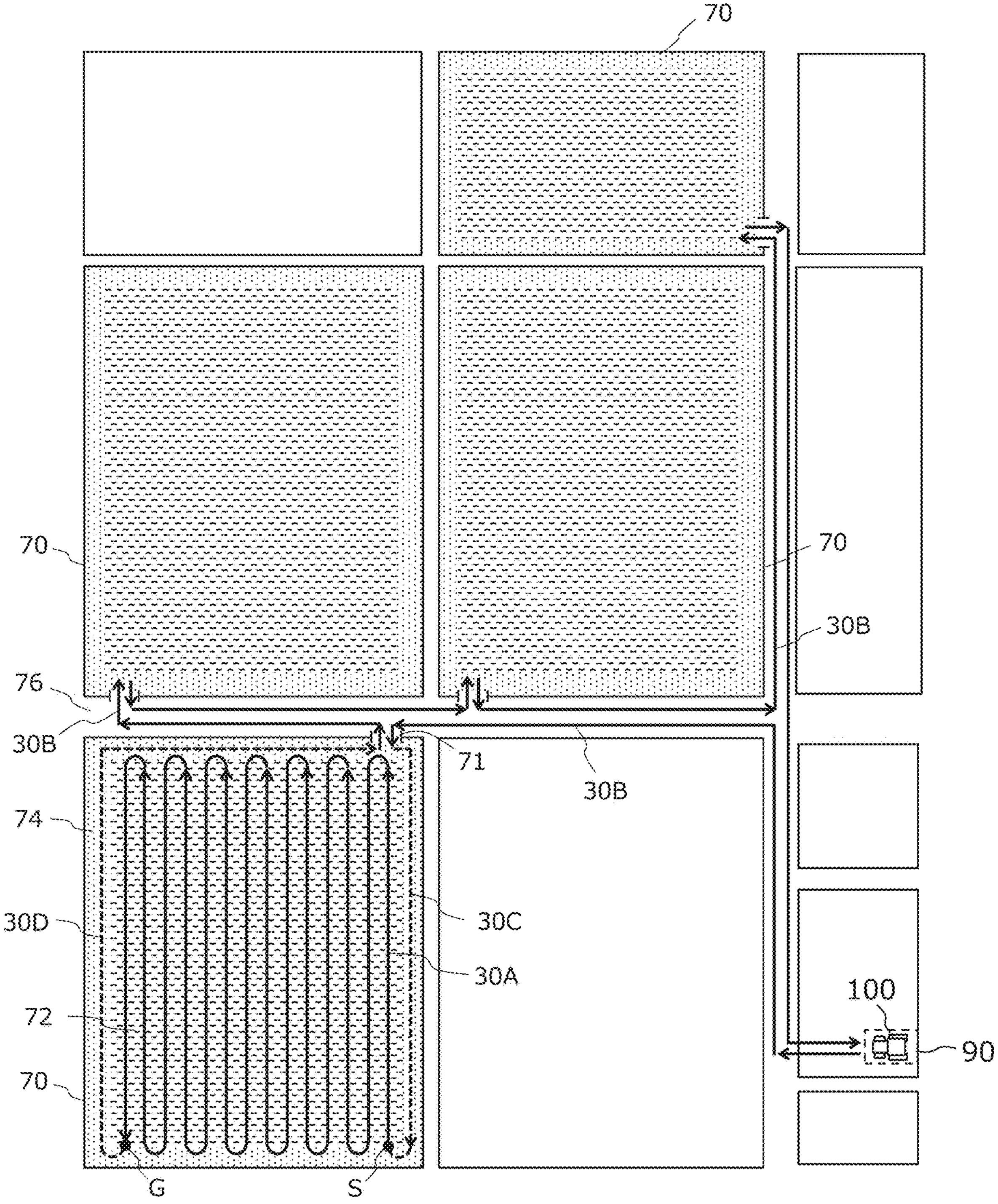
FIG. 15 is a diagram showing another example of global path.

Now, with reference to FIG. 15, an example of a non-limiting example of a method to generate a global path will be described in more detail. FIG. 15 is a diagram showing an example of global path to be generated on one working day. In this example, the management device 600 generates a path along which the agricultural machine 100 departs from the waiting area 90, passes four fields 70, and returns to the waiting area 90. The management device 600 generates a first path 30A inside each of the fields 70, and generates second paths 30B on the roads 76 around the fields 70. In FIG. 15, the first path 30A is shown only inside the left bottom field 70, and the first paths inside the other fields 70 are omitted.

The management device 600 generates the first path 30A as represented by the solid line arrows in FIG. 15, inside each of the fields 70 on the map. The management device 600 generates the first path 30A based on the settings previously made by the user as described above with reference to FIG. 7. The first path 30A may be generated so as to cover the entirety of the work area 72 by repeating a reciprocating motion from a beginning point S to an ending point G. The interval between rows of the first path 30A may be determined in consideration of the width and the turning performance of each of the agricultural machine 100 and the implement 300. The management device 600 generates the first path 30A inside the field 70 based on the information on the registered field 70. For example, the management device 600 generates the first path 30A based on the information on the external shape and the area size of the registered field 70, the ranges of the work area 73 and the headland 74 set by the user, and the like. The first path 30A may be generated for each of the fields 70, for example, before the agricultural machine 100 begins to perform self-driving.

The management device 600 further generates a path from the waiting area 90 to each of the fields 70 and paths connecting such a plurality of fields 70 as second paths 30B. In the example shown in FIG. 15, the management device 600 generates a second path 30B at an entrance of each field 70 in addition to the second paths 30B on the roads 76, and generates a third path 30C connecting the second path 30B generated at each entrance and the beginning point S of the corresponding first path 30A to each other. The management device 600 further generates a second path 30B at an exit of each field 70 in addition to the second paths 30B on the roads 76, and generates a fourth path 30D connecting the second path 30B generated at each exit and the ending point G of the corresponding first path 30A to each other. In the example shown in FIG. 15, the entrance and the exit of each field 70 are common to each other, and will be expressed as an "entrance/exit 71", hereinafter. Each field 70 may have a plurality of entrances/exits 71, or the entrance and the exit may be provided at different positions. The environment map includes positional information on the entrance/exit 71 (or the entrance and the exit) of each field 70 in addition to the positional information on each field 70. The management device 600 can generate the second paths 30B based on the positional information. The management device 600 generates the third path 30C and the fourth path 30D in a region, of the field 70, that is other than a region where the agricultural work has already been performed. This can prevent the work area 72, where the agricultural work has already been performed, from being trampled by the work vehicle 100.

The management device 600 can perform the above-described path generation process for each of the fields 70 and each of the roads 76 around the fields 70 to generate all the paths for a predetermined time period (e.g., half a day, one day, three days, etc.). For example, before the agricultural machine 100 begins traveling on each working day, the management device 600 may generate all the paths necessary to complete all the tasks of agricultural work scheduled for that particular working day. Alternatively, the management device 600 may first generate a path necessary to perform a portion of the agricultural work scheduled for each working day, and then, after the portion of the agricultural work ends, may generate a path necessary to perform the remaining portion of the agricultural work for that particular working day. Still alternatively, the management device 600 may generate, all at once, all the paths necessary to complete all the tasks of agricultural work scheduled over a plurality of working days. The management device 600 may change the path, once generated, in accordance with various states such as the state of progress of agricultural work, the state of weather, the traffic state and the state of the agricultural road.

The management device 600 generates the second path 30B along the road 76 in accordance with a predetermined algorithm. The management device 600 can generate the second path 30B in accordance with a path generation algorithm based on a search algorithm such as, for example, the Dijkstra's algorithm or the A* search algorithm. The management device 600 may automatically generate the second path 30B at a predetermined timing based on the work plan or may generate the second path 30B in accordance with the user's instructions. The management device 600 may determine the second path 30B in accordance with the state of the road 76 (e.g., agricultural road) leading to the field 70. In the case where, for example, trees grow thick along the road leading to the field 70 and may possibly prevent receipt of radio waves from a GNSS satellite, the management device 600 may exclude such a road to generate the second path 30B.

As a result of the above-described operation, the management device 600 can generate a global path from the departure point of the agricultural machine 100 to the target point via one or more fields 70. The management device 600 may generate a path for the agricultural machine 100 for, for example, every predetermined time period (every day, every half day, every three hours, etc.). The management device 600 generates a global path for the agricultural machine 100 such that the agricultural machine 100 performs the agricultural work in the specified field 70 at the specified point of time in accordance with the schedule previously created. Information on the generated global path is transmitted to the agricultural machine 100 and stored in the storage 170. The ECU 184, performing self-driving control, controls the ECUs 181 and 182 such that the agricultural machine 100 travels along the global path. This allows the agricultural machine 100 to begin traveling along the global path.

There may be a case where while the agricultural machine 100 is traveling outside the field, there is an obstacle such as a pedestrian or another vehicle on the global path or in the vicinity thereof. In order to avoid the agricultural machine 100 colliding against the obstacle, while the agricultural machine 100 is traveling, the ECU 185 of the controller 180 consecutively generates a local path along which the agricultural machine 100 can avoid the obstacle. While the agricultural machine 100 is traveling, the ECU 185 generates a local path based on sensing data acquired by the sensing device included in the agricultural machine 100 (the obstacle sensors 130, the LiDAR sensor 140, the cameras 120, etc.). The local path is defined by a plurality of waypoints along a portion of the global path. Based on the sensing data, the ECU 185 determines whether or not there is an obstacle existing on the road on which the agricultural machine 100 is proceeding or in the vicinity thereof. In the case where there is such an obstacle, the ECU 185 sets a plurality of waypoints such that the obstacle is avoided, and thus generates a local path. In the case where there is no such obstacle, the ECU 185 generates a local path parallel or substantially parallel to the global path. Information representing the generated local path is transmitted to the ECU 184 responsible for self-driving control. The ECU 184 controls the ECU 181 and the ECU 182 such that the agricultural machine 100 travels along the local path. This allows the agricultural machine 100 to travel while avoiding the obstacle. In the case where there is a traffic signal on the road on which the agricultural machine 100 is traveling, the agricultural machine 100 may recognize the traffic signal based on, for example, an image captured by the cameras 120 and perform an operation of halting at a red light and moving forward at a green light.

Figure 16:
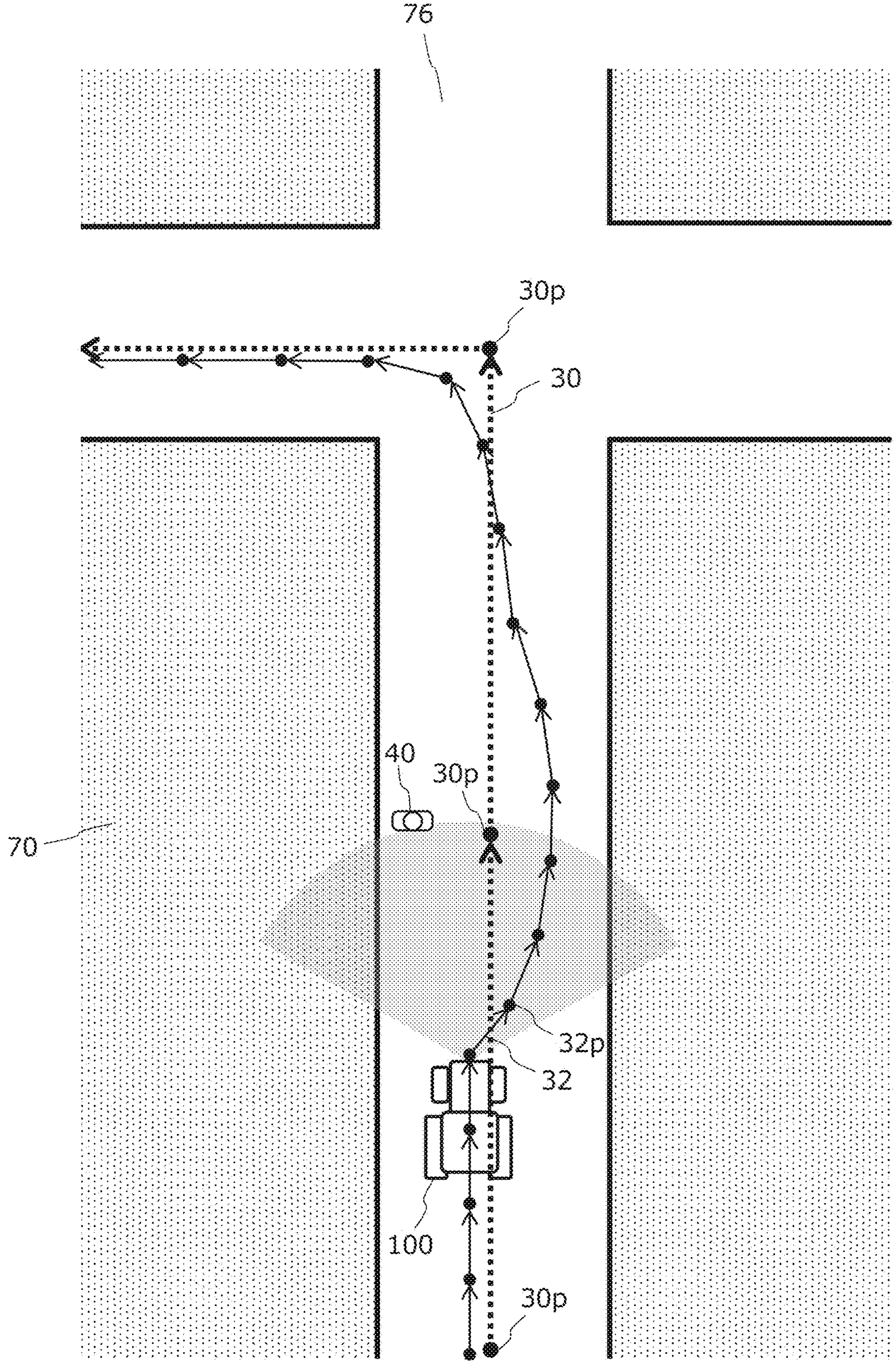
FIG. 16 is a diagram showing an example of global path and an example of local path generated in an environment where an obstacle exists.

FIG. 16 is a diagram showing an example of global path and an example of local path generated in an environment where there is an obstacle. FIG. 16 represents, as an example, a global path 30 by the broken line arrows, and represents, as an example, local paths 32 consecutively generated during travel of the agricultural machine 100 by the solid line arrows. The global path 30 is defined by a plurality of waypoints 30*p*. The local paths 32 are defined by a plurality of waypoints 32*p* set at a shorter interval than the waypoints 30*p*. The waypoints each have information on, for example, the position and the orientation. The management device 600 sets the plurality of waypoints 30*p* at a plurality of points including an intersection of the roads 76 to generate the global path 30. The interval between the waypoints 30*p* is relatively long, and may be, for example, about several meters to about several tens of meters. The ECU 185 sets the plurality of waypoints 32*p* based on the sensing data output from the sensing device during travel of the agricultural machine 100 to generate the local paths 32. The interval between the waypoints 32*p* of the local paths 32 is shorter than the interval between the waypoints 30*p* of the global path 30. The interval between the waypoints 32*p* may be, for example, about several tens of centimeters (cm) to about several meters (m). The local paths 32 are generated in a relatively small range (e.g., a range of about several meters) from the position of the agricultural machine 100. FIG. 16 shows, as an example, a series of local paths 32 generated while the agricultural machine 100 travels along the road 76 between the fields 70 and turns left at the intersection. While the agricultural machine 100 is moving, the ECU 185 repeats an operation of generating a local path from the position of the agricultural machine 100 estimated by the ECU 184 to, for example, a point frontward of the agricultural machine 100 by several meters. The agricultural machine 100 travels along the local paths consecutively generated.

In the example shown in FIG. 16, there is an obstacle 40 (e.g., a human) frontward of the agricultural machine 100. FIG. 16 shows a fan-shaped region as an example of range sensed by the sensing devices such as the cameras 120, the obstacle sensors 130 or the LiDAR sensor 140 mounted on the agricultural machine 100. In such a state, the ECU 185 generates the local paths 32 such that the obstacle 40 detected based on the sensing data is avoided. The ECU 185 determines whether or not there is a possibility that the agricultural machine 100 will collide against the obstacle 40, based on, for example, the sensing data and the width of the agricultural machine 100 (including the width of the implement in the case where the implement is attached). In the case where there is a possibility that the agricultural machine 100 will collide against the obstacle 40, the ECU 185 sets the plurality of waypoints 32*p* such that the obstacle 40 is avoided, and generates the local paths 32. Note that the ECU 185 may recognize the state of the road surface (e.g., being muddy, having a cave-in, etc.) based on the sensing data, in addition to the presence/absence of the obstacle 40, and in the case where a site on which it is difficult to walk is detected, may generate the local paths 32 such that the local path 32 avoids such a site. The agricultural machine 100 travels along the local paths 32. In the case where the obstacle 40 cannot be avoided in whichever manner the local paths 32 may be set, the controller 180 may halt the agricultural machine 100. At this point, the controller 180 may transmit an alert signal to the terminal device 400 or the management device 600 to warn a supervisor. In the case where after the agricultural machine 100 halts, the obstacle 40 is moved and it is recognized that there is no risk of collision, the controller 180 may restart the travel of the agricultural machine 100.

Now, a more detailed example of a non-limiting example of a method for determining the waiting area for the agricultural machine will be described. In the example described below, a plurality of agricultural machines including the agricultural machine 100 perform self-driving in a relatively large district and perform agricultural work in a plurality of fields in the district. The agricultural machines may perform self-driving in, for example, a large region including a plurality of districts having different meteorological conditions. Such agricultural machines may be used for a service performing agricultural work instead of the user in a plurality of fields in each of the districts.

Figure 17:
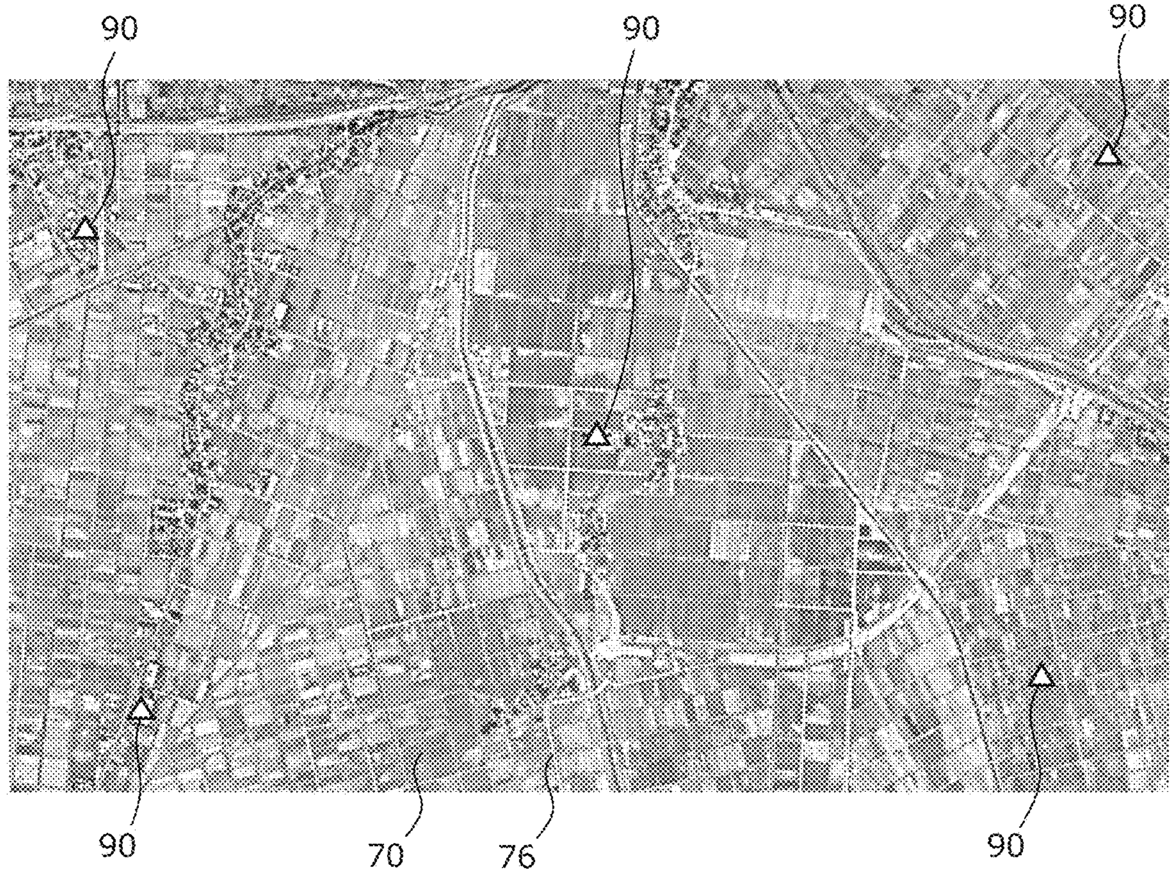
FIG. 17 shows another example of map of a district including a plurality of waiting areas.

FIG. 17 shows an example of map of a district where the agricultural machines perform agricultural work. Note that the map shown in FIG. 17 is a map for explanation that is created as a result of processing performed on an aerial photograph created by the Geospatial Information Authority of Japan. The map actually used is not necessarily based on an aerial photograph created by the Geospatial Information Authority of Japan, and a map of any data format may be used. The map is created for the entirety of the district where the agricultural machines move and recorded in the storage 650.

The map shown in FIG. 17 includes information on the position of each of points (e.g., the latitude and the longitude of each of the points) in a plurality of fields 70, a plurality of waiting areas 90 and roads 76 around the fields 70 and the waiting areas 90. The map shown in FIG. 17 represents the positions of the waiting areas 90 with triangular marks "A". The waiting areas 90 may each be, for example, a facility such as a warehouse, a garage or a parking area managed by the business operator that runs the agriculture management system. A portion of either one of the fields may be used as a waiting area 90.

The agricultural machines each perform self-driving under the supervision of the management device 600 and perform agricultural work assigned thereto. The map is previously created so as to cover the entirety of the district where all the agricultural machines that are run under the supervision of the management device 600 move. The agricultural machines may each be, for example, a tractor like the agricultural machine 100 described above or another type of movable body for agriculture such as a rice transplanter, a combine, a vegetable harvester or an agricultural drone.

FIG. 17 shows five waiting areas 90 as an example. The waiting areas 90 may be set at an interval of, for example, about several hundred meters to about several kilometers. The number and the distribution of the waiting areas 90 are determined in accordance with various conditions such as the number of the agricultural machines that are run, the distribution of the fields 70, the size of the district where the agricultural machines are run, and the road traffic environment. The waiting areas 90 may be registered by, for example, the manager of the agriculture management system or the like. Positional information on each of the waiting areas 90 and information representing a field group corresponding to each of the waiting areas 90 are previously recorded in the storage 650.

The management device 600 according to the present example embodiment determines, from the plurality of waiting areas 90, a specific waiting area to which each of the agricultural machines is to move after performing a final task of agricultural work on each of working days, based on information representing at least one of a growing state of crop, a state of progress of agricultural work, a state of planting, or a state of weather in the plurality of fields 70. The management device 600 generates a path from the field where the final task of agricultural work is to be performed on that particular working day, to the specific waiting area. Therefore, a specific waiting area to which each agricultural machine is to move after performing the final task of agricultural work on each working day can be appropriately selected in accordance with various states such as the growing state of crop, the state of progress of agricultural work, the state of planting, or the state of weather.

The growing state of crop, the state of progress of agricultural work, the state of planting or the state of weather influences the work plan. For example, in the case where the growing state of crop or the state of progress of agricultural work is ahead of, or behind, the schedule, the work plan needs to be reviewed. Alternatively, in the case where a task of agricultural work originally scheduled cannot be performed due to bad weather, the work plan after that needs to be reviewed. In the case where an optimal timing for the agricultural work is different by the breed of crop, it may become necessary to adjust the work plan in accordance with the breed of crop that is planted.

As a preparation for the case described above, the management device 600 according to the present example embodiment monitors at least one of the growing state of crop, the state of progress of agricultural work, the state of planting, or the state of weather in each field. To generate a path for each agricultural machine for each working day, the management device 600 determines the waiting area where the agricultural machine may wait after finishing the work on that particular working day, based on at least one of the growing state of crop, the state of progress of agricultural work, the state of planting, or the state of weather. For example, the management device 600 determines the distribution of the working days for fields located in the vicinity of each of the plurality of waiting areas, based on at least one of the growing state of crop, the state of progress of agricultural work, the state of planting, or the state of weather. Based on the determined distribution of the working days, the management device 600 determines a specific waiting area to which each agricultural machine is to move after performing the final task of agricultural work on each working day. For example, in order to determine the specific waiting area for each working day, the management device 600 may specify a field group where the agricultural work is to be performed on the next working day, based on the distribution of the working days for the fields in the vicinity of each of the waiting areas, and determine a waiting area closest to the field group as the specific waiting area. Herein, the "waiting area closest to the field group" refers to the waiting area, among the plurality of waiting areas, that is located at the shortest average straight-line distance or the shortest average travel distance from a plurality of fields included in the field group. Such an operation can provide effects of, for example, shortening the travel distance of the agricultural machines and decreasing the time for moving and the amount of consumption of the fuel.

In the present example embodiment, data (e.g., a table) showing the correspondence between the plurality of waiting areas and the plurality of fields is previously recorded in the storage 650. FIG. 18 shows an example of table providing an example of correspondence between the waiting areas and the fields. In this table, among 100 fields (fields #1 to #100), fields #1 to #30 are associated with waiting area A, fields #31 to #60 are associated with waiting area B, and fields #61 to #100 are associated with waiting area C. In the following description, in the case where one field and one waiting area are associated with each other, the field will be expressed as "belonging" to the waiting area. The table as shown in FIG. 18 may be created in the case where, for example, the waiting area closest to fields #1 to #30 is waiting area A, the waiting area closest to fields #31 to #60 is waiting area B, and the waiting area closest to fields #61 to #100 is waiting area C. The management device 600 can refer to such a table to determine the waiting area close to the field group where the agricultural work is scheduled to be performed on the next working day. The table shown in FIG. 18 is one example. The number of the waiting areas is not limited to three, and may be four or greater. Any number of fields are associated with each waiting area, and there is no limitation on the number of the fields associated with each waiting area. These are also applicable to figures referred to below.

Figure 19:
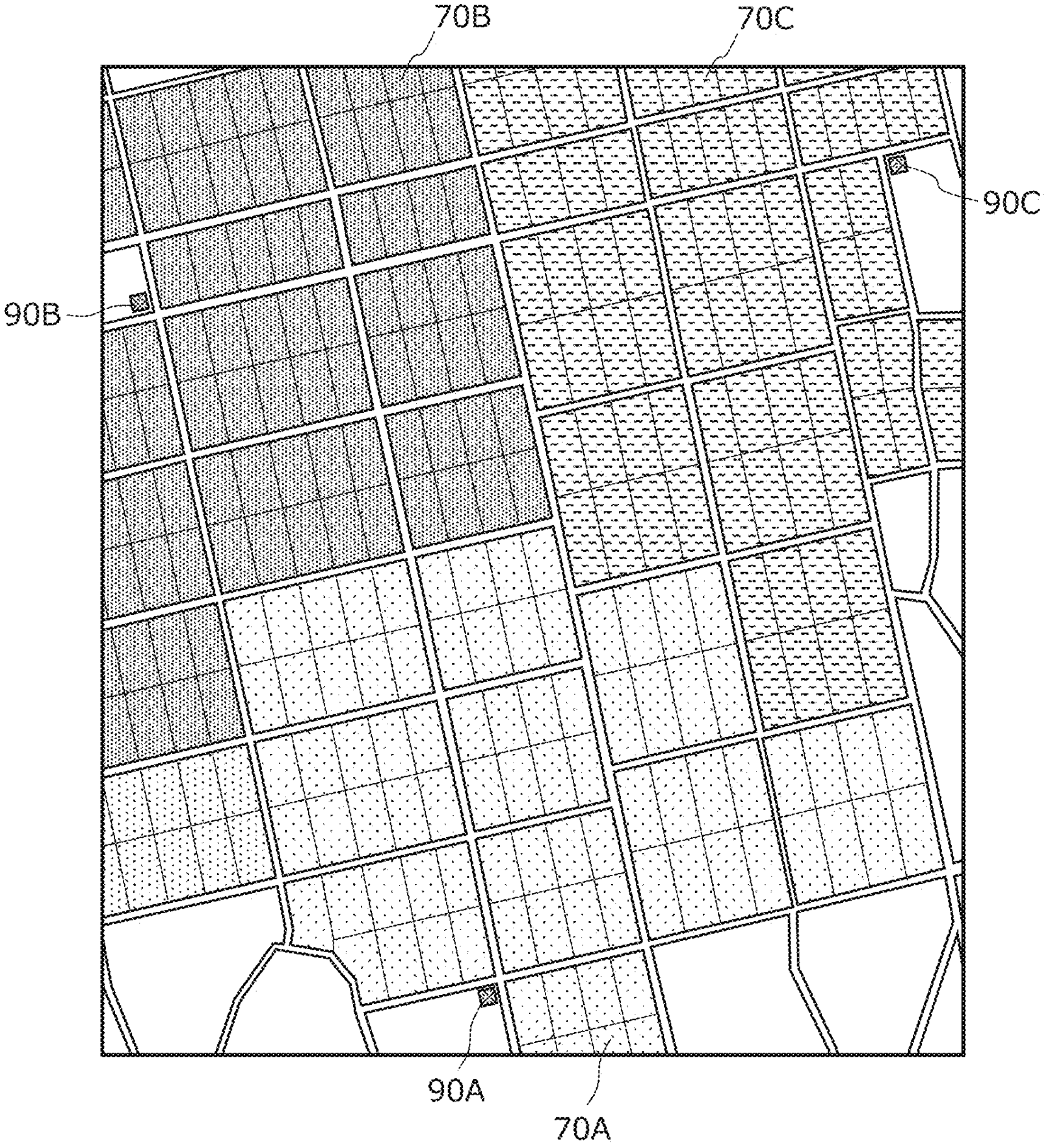
FIG. 19 shows an example of map explicitly showing the correspondence between waiting areas and fields.

FIG. 19 shows an example of map explicitly representing the correspondence between the waiting areas and the fields. The field group 70A belonging to the waiting area 90A, the field group 70B belonging to the waiting area 90B, and the field group 70C belonging to the waiting area 90C are represented with different patterns. In this manner, each of the fields where the agricultural machine 100 performs agricultural work automatically is associated with one waiting area relatively close thereto. Note that each of the fields does not need to be associated with the waiting area closest thereto. There is a case where it is better to treat the fields close to each other as one group in accordance with the attribute such as the crop to be planted or the owner of the fields. In this case, a group of fields, not individual fields, may be associated with one waiting area. In such a form, a portion of the fields in the group may possibly be associated with a waiting area different from the waiting area closest thereto (e.g., associated with the waiting area second closest thereto).

The management device 600 according to the present example embodiment generates, for example, a work plan as shown in FIG. 12 for each agricultural machine, based on data acquired from one or more users. Based on the work plan, the management device 600 determines a path for each agricultural machine for each working day, and instructs each agricultural machine to move along the path and perform agricultural work. The work plan defines the distribution of the working days for the plurality of fields where each agricultural machine is to perform agricultural work. In accordance with the distribution of the working days indicated by the work plan, the management device 600 determines a specific waiting area to which each agricultural machine is to move after finishing the agricultural work on each working day. For example, in order to determine the specific waiting area, the management device 600 refers to information (e.g., data in the table or the like) representing various states such as the growing state of crop, the state of progress of agricultural work, the state of planting, or the state of weather in each field. The management device 600 updates the work plan in accordance with such a state, and determines the waiting area and the path for each agricultural machine for each working day, in accordance with the distribution of the working days indicated by the updated work plan. The management device 600 may check such a state, for example, every working day or every certain time period, modify the work plan in accordance with the state, and determine the waiting area for each working day in accordance with the modified work plan.

Hereinafter, specific examples of a non-limiting example of a method for determining the waiting area in accordance with the growing state of crop, the state of progress of agricultural work, the state of planting or the state of weather will be described.

FIG. 20 shows an example of table used to manage the growing state of crop in each field. This table includes information on the growing state of crop (e.g., the average height) in each field and the working days when the agricultural work is to be performed in each field. Data on the growing state of crop may be acquired by, for example, a movable body such as a drone having an LiDAR sensor or a camera mounted thereon. The growing state is not limited to being expressed by the height, and may be expressed by another index such as, for example, the vegetation index. The management device 600 determines the working days when the agricultural work such as harvesting is to be performed in each field, in accordance with the growing state of crop in each field, and writes the working days into the table. For example, the management device 600 determines the working days for each field, such that the work in the field where the crop grows faster is performed earlier. In the example shown in FIG. 20, the crop grows relatively fast in fields #31 to #60 belonging to waiting area B, and the crop grows relatively slowly in fields #61 to #100 belonging to waiting area C. In this case, the management device 600 sets the working days for fields #31 to #60 belonging to waiting area C at earlier dates, and sets the workings days for fields #61 to #100 belonging to waiting area C at later dates. The table shown in FIG. 20 includes information representing the correspondence between the waiting areas and the fields for the sake of convenience, but such information may be omitted. In the case where the correspondence between the fields and the waiting areas is recorded in another table, for example, FIG. 18, the table shown in FIG. 20 does not need to include the information on the waiting areas. This is also applicable to figures referred to below.

FIG. 21 shows a table providing an example of distribution of the working days for the plurality of fields regarding the growing state shown in FIG. 20. The management device 600 counts the number of fields, among the fields belonging to each waiting area, where the agricultural work is to be performed for each working day. For example, for each working day, the management device 600 determines the waiting area having, in the vicinity thereof, the largest number of fields where the agricultural work is to be performed, as the specific waiting area to which each agricultural machine is to move after finishing the final task of agricultural work. In the example shown in FIG. 21, the management device 600 determines waiting area B as the specific waiting area for September 1 to September 5, determines waiting area A as the specific waiting area for September 6 to September 10, and determines waiting area C as the specific waiting area for September 11 to September 15.

As can be seen, in the example shown in FIG. 20 and FIG. 21, the management device 600 updates the distribution of the working days in accordance with the growing state of crop in the plurality of fields, and determines the specific waiting area for each working day in accordance with the updated distribution of the working days. Therefore, the working days for each field can be set such that, for example, the agricultural work is performed sequentially from the field where the crop grows faster. The total travel distance of each agricultural machine can be shortened, and thus the agricultural work can be performed more efficiently.

FIG. 22 shows an example of table used to manage the state of progress of agricultural work in each field. This table includes information on the state of progress of a specific task of agricultural work in each field and the working days when the specific task is to be performed in each field. The state of progress may be expressed by, for example, status information indicating whether or not the agricultural work has already been completed at that particular point of time. In the example shown in FIG. 22, the task of agricultural work is tilling, and the state of progress is expressed by the status such as "tilling not completed" or "tilling completed". In this example, the management device 600 determines the working days when the task is to be performed for the fields where the state of progress is "tilling not completed", and writes the information into the table. The management device 600 periodically (e.g., every day) determines the working days from among the next day and days thereafter, for the fields where the tilling has not been completed, and thus updates the table. In the example shown in FIG. 22, the task in fields #61 to #100 close to waiting area C has already been completed. In this case, the working days may be determined for the remaining fields where the task has not been completed, such that, for example, the agricultural work is performed sequentially from the field closer to the position of the agricultural machine at that point of time. For the field where the agricultural machine has completed tilling, the state of progress is changed from "tilling not completed" to "tilling completed". The change in the state of progress may be automatically performed based on, for example, information such as a notice of task completion that is transmitted from the agricultural machine. Alternatively, when sensing that the agricultural machine finished the task and left the field based on the positional information on the agricultural machine, the management device 600 may determine that the task has been completed and change the state of progress.

FIG. 23 shows an example of distribution of the working days for the plurality of fields that corresponds to the example shown in FIG. 22. For each working day, the management device 600 determines the waiting area having, in the vicinity thereof, the largest number of fields where the agricultural work is to be performed, as the specific waiting area. In this example, on April 19 and April 20, the agricultural work is scheduled to be performed only in the fields belonging to waiting area B. Therefore, waiting area B is determined as the specific waiting area. On April 21 and April 22, the agricultural work is scheduled to be performed only in the fields belonging to waiting area A. Therefore, waiting area A is determined as the specific waiting area. Even after the distribution of the working days is determined in this manner, there may be a case where the task does not proceed as scheduled and the state of progress of the task is behind the schedule. In this case, the management device 600 updates the state of progress and updates the working days for each field based on the updated state of progress.

As can be seen, in the example shown in FIG. 22 and FIG. 23, the management device 600 updates the distribution of the working days in accordance with the state of progress of agricultural work in the plurality of fields, and determines the specific waiting area for each working day based on the updated distribution of the working days. Therefore, an appropriate waiting area can be determined in accordance with, for example, the state of progress of agricultural work, and the path planning can be optimized. As a result, the total travel distance of the agricultural machine can be shortened, and the agricultural work can be performed more efficiently.

FIG. 24 shows an example of correspondence between planting information and the number of the fields belonging to each waiting area. The planting information represents, for example, the breed of crop to be planted. In the example shown in FIG. 24, breeds of rice such as "Koshihikari A", "Koshihikari B" and "Hinohikari" are recorded as the planting information. In this case, the management device 600 determines the working days for each field, such that the agricultural work in the fields where the same breed of crop is planted is performed in a short time period in a concentrated manner. In the example shown in FIG. 24, the fields where "Koshihikari A" is to be planted are concentrated in the vicinity of waiting area B, the fields where "Koshihikari B" is to be planted are concentrated in the vicinity of waiting area A, and the fields where "Hinohikari" is to be planted are concentrated in the vicinity of waiting area C. It is assumed the tasks of agricultural work such as paddling or rice transplanting is performed in the order of "Koshihikari A", "Koshihikari B" and "Hinohikari". In this case, the management device 600 sets the working days for the fields in the vicinity of waiting area B at earlier dates, sets the working days for the fields in the vicinity of waiting area A at dates after the dates for the waiting area B, and sets the working days for the fields in the vicinity of waiting area C at dates after the dates for the waiting area A.

FIG. 25 shows the distribution of the working days for the plurality of fields that corresponds to the example shown in FIG. 24. In this example, the management device 600 determines the working days for each field, such that the agricultural machine moves to the fields in the order of the field group belonging to waiting area B, the field group belonging to waiting area A and the field group belong to waiting area C. As a result, the management device 600 determines waiting area B as the specific waiting area for April 19 to April 21, determines waiting area A as the specific waiting area for April 22 to April 27, and determines waiting area C as the specific waiting area for April 28 to May 3.

As can be seen, in the example shown in FIG. 24 and FIG. 25, the management device 600 updates the distribution of the working days in accordance with the state of planting in the plurality of fields, and determines the specific waiting area for each working day based on the updated distribution of the working days. Therefore, in the case where, for example, the agricultural work in the field where the same breed of crop is planted needs to be performed in a short time period in a concentrated manner, an appropriate waiting area can be determined and the path planning can be optimized. As a result, the total travel distance of the agricultural machine can be shortened, and the agricultural work can be performed more efficiently.

FIG. 26 shows an example of relationship between the state of weather and the specific waiting area on each working day. In this example, waiting areas A, B and C are away from each other to such a degree as to have a different state of weather. The management device 600 acquires meteorological data at the point where each waiting area is located from, for example, a server computer that distributes the meteorological data via a network such as the Internet. In the example shown in FIG. 26, it is expected that for several days from April 19, fine weather will be continued only at the point of waiting area B and it will rain on at least one day at the point of each of waiting areas A and C. After that, the weather will be fine in waiting areas A and B, and the weather will become gradually better from being rainy in waiting area C. In this case, the management device 600 determines the working days for each field, such that the agricultural work is first performed in the fields in the vicinity of waiting area B, next in the fields in the vicinity of waiting area A, and then in the fields in the vicinity of waiting area C.

FIG. 27 shows the days when the agricultural work (in this example, tilling) is to be performed in the example shown in FIG. 26 and an example of the selected specific waiting areas. In this example, from April 19 to April 21, tilling is to be performed in the fields in the vicinity of waiting area B. Therefore, waiting area B is selected as the specific waiting area. From April 22 to April 24, tilling is to be performed in the fields in the vicinity of waiting area A. Therefore, waiting area A is selected as the specific waiting area. From April 25 to April 26, tilling is to be performed in the fields in the vicinity of waiting area C. Therefore, waiting area C is selected as the specific waiting area.

As can be seen, in the example shown in FIG. 26 and FIG. 27, the management device 600 updates the distribution of the working days in accordance with the state of weather at the point where each of the plurality of waiting areas is located, and determines the specific waiting area for each working day based on the updated distribution of the working days. Therefore, for example, the agricultural work can be performed at a site of fine weather with priority, with the agricultural work being avoided at a site of bad weather. Even in the case where the original schedule needs to be changed due to bad weather, an appropriate waiting area can be determined and the path planning can be optimized. As a result, the agricultural work by the agricultural machine can be performed more efficiently.

In the examples shown in FIG. 20 to FIG. 27, the management device 600 determines the specific waiting area in accordance with either one of the growing state of crop, the state of progress of agricultural work, the state of planting, or the state of weather in each field. Instead of performing such an operation, the management device 600 may determine the specific waiting area based on any two or more among the growing state of crop, the state of progress of agricultural work, the state of planting, or the state of weather. These states are considered compositely, so that more appropriate path planning can be performed in accordance with the state and the agricultural machine can be run more efficiently.

As described above, the management device 600 according to the present example embodiment determines the distribution of the working days for the fields located in the vicinity of each waiting area, in accordance with at least one of the growing state of crop, the state of progress of agricultural work, the state of planting, or the state of weather in the plurality of fields. Based on the distribution of the working days, the management device 600 determines the specific waiting area to which the agricultural machine is to move after performing the final task of agricultural work on each working day. For example, in order to determine the specific waiting area for each working day, the management device 600 may specify the field group where the agricultural work is to be performed on the next working day, based on the distribution of the working days, and determine the waiting area closest to the field group as the specific waiting area. Alternatively, in order to determine the specific waiting area for each working day, the management device 600 may determine the waiting area closest to a first field, where the final task of agricultural work is to be performed on that particular working day, as the specific waiting area. That is, the management device 600 may determine, as the specific waiting area, the waiting area closest to the first field where the final task of agricultural work is to be performed on that particular working day or the waiting area closest to a second field, where the first task of agricultural work is to be performed on the next working days specified by the distribution of the working days. In the case where the waiting area closest to the first field and the waiting area closest to the second field are different from each other, the management device 600 may determine, from the waiting area closest to the first field and the waiting area closest to the second field, the waiting area that results in a shorter travel distance for the agricultural machine when moving from the first field to the second field via the waiting area, as the specific waiting area. This can shorten the travel distance and the time for moving between the field and the waiting area. Therefore, the agricultural machine can be run efficiently while the amount of consumption of the fuel is suppressed or reduced.

Figure 28:
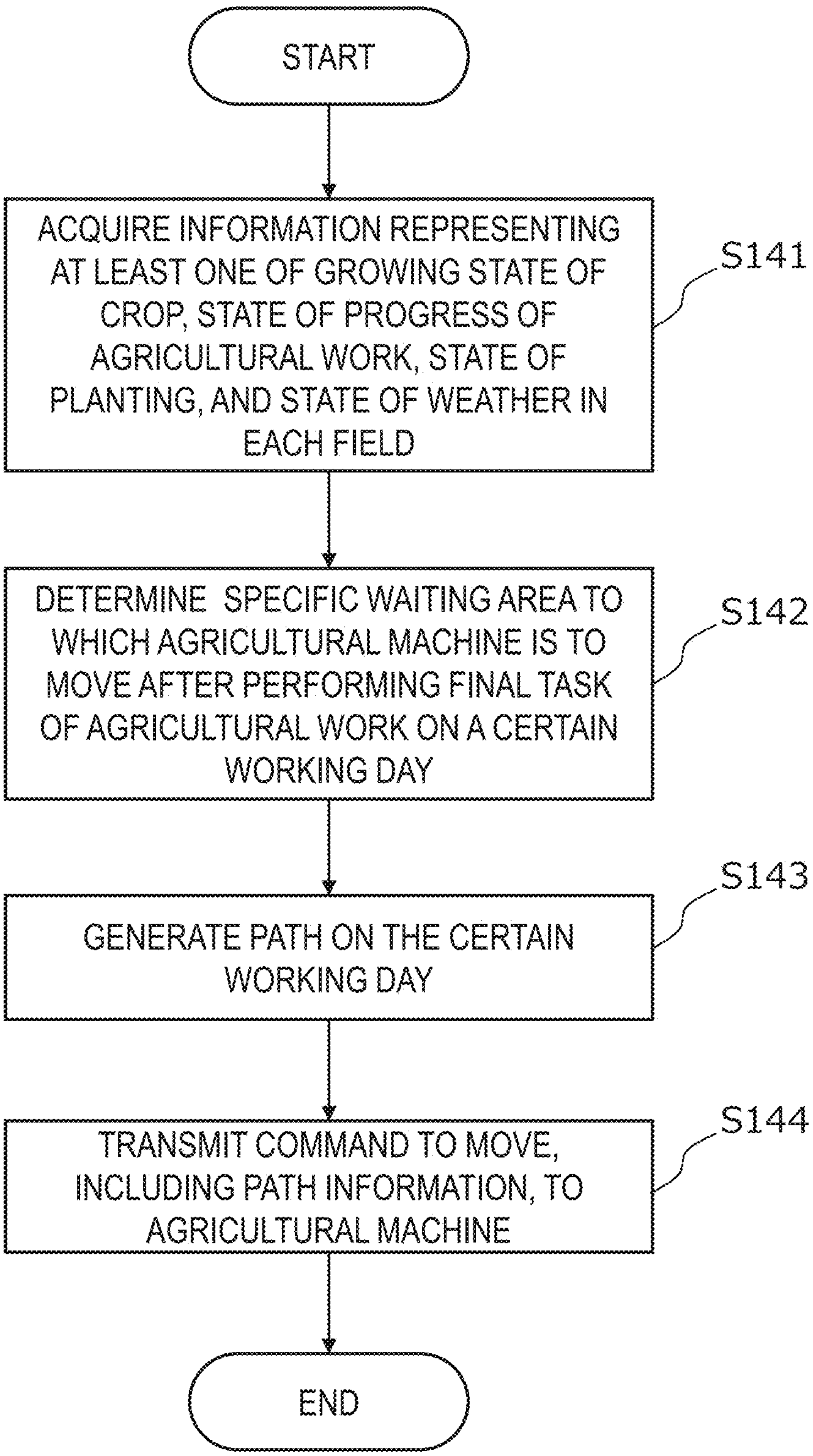
FIG. 28 is a flowchart showing an example operation performed by the management device.

FIG. 28 is a flowchart showing an example operation of the management device 600 according to the present example embodiment. The management device 600 performs the operation of steps S141 to S144 shown in FIG. 28 and thus can perform global path planning for the agricultural machine for that particular working day and cause the agricultural machine to perform self-driving. The operation for the path planning shown in FIG. 28 may be performed at any timing before the agricultural machine begins to move. The path planning may be performed immediately before the agricultural machine begins to move, or the day before the agricultural machine begins to move or even earlier.

In step S141, the management device 600 acquires information representing at least one of the growing state of crop, the state of progress of agricultural work, the state of planting, or the state of weather in each field. The information may be managed by the management device 600 itself or by a device different from the management device 600. The growing state of crop, the state of progress of agricultural work, the state of planting, and the state of weather may be managed by a plurality devices in a dispersed manner. The information acquired in this step may be the information shown in FIG. 20, FIG. 22, FIG. 24 and/or FIG. 26.

In step S142, the management device 600 determines the specific waiting area to which the agricultural machine is to move after performing the final task of agricultural work on that particular working day. For example, the management device 600 may determine a first field group, where the agricultural work is to be performed on that particular working day, based on the information acquired in step S141, and determine a first waiting area closest to the first field group as the specific waiting area. Alternatively, the management device 600 may determine a second field group, where the agricultural work is to be performed on the next working day, based on the information acquired in step S141, and determine a second waiting area closest to the second field group as the specific waiting area. In the case where the first waiting area and the second waiting area are different from each other, either the first waiting area and the second waiting area with which the travel distance of the agricultural machine is shorter may be selected as the specific waiting area.

In step S143, the management device 600 generates a path for that particular working day. That is, the management device 600 generates a global path from the waiting area as a departure point on that particular working day to the waiting area determined in step S142 via one or more fields where the agricultural work is to be performed on that particular working day. This path may be determined such that, for example, the total travel distance of the agricultural machine is shortest.

In step S144, the management device 600 transmits a command to move, including information on the generated path, to the agricultural machine. This command to move may include, for example, information on the schedule indicating at which point of time in which field the agricultural work is to be performed, in addition to the path information. In response to the command to move, the controller of the agricultural machine causes the agricultural machine to begin self-driving at the designated time and to move along the designated path. The agricultural machine moves while generating a local path along which an object is avoidable, by the method described above with reference to, for example, FIG. 16.

As a result of the above-described operation, the management device 600 can generate a path for the agricultural machine for that particular working day. The management device 600 can perform the operation shown in FIG. 28, for example, every working day, and thus can generate a path for the agricultural machine for each working day and instruct the agricultural machine to move. Note that after sending the command to move to the agricultural machine, the management device 600 may perform the operation shown in FIG. 28 again to modify the path or the waiting area. For example, while the agricultural machine is moving, it may become impossible to perform the task originally scheduled due to a sudden change in the weather. Even in such a case, the management device 600 performs the operation shown in FIG. 28 (e.g., every certain time period) after beginning to move, so that the waiting area and the path can be appropriately changed.

The management device 600 according to the above-described example embodiment generates a path for a plurality of agricultural machines for each working day. In this case, the management device 600 determines, from a plurality of waiting areas, a specific waiting area to which each agricultural machine is to move after performing the final task of agricultural work on each working day, from a plurality of waiting areas, based on the information representing at least one of the growing state of crop, the state of progress of agricultural work, the state of planting, or the state of weather in a plurality of fields. The management device 600 generates a path from the field where the final task of agricultural work is to be performed, to the specific waiting area, for each agricultural machine. Therefore, an optimal path that makes the total travel distance shortest can be determined for each agricultural machine. Note that it is not necessary that a plurality of agricultural machines are provided. A single agricultural machine may be provided.

Example Embodiment 2

Now, example embodiment 2 of the present disclosure will be described. In the following description, differences from example embodiment 1 will be mainly described, and overlapping descriptions will be omitted.

Figure 29:
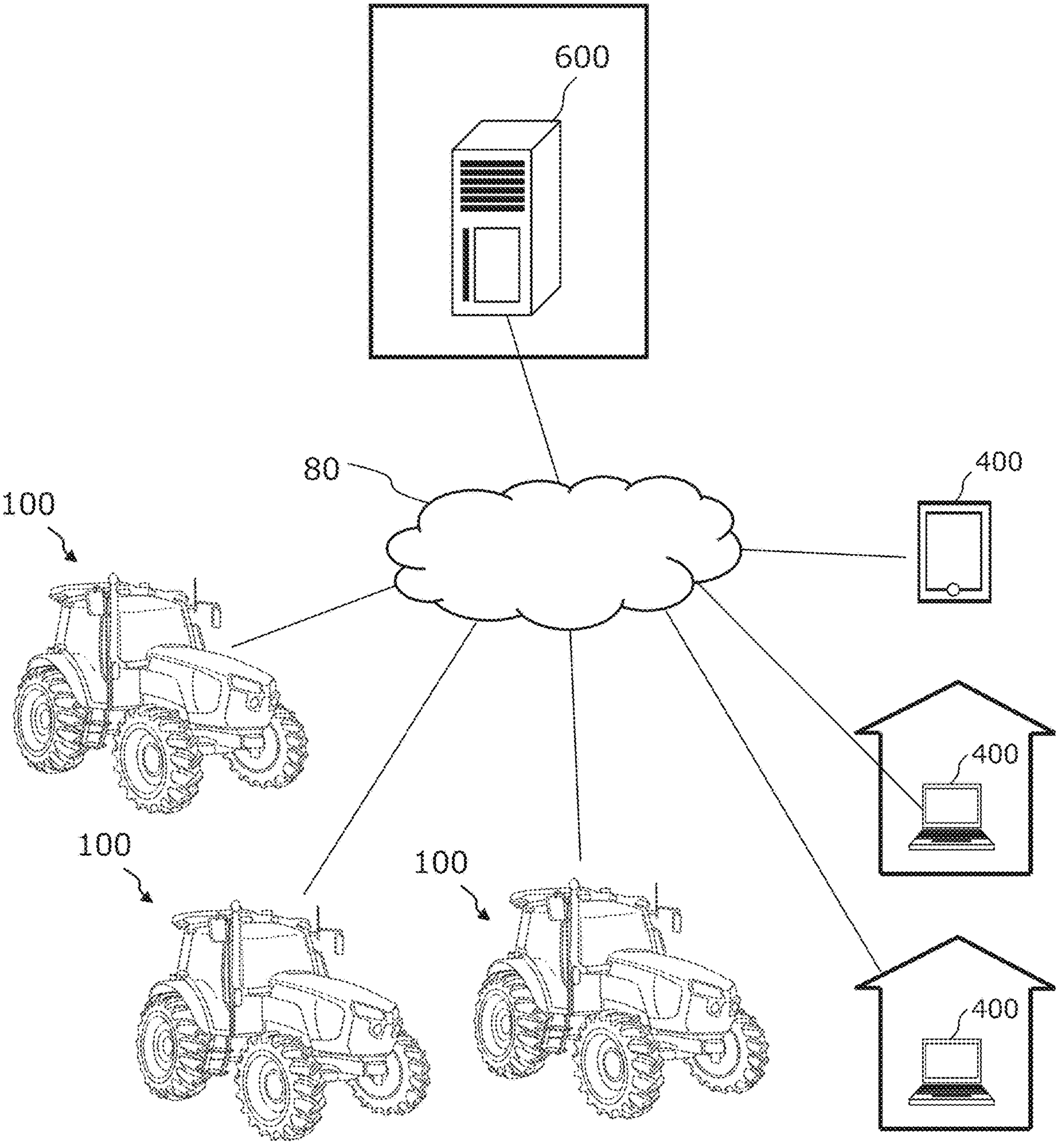
FIG. 29 is a diagram providing an overview of an agriculture management system according to a second illustrative example embodiment of the present invention.

FIG. 29 is a diagram providing an overview of an agriculture management system according to illustrative example embodiment 2 of the present disclosure. The agriculture management system shown in FIG. 29 includes a plurality of agricultural machines 100 and a management device 600. FIG. 29 also shows a plurality of terminal devices 400 usable by a plurality of users. The management device 600 is a computer managed by a business operator running the agriculture management system. Each of the agricultural machines 100 and each of the terminal devices 400 can communicate with the management device 600 via a network 80. FIG. 29 shows three agricultural machines 100 as an example, but the agriculture management system may include two or less, or four or more agricultural machines 100. The agriculture management system may include a plurality of different types of agricultural machines such as, for example, a tractor, a rice transplanter, a combine and/or an agricultural drone. The agricultural machines 100 each follow an instruction from the management device 600 to perform the agricultural work assigned thereto in a designated field.

The agriculture management system shown in FIG. 29 may be used for, for example, a service for performing, instead of the user, agricultural work by use of the plurality of agricultural machines 100 performing self-driving. In such a system, the plurality of agricultural machines 100 may each be controlled to move between a plurality of fields managed by a plurality of users having a contract with a party offering the service and to perform the designated agricultural work in the designated field. The management device 600 may create a work plan for each agricultural machine 100 based on information representing a rough plan of agricultural work input by each user by use of his/her terminal device 400, and perform path planning for each agricultural machine 100 based on the work plan. In the case where the agriculture management service is used for such a service, the management device 600 may execute a process of charging each user. The management device 600 may be an assembly of a plurality of computers. For example, the management device 600 may include a computer creating a work plan for each agricultural machine 100, a computer performing path planning for each agricultural machine 100 and a computer executing a process of charging each user.

The service of performing agricultural work instead of the user as described above may be provided over a large region such as, for example, a country, a state, a province, a prefecture or a region including a plurality of countries. In this case, the district to which the service is provided may include a plurality of districts that are different in climate or meteorological conditions. The meteorological conditions such as temperature, humidity, rainfall, and sunshine amount may be different among different districts. Therefore, the period to perform each of types of agricultural work (e.g., tilling, seeding, planting, preventive pest control, manure spreading or harvesting) may be different among different districts. Therefore, the management device 600 according to the present example embodiment acquires information previously recorded in a storage and representing a rough guideline for the period for agricultural work for each district, and determines the period when each agricultural machine 100 should perform the agricultural work in each district, based on the information. The information representing a rough guideline for the period for the agricultural work may be created for each type of agricultural work such as, for example, tilling, seeding, planting, preventive pest control, manure spreading or harvesting. The management device 600 determines a path along which each agricultural machine 100 should move, such that each agricultural machine 100 performs a predetermined task of agricultural work in the period determined for each district. The management device 600 refers to a map of the region where each agricultural machine 100 to moves, thus creates a path on the map along which each agricultural machine 100 should move, and transmits the information on the path to the agricultural machine 100. Each agricultural machine 100 moves based on the received information on the path, and performs the predetermined task of agricultural work in the field assigned thereto. Each agricultural machine 100 has substantially the same configuration as that of the agricultural machine 100 in example embodiment 1. Each agricultural machine 100 can travel inside the field and outside the field (e.g., on roads) by self-driving.

The terminal devices 400 may each include a computer used by a user located far from the agricultural machines 100. The terminal devices 400 may each include a mobile terminal such as a laptop computer, a smartphone or a tablet computer as shown in FIG. 29, or a stationary computer such as a desktop PC. Each terminal device 400 displays, on a display screen thereof, a setting screen allowing the user to input information necessary to create a work plan (e.g., a schedule of each task of agricultural work). When the user inputs necessary information to the setting screen and performs a manipulation to transmit the information, the terminal device 400 transmits the input information to the management device 600. The management device 600 creates a work plan based on the information. The terminal device 400 may also be used to register one or more fields where the agricultural machine 100 is to perform the agricultural work.

Now, an example operation of path planning according to the present example embodiment will be described in more detail.

The management device 600 functions as a path planning system for each agricultural machine 100 performing self-driving over a plurality of districts. The storage 650 stores a map of a region including a plurality of districts. For example, the storage 650 stores a map of a relatively large region including a plurality of districts that are different in climate or meteorological conditions. The processor 660 of the management device 600 is configured or programmed to function as a processor configured or programmed to generate a path (global path described above) on the map for each agricultural machine 100.

Figure 30:
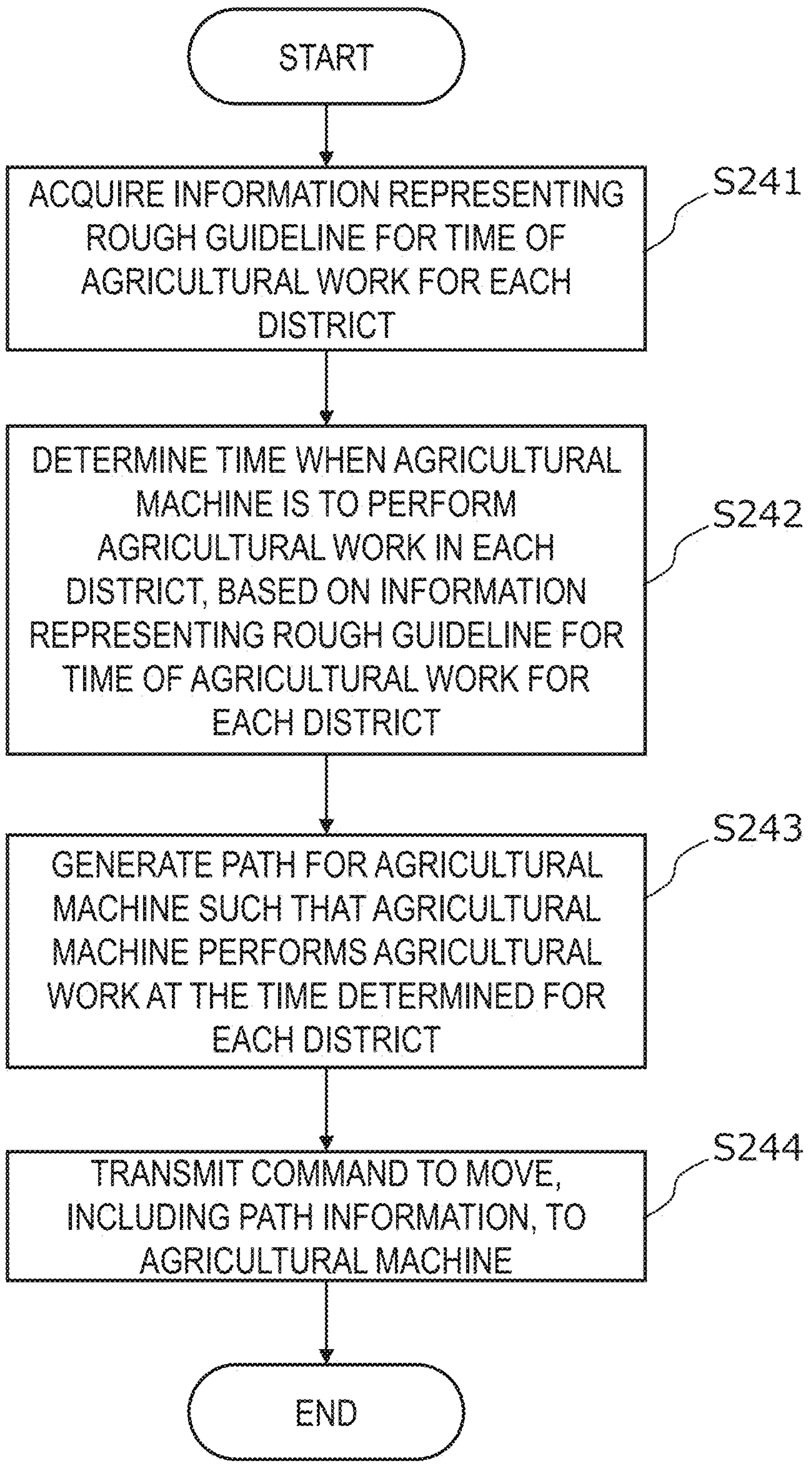
FIG. 30 is a flowchart showing an example operation performed by the management device.

FIG. 30 is a flowchart showing an overview of an operation performed by the management device 600. In the present example embodiment, information representing a rough guideline for the period when each agricultural machine 100 is to perform agricultural work in each district is previously stored in the storage 650. The management device 600 acquires the information from the storage 650 (step S241). Based on the information, the management device 600 determines the period when each agricultural machine 100 is to perform agricultural work in each of the plurality of districts (step S242). The management device 600 generates a path on the map for each agricultural machine 100, such that each agricultural machine 100 perform the agricultural work in the period determined for each district (step S243). For example, the management device 600 determines a plurality of working days when each agricultural machine 100 is to perform the agricultural work in the period determined for each district, and generates a path for each agricultural machine 100 for each of the working days. The management device 600 transmits a command to move, including information on the generated path, to the agricultural machine 100 (step S244). This command to move may include, for example, information on the schedule indicating at which point of time in which field the agricultural work is to be performed, in addition to the path information. In response to the command to move, the controller 180 of each agricultural machine 100 causes the agricultural machine 100 to begin self-driving at the designated time, to move along the designated path and to perform the agricultural work in the field.

Figures 31, 32:
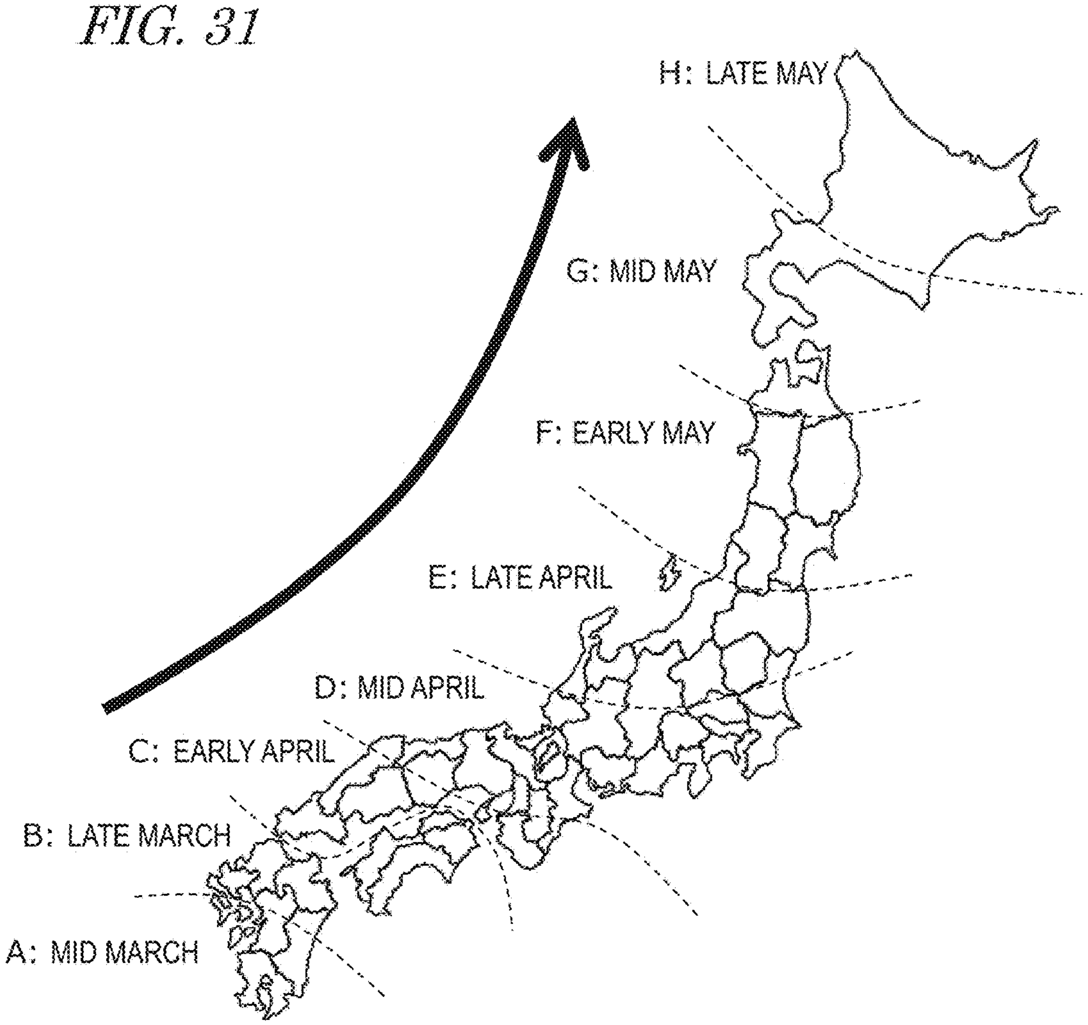
FIG. 31 is a diagram showing an example of region where the agricultural machines move.
FIG. 32 shows an example of information representing a rough guideline for the period for agricultural work for each district.

FIG. 31 shows an example of region where the agricultural machines 100 move. In this example, each agricultural machine 100 moves in a large range all over Japan for a relatively long time period (e.g., several weeks to several months or longer), and performs agricultural work in the fields in each district. In the example shown in FIG. 31, the region where the agricultural machines 100 perform agricultural work is divided into eight districts A to H. Region A is the southmost district, and districts B, C, D, E, F, F and G are distributed from south to north in this order. District H is the northmost district.

Each district shown in FIG. 31 has an area size of about 10,000 $km^2$ or larger and about 100,000 $km^2$ or smaller, and may include 1000 or more fields, for example. Each district may be larger or smaller than in this example. Each district may, for example, have an area size of about 30 $km^2$ or larger and/or include 100 or more fields, for example. People and things can go back and forth between two districts adjacent to each other via roads. In this specification, a farmland surrounded and thus demarcated by a pathway such as a ridge or an agricultural road is one field. Each field may be, for example, an agricultural field, a rice paddy, an orchard or a pasture.

FIG. 32 shows an example of information representing a rough guideline for the period for agricultural work for each district in the example shown in FIG. 31. The information representing a rough guideline for the period for agricultural work for each district may be created in, for example, the form of a table as shown in FIG. 32. The table shown in FIG. 32 represents a rough guideline for the period (e.g., recommended period) when a certain type of agricultural work is to be performed in each district. Such a table may be created, for, for example, each type of agricultural work and recorded in the storage 650.

In a country located in the northern hemisphere like Japan, it generally tends to be warmer in a southern district and cooler in a northern district. In such a country, the recommended period for various types of agricultural work performed to grow crops (e.g., tilling, seeding, planting, manure spreading, preventive pest control, mowing, or harvesting tends to early in a southern district and late in a northern district. In the case where the recommended period for individual type of agricultural work is different for each district, it is preferred to determine the period when the agricultural machine 100 is to perform the agricultural work at the recommended period for each district. For example, it may be preferred to control the movement of the agricultural machine 100 in accordance with the change in the temperature, such that the agricultural machine 100 performs agricultural work in a relatively warm district and then move to a colder district to perform agricultural work. Thus, the management device 600 according to the present example embodiment determines the period when each agricultural machine 100 is to perform agricultural work in each district, based on the information representing a rough guideline for the period for agricultural work for each district as shown in FIG. 32. The management device 600 determines a path for each agricultural machine 100 for each working day, such that each agricultural machine 100 performs the agricultural work in the period determined for each district. For example, the management device 600 may create a work plan for each agricultural machine 100 over a plurality of working days, based on the information representing a rough guideline for the period for agricultural work for each district, and generate a path for each agricultural machine 100 for each working day in accordance with the work plan. Each agricultural machine 100 moves along the generated path and performs the agricultural work in the field indicated by the work plan. Each agricultural machine 100 may automatically travel on roads including a public road in order to move between the districts.

In the example shown in FIG. 31 and FIG. 32, the information representing a rough guideline for the period for agricultural work for each district indicates that the period for agricultural work tends to be later for a norther district. In this case, the management device 600 determines the period when the agricultural machine 100 is to perform agricultural work in each district, such that the agricultural machine 100 gradually moves north as days go by, in accordance with this tendency. Oppositely, there is a case the information representing a rough guideline for the period for agricultural work for each district indicates a tendency that the period for agricultural work tends to be later for a southern district. For example, in the southern hemisphere, it is generally warmer in a southern district and cooler in a southern district. The information may show a tendency that the period for agricultural work is later for a southern district. In this case, the management device 600 may determine the period when the agricultural machine 100 is to perform the agricultural work in each district, such that the agricultural machine 100 gradually moves south as days go by, in accordance with this tendency. As can be seen, the management device 600 may generate a path for each agricultural machine 100 for each working day, such that the agricultural machine 100 gradually moves from a district of a relatively high temperature to a district of a relatively low temperature in accordance with the change in the temperature.

Herein, a zone where the climate or the meteorological state is suitable for a certain type of agricultural work in a certain period will be referred to as "work front" after the term "front" used in meteorology. In the example shown in FIG. 31, the work front generally moves from south to north as days go by. However, the work front does not always show such a simple movement. The climate may be changed by various geographical conditions such as, for example, the altitude, the topography, and the degree of influence of seasonal wind, in addition to the latitude. In addition, the recommended period may be different even for the same type of agricultural work because different breeds of crops are grown in different districts. Therefore, in general, the work front does not always simply move from south to north or from north to south. Even in such a case, information representing a rough guideline for the period for agricultural work for each district is appropriately created, so that the agricultural work can be performed at an appropriate period in each district.

Information representing rough guideline for the period for agricultural work for each district may be created based on, for example, information on the recommended period for each type of agricultural work that is published by an organization in each district such as an agricultural cooperative. The information may be created by a manager of the system or may be automatically created by the system based on information published on the Internet or the like. The information may be changed for each season of agricultural work or may be used for a plurality of seasons after being created.

In the example shown in FIG. 31 and FIG. 32, each agricultural machine 100 performs agricultural work in all the eight districts shown. The agricultural machines 100 are not limited to performing in this form, and each agricultural machine 100 may perform agricultural work only in one or some of the districts. For example, the district where each agricultural machine 100 is to perform agricultural work may be previously defined. In one example, different groups of agricultural machines may perform agricultural work in different districts. In this case, the management device 600 may create a work plan for each agricultural machine 100, such that a first group of agricultural machines 100 perform agricultural work in a plurality of fields in district A in a first period (e.g., mid March) and then a second group of agricultural machines 100 perform agricultural work in fields in district B in a second period (e.g., late March). Similarly for districts C to H, a work plan for each agricultural machine may be created such that a group of agricultural machines assigned to each of the districts perform agricultural work in fields in the respective district in an appropriate period based on information representing a rough guideline for the period for agricultural work. Alternatively, one group of agricultural machines may perform agricultural work in fields in two or more districts, such that the first group of agricultural machines are assigned to districts A and B, the second group of agricultural machine 100 are assigned to districts B and C, and a third group of agricultural machine 100 are assigned to districts C and D.

The system according to the present example embodiment may be used to perform a plurality of types of agricultural work in a plurality of districts by a plurality of types of agricultural machines. For example, a plurality of types of agricultural work may be performed in a plurality of districts by a plurality of agricultural machines such as a tractor, a rice transplanter, a mower, a drone and/or a combine.

FIG. 33 shows another example of information representing a rough guideline for the period for agricultural work for each district. FIG. 33 shows an example of table including information representing a rough guideline for the period, for each district, for a plurality of types of agricultural work to be performed for rice farming in rice paddies. In this example, the region where the agricultural machines 100 perform agricultural work is divided into six districts a to f. In the table shown in FIG. 33, a rough guideline (e.g., recommended period), for each district, for each of six types of agricultural work (plowing of the field, puddling, rice transplanting, spraying of herbicides, spraying of fertilizers. and reaping) is recorded. Note that the types of agricultural work are not limited to these examples, and there are various types of agricultural work in accordance with the crop to be grown. As shown in FIG. 33, different types of agricultural machines may be used for different types of agricultural work. For example, plowing of the field and puddling may be performed by a tractor having an implement (e.g., a rotary, a plow, a harrow, etc.) attached thereto. Rice transplanting may be performed by a rice transplanter. Spraying of herbicides and spraying of fertilizers may be performed by a drone. Reaping may be performed by a combine. In the example shown in FIG. 33, unlike in FIG. 32, the rough guideline for the period for agricultural work is expressed as terms including information on specific dates (e.g., March 11 to April 17). In this manner, information representing a rough guideline for the period for agricultural work may be recorded in any of various forms. Note that in the case where travel of a specific agricultural machine (e.g., a rice transplanter or a combine, etc.) on a public road is restricted by the law, the system may be configured so as not to include such an agricultural machine.

The management device 600 according to the present example embodiment creates a work plan for each agricultural machine 100 based on information representing a rough guideline for the period for one or more types of agricultural work for each district as shown in FIG. 32 or FIG. 33. In accordance with the created work plan, the management device 600 generates a path for each agricultural machine 100 for each working day and instructs each agricultural machine 100 to move and perform agricultural work.

The work plan includes information on one or more tasks of agricultural work to be performed by each agricultural machine 100. For example, the work plan includes information on one or more tasks of agricultural work to be performed by each agricultural machine 100 and on the field where each task of agricultural work is to be performed. The work plan may include information on a plurality of tasks of agricultural work to be performed by each agricultural machine 100 over a plurality of working days and on the field where each task of agricultural work is to be performed. More specifically, the work plan may be a database including information on a work schedule indicating which agricultural machine is to perform which task of agricultural work in which field at which point of time on each working day. Hereinafter, an example case where the work plan is data of such a work schedule will be described.

FIG. 34 shows an example of work plan for each agricultural machine 100. The work plan in this example includes information representing the date and time for the agricultural work, the field for the agricultural work, the contents of the work, and the implement to be used, for each of the registered agricultural machines 100. The work plan is not limited to being of the form shown in FIG. 34, and may include other information on the work. For example, the work plan may include information on the types or the spray amounts of agricultural chemicals or fertilizers. In accordance with such a work plan, the processor 660 of the management device 600 generates a path for each agricultural machine 100 for each working day and instructs each agricultural machine 100 to perform the agricultural work. The work plan may be downloaded by the controller 180 of the agricultural machine 100 and may also stored in the storage 170. In this case, the controller 180 may spontaneously begin the operation in accordance with the work plan stored in the storage 170.

The management device 600 may create a work plan based on information input by each user by use of the terminal device 400, in addition to the information representing a rough guideline for the period for agricultural work. For example, the management device 600 may create a work plan based on information representing a rough plan for each type of agricultural work to be performed in one or more fields managed by each user.

Figure 35:
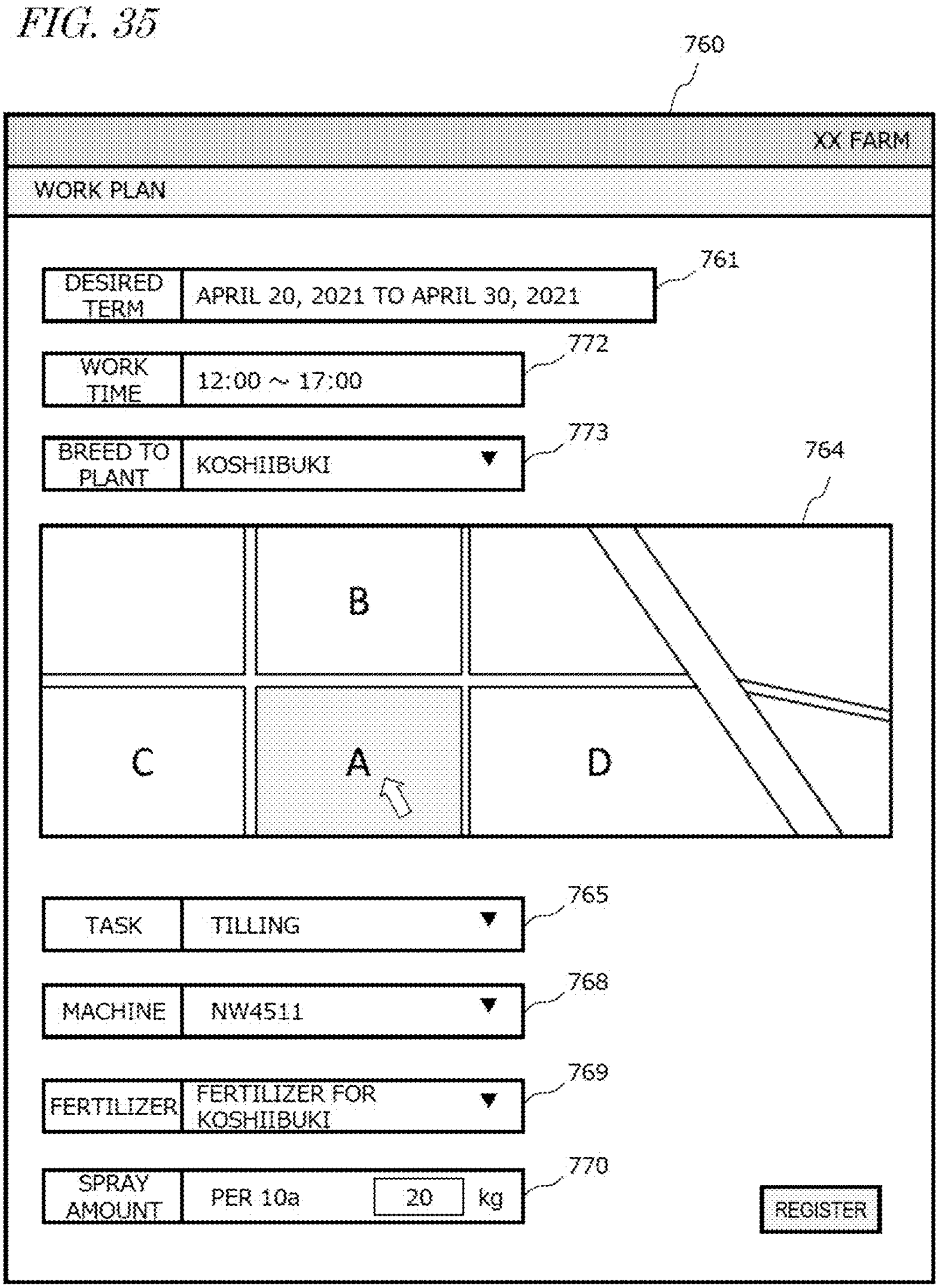
FIG. 35 shows an example of setting screen displayed on the terminal device.

FIG. 35 shows an example of setting screen 760 displayed on the display device 430 of the terminal device 400. In response to a manipulation performed by the user by use of the input device 420, the processor 460 of the terminal device 400 starts application software for work plan creation, and thus causes the display device 430 to display the setting screen 760 as shown in FIG. 35. The user can input information on a rough plan necessary to create a work plan on the setting screen 760.

FIG. 35 shows an example of the setting screen 760 in the case where tiling accompanied by spraying of a fertilizer is to be performed as agricultural work in a field for rice farming. The setting screen 760 is not limited to the one shown here, and may be appropriately changed. The setting screen 760 in the example shown in FIG. 35 includes a term setter 761, a time setter 772, a planting breed selector 773, a field selector 764, a work selector 765, a machine selector 768, a fertilizer selector 769, and a spray amount setter 770.

The term setter 761 displays the term input by the user. The user inputs a term when he/she wants the agricultural work to be performed. A day included in the input term is set as a candidate for the day when the agricultural work is to be performed.

The time setter 772 displays a work time period input by the user. The user inputs a work time period when he/she wants the agricultural work to be performed. The work time period is specified by a point of time to begin the agricultural work and a point of time to end the agricultural work. The input work time period is set as a candidate for the time period when the agricultural work is to be performed.

The planting breed selector 773 displays a list of breeds of crops to be planted (i.e., seeded). The user can select a desired breed from the list. In the example shown in FIG. 35, rice breed "Koshiibuki" is selected.

The field selector 764 displays the fields in the map. The user can select any field from the fields displayed. In the example shown FIG. 35, a region indicating "field A" is selected. In this case, the selected "field A" is set as the field where the agricultural work is to be performed. The user can select a plurality of fields at the same time.

The work selector 765 displays a plurality of types of agricultural work necessary to grow the selected crop. The user can select one type of agricultural work from the plurality of types of agricultural work. In the example of FIG. 35, "tilling" is selected from the plurality of types of agricultural work. In this case, the selected "tilling" is set as the agricultural work to be performed.

The machine selector 768 is used to set the agricultural machine to be used for the agricultural work. The machine selector 768 may display, for example, the types or models of the agricultural machines previously registered by the management device 600 and the types, models, etc. of usable implements. The user can select a specific machine from the machines displayed. In the example shown in FIG. 35, the implement of model "NW4511" is selected. In this case, this implement is set as the machine to be used for the agricultural work.

The fertilizer selector 769 displays names of a plurality of fertilizers registered previously. The user can select a specific fertilizer from the plurality of fertilizers displayed. The selected fertilizer is set as the fertilizer to be used for the agricultural work.

The spray amount setter 770 displays a numerical value input by the input device 420. The input numerical value is set as the spray amount.

When the term, the work time period, the planting breed, the field, the type of agricultural work, the fertilizer and the spray amount that are desired are input to the setting screen 760 and "register" is selected, the communication device 490 of the terminal device 400 transmits the input information to the management device 600. The processor 660 of the management device 600 causes the storage 650 to store the received information.

Note that the information on the agricultural work managed by the management device 600 is not limited to the above-described information. For example, the type and the spray amount of the agricultural chemical to be used in the field may be set on the setting screen 760. Information on a type of agricultural work other than the type shown in FIG. 35 may be set.

The management device 600 creates a work plan for a type of agricultural work to be performed by each agricultural machine 100, based on the information received from the terminal device 400 of each user and the information representing a rough guideline for the period for the type of agricultural work for each district. For example, the management device 600 determines the actual working day and the actual work time period for each type of agricultural work for each district, in consideration of the desired term and the desired work time period for type of the agricultural work input by each user and the information representing a rough guideline for the period for the type of agricultural work. Specifically, the management device 600 determines the date and time when the agricultural work is to be actually performed in each field, in comprehensive consideration of the number, the distribution and the state of use of the agricultural machines 100 located in the district, the distribution of the fields where the agricultural work is to be performed in the district, the date and time desired by each user, and a rough guideline for the period for the work in the district. For example, in order to determine the date and time when the agricultural work is to be performed in each field, an algorithm using artificial intelligence (AI) such as, for example, a deep neutral network or the like may be used. The management device 600 notifies the terminal device 400 used by the user of the determined date and time for the agricultural work. In the case where the determined date and time is different from the date and time desired by the user, information indicating such information may be notified. The management device 600 performs path planning for each agricultural machine 100 for each working day, based on the determined date and time when the agricultural work is to be performed in each field.

Hereinafter, a specific example of a non-limiting example of a method for path planning for the agricultural machine 100 for each working day will be described. In the example described below, the agricultural machine 100 is a work vehicle such as a tractor, and a path outside the field is generated on a road (an agricultural road or a general road). Note that in the case where the agricultural machine 100 is an aerial vehicle such as a drone, the path outside the field does not need to be generated on a road.

Figure 36:
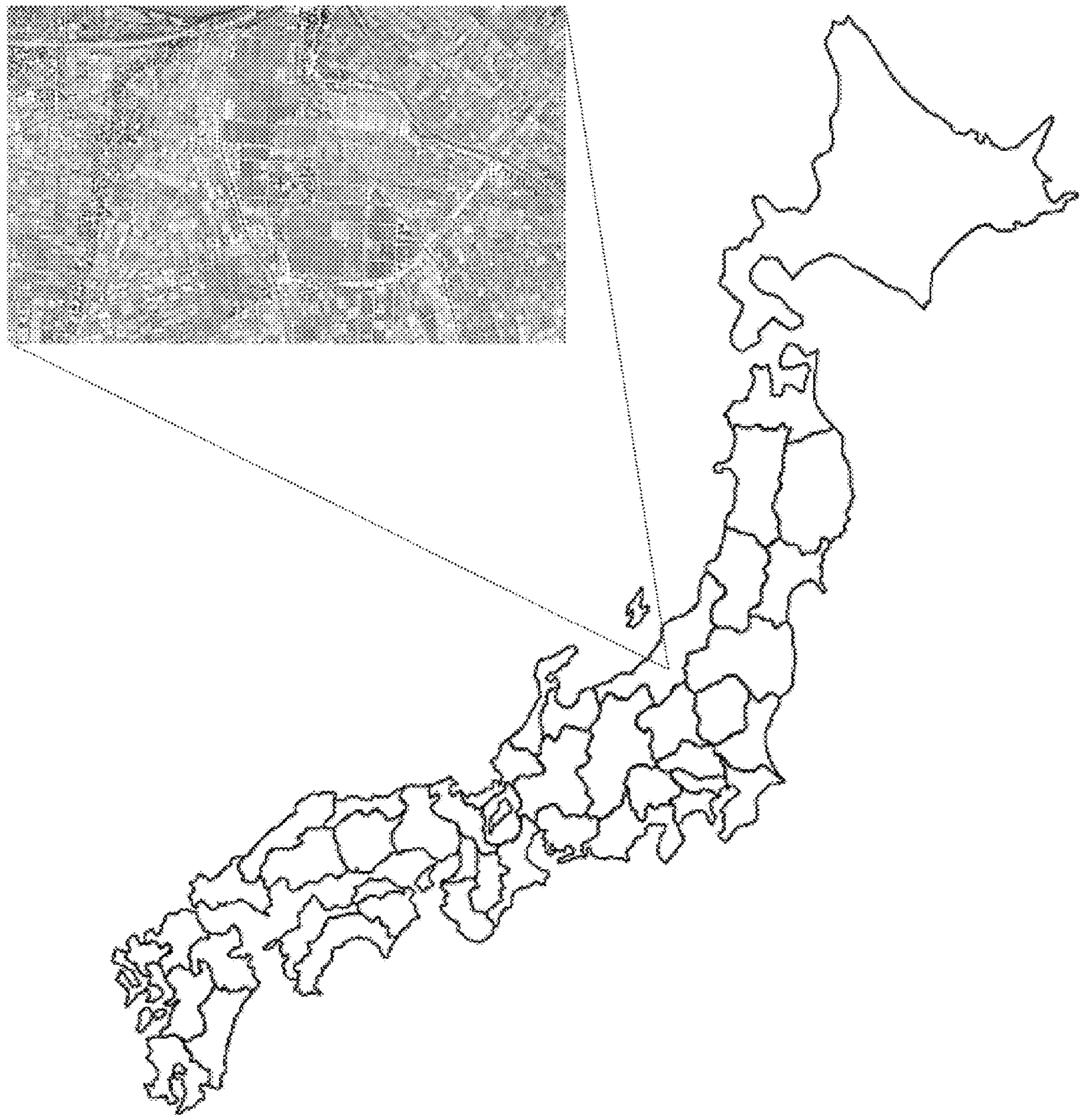
FIG. 36 shows an example of map referred to at the time of path planning.

FIG. 36 shows an example of map referred to at the time of path planning. FIG. 36 shows a small example of map of a certain district of Japan. This map corresponds to the map shown in FIG. 17. This map is a two-dimensional digital map, and may be created by the management device 600 or another device. Such a map may be previously created for the entirety of the district where the agricultural machine 100 moves, and is recorded in the storage 650. Note that the maps shown in FIG. 36 and FIG. 17 are two-dimensional maps, but a three-dimensional map may be used for path planning.

As described above, the map shown in FIG. 17 includes information on the position of each of points (e.g., the latitude and the longitude of each of the points) in the plurality of fields 70 where the agricultural machine 100 is to perform agricultural work and the road 76 around the fields 70. This map further includes positional information on the plurality of waiting areas 90, where the agricultural machine 100 may wait temporarily. For example, the waiting areas 90 may be previously registered by a manager of the agriculture management system and recorded in the storage 650.

The map as shown in FIG. 17 may be created for the entirety of a district where the agricultural machine 100 moves. As can be seen, the map may include information on a plurality of fields, a plurality of waiting areas, and a road connecting the plurality of fields and the plurality of waiting areas to each other in each district.

Before the agricultural work begins on each of the working days, the management device 600 reads, from the storage 650, a map of a region including the fields where the agricultural work is to be scheduled on that particular working day, and generates a path (global path) for the agricultural machine 100 based on the map and the work plan. Based on the work plan, the management device 600 determines, from a plurality of waiting areas, a specific waiting area to which the agricultural machines 100 is to move after performing the final task of agricultural work on each of working days, and generates a path from the field where the final task of agricultural work is to be performed, to the specific waiting area. The method to generate a path for the agricultural machine 100 for each working day is substantially the same as the method in example embodiment 1. As described above with reference to, for example, FIG. 14 or FIG. 15, the management device 600 can generate a path for the agricultural machine 100 for each working day.

After creating a work plan, the management device 600 may modify the work plan in accordance with the state. For example, the management device 600 may update the work plan in accordance with at least one of the growing state of crop in the plurality of fields, the state of progress of agricultural work, the state of planting, or the state of weather, by substantially the same method as that in example embodiment 1. In this case, the management device 600 generates a path for the agricultural machine 100 for each working day, in accordance with the updated work plan. As a result, the path for the agricultural machine 100 for each working day can be appropriately set in accordance with any of various states such as the growing state of crop, the state of progress of agricultural work, the state of planting, or the state of weather.

The growing state of crop, the state of progress of agricultural work, the state of planting or the state of weather influences the work plan. For example, in the case where the growing state of crop or the state of progress of agricultural work is ahead of, or behind, the schedule, the work plan needs to be reviewed. Alternatively, in the case where a task of agricultural work originally scheduled cannot be performed due to bad weather, the work plan after that task needs to be reviewed. In the case where optimal period for the agricultural work is different among the breeds of crops, it may become necessary to adjust the work plan in accordance with the breed of crop that is planted.

As a preparation for the case described above, the management device 600 may monitor at least one of the growing state of crop, the state of progress of agricultural work, the state of planting, or the state of weather in each field. To generate a path for the agricultural machine 100 for each working day, the management device 600 may modify the work plan of that particular working day and thereafter, based on at least one of the growing state of crop, the state of progress of agricultural work, the state of planting, or the state of weather. Based on the modified work plan, the management device 600 may determine the distribution of the working days for the fields in the vicinity of each of the plurality of waiting areas. Based on the determined distribution of the working days, the management device 600 can determine a specific waiting area to which the agricultural machine 100 is to move after performing the final task of agricultural work on each working day, and generate a path between fields and a path connecting a field and a waiting area to each other. For example, in order to determine the specific waiting area for each working day, the management device 600 may, for example, specify the field group where the agricultural work is to be performed on the next working day, based on the distribution of the working days for the fields in the vicinity of each of the waiting areas, and determine the waiting area closest to the field group as the specific waiting area. Such an operation can provide effects of, for example, shortening the travel distance of the agricultural machines and decreasing the time for moving and the amount of consumption of the fuel.

In the present example embodiment also, as shown in the examples of FIG. 20 to FIG. 27, the management device 600 may be configured or programmed to modify the work plan in accordance with at least one of the growing state of crop, the state of progress of agricultural work, the state of planting, or the state of weather in each field. Instead of performing such an operation, the management device 600 may modify the work plan based on any two or more among the growing state of crop, the state of progress of agricultural work, the state of planting, or the state of weather. Comprehensive consideration of these state allows more appropriate path planning to be performed in accordance with the state, and allows the agricultural machine to be run more efficiently.

OTHER EXAMPLE EMBODIMENTS

The configurations and operations in the above-described example embodiments are merely examples, and the present example disclosure is not limited to the above-described embodiments. Hereinafter, other example embodiments will be described.

In example embodiment 1 described above, the processor 660 of the management device 600 manages at least one of the growing state of crop, the state of progress of agricultural work, the state of planting, or the state of weather in each field, and also determines the waiting area for each working day and performs global path planning for the agricultural machine. Alternatively, for example, a processor different from the management device 600 may determine the waiting area for each working day and perform global path planning for the agricultural machine. In this case, the processor can be configured or programmed to acquire, from the management device 600, the information representing at least one of the growing state of crop, the state of progress of agricultural work, the state of planting, or the state of weather, determine the specific waiting area for each working day based on the information, and generate a path for the agricultural machine. Such a processor may include a controller provided in the agricultural machine.

In example embodiment 2 described above, the processor 660 of the management device 600 creates a work plan for the agricultural machine 100 based on information representing a rough guideline for the period for agricultural work for each district, and performs path planning for the agricultural machine 100 based on the work plan. Alternatively, for example, a processor different from the management device 600 may perform path planning for the agricultural machine 100. In this case, the processor can be configured or programmed to acquire the work plan from the management device 600, and generate a path for the agricultural machine 100 for each working day based on the information. Such a processor may be a controller provided in the agricultural machine 100. Note that in the above-described example embodiment, the system includes a plurality of agricultural machines 100. Alternatively, there may be a single agricultural machine 100.

The techniques in each of the above-described example embodiments are not limited to being applied to a work vehicle such as a tractor, and may be applied to, for example, an agricultural drone (i.e., UAV). A processor configured or programmed to perform path planning for an agricultural drone does not need to generate a path along the roads 76, unlike in the example shown in FIG. 16. For example, a path directly connecting a waiting area and a field and a path directly connecting fields may be generated as a path for the agricultural drone.

A system performing the path planning or self-driving control according to the above-described example embodiments can be mounted on an agricultural machine lacking such functions, as an add-on. Such a system may be manufactured and marketed independently from the agricultural machine. A computer program for use in such a system may also be manufactured and marketed independently from the agricultural machine. The computer program may be provided in a form stored in a non-transitory computer-readable storage medium, for example. The computer program may also be provided through downloading via telecommunication lines (e.g., the Internet).

As described above, the present disclosure includes a path planning system, a control system for an agricultural machine, and an agricultural machine described in the following items.

The techniques according to the present disclosure are applicable to a path planning system for agricultural machines, such as tractors, harvesters, rice transplanters, vehicles for crop management, vegetable transplanters, mowers, seeders, spreaders, or agricultural robots, for example.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A path planning system for an agricultural machine performing self-driving, the path planning system comprising:

a storage to store a map including a plurality of fields, a plurality of waiting areas, and a road connecting the plurality of fields and the plurality of waiting areas to each other;

a processor configured or programmed to generate a path on the map for the agricultural machine for each of working days; and a controller configured or programmed to control the agricultural machine to move along the path generated by the processor; wherein the processor is configured or programmed to:

determine, from the plurality of waiting areas, a specific waiting area to which the agricultural machine is to move after performing a final task of agricultural work on each working day, based on information representing at least one of a growing state of crop in the plurality of fields, a state of progress of agricultural work in the plurality of fields, a state of planting in the plurality of fields, or a state of weather;

generate a path from the field where the final task of agricultural work is to be performed, to the specific waiting area;

determine a distribution of the working days in the plurality of fields in a vicinity of each of the plurality of waiting areas, based on at least one of the growing state of crop, the state of progress of agricultural work, the state of planting, or the state of weather; and determine the specific waiting area for each working day, based on the distribution of the working days.

2. The path planning system of claim 1, wherein in order to determine the specific waiting area for each working day, the processor is configured or programmed to specify a group of fields where the agricultural work is to be performed on a next working day, based on the distribution of the working days, and determine a waiting area closest to the group of fields as the specific waiting area.

3. The path planning system of claim 1, wherein in order determine the specific waiting area for each working day, the processor is configured or programmed to determine a waiting area closest to a first field where the final task of agricultural work is to be performed on the working day, or a waiting area closest to a second field where a first task of agricultural work is to be performed on the next working day specified from the distribution of the working days, as the specific waiting area.

4. The path planning system of claim 3, wherein the processor is configured or programmed to determine, as the specific waiting area, a waiting area between a waiting area closest to the first field and a waiting area closest to the second field that results in a shorter travel distance for the agricultural machine when moving from the first field to the second field via the specific waiting area.

5. The path planning system of claim 1, wherein the processor is configured or programmed to update the distribution of the working days in accordance with the growing state of crop in the plurality of fields.

6. The path planning system of claim 1, wherein the processor is configured or programmed to update the distribution of the working days in accordance with the state of progress of agricultural work in the plurality of fields.

7. The path planning system of claim 1, wherein the processor is configured or programmed to update the distribution of the working days in accordance with the state of planting in the plurality of fields.

8. The path planning system of claim 1, wherein the processor is configured or programmed to update the distribution of the working days in accordance with the state of weather in a district where each of the plurality of waiting areas is located.

9. The path planning system of claim 1, wherein, in order to determine the specific waiting area for each working day, the processor is configured or programmed to obtain the information from a management device managing at least one of the growing state of crop, the state of progress of agricultural work, the state of planting, or the state of weather.

10. The path planning system of claim 1, wherein the processor is configured or programmed to transmit information representing the generated path, or a command to move the agricultural machine along the path, to the agricultural machine.

11. The path planning system of claim 1, wherein the processor is configured or programmed to:

generate a path for a plurality of agricultural machines including the agricultural machine for each working day;

determine, from the plurality of waiting areas, a specific waiting area to which each of the agricultural machines moves after performing the final task of agricultural work on each working day, based on the information representing at least one of the growing state of crop in the plurality of fields, the state of progress of agricultural work in the plurality of fields, the state of planting in the plurality of fields, or the state of weather; and generate a path from the field where the final task of agricultural work is to be performed, to the specific waiting area, for each of the agricultural machines.

12. An agricultural machine, comprising:

the path planning system of claim 1; and a drive device controllable by the controller.

13. A method performed by a processor of a path planning system for an agricultural machine performing self-driving, the method comprising:

acquiring a map including a plurality of fields, a plurality of waiting areas, and a road connecting the plurality of fields and the plurality of waiting areas to each other;

generating a path on the map for the agricultural machine for each of working days; and controlling the agricultural machine to move along the path generated; wherein the generating the path includes:

acquiring information representing at least one of a growing state of crop in the plurality of fields, a state of progress of agricultural work in the plurality of fields, a state of planting in the plurality of fields, or a state of weather;

determining a distribution of the working days in the plurality of fields in a vicinity of each of the plurality of waiting areas, based on the at least one of the growing state of crop, the state of progress of agricultural work, the state of planting, or the state of weather;

determining, from the plurality of waiting areas, a specific waiting area to which the agricultural machine is to move after performing a final task of agricultural work on each working day, based on the distribution of the working days; and generating a path from the field where the final task of agricultural work is to be performed, to the specific waiting area.

* * * * *